United States Patent
Licon

(10) Patent No.: US 11,266,148 B2
(45) Date of Patent: Mar. 8, 2022

(54) TANNIN FORMULATIONS FOR AGRICULTURAL USE IN PLANTS

(71) Applicant: Química Agronómica de México S. de R.L. de C.V., Chihuahua (MX)

(72) Inventor: Miguel Enrique Alvarado Licon, Chihuahua (MX)

(73) Assignee: QUÍMICA AGRONÓMICA DE MÉXICO S. DE R.L. DE C.V., Chihuahua (MX)

(*) Notice: Subject to any disclaimer, the term of this patent is extended or adjusted under 35 U.S.C. 154(b) by 0 days.

(21) Appl. No.: 16/894,292

(22) Filed: Jun. 5, 2020

(65) Prior Publication Data

US 2020/0296965 A1 Sep. 24, 2020

Related U.S. Application Data

(62) Division of application No. 16/198,950, filed on Nov. 23, 2018, now Pat. No. 10,757,942.

(60) Provisional application No. 62/727,237, filed on Sep. 5, 2018, provisional application No. 62/723,168, filed on Aug. 27, 2018, provisional application No. 62/722,782, filed on Aug. 24, 2018.

(51) Int. Cl.
   *A01N 43/90* (2006.01)

(52) U.S. Cl.
   CPC .................................. *A01N 43/90* (2013.01)

(58) Field of Classification Search
   CPC ........ A01N 43/90; A01N 65/08; A01N 65/20; A01N 61/00
   See application file for complete search history.

(56) References Cited

U.S. PATENT DOCUMENTS

| 5,595,748 A | 1/1997 | Hewlett et al. |
| 2011/0059162 A1 | 3/2011 | Reed et al. |
| 2011/0105421 A1 | 5/2011 | Mathee et al. |
| 2012/0282349 A1 | 11/2012 | Tamagawa et al. |
| 2014/0206630 A1 | 7/2014 | Messersmith et al. |

FOREIGN PATENT DOCUMENTS

| AU | 2008201404 A1 | 10/2008 | |
| CN | 1766035 A | 5/2006 | |
| EP | 3318125 A1 * | 5/2018 | ............. A01N 45/00 |
| IT | TV20090099 A1 | 11/2010 | |
| JP | S52-083497 A | 7/1977 | |

OTHER PUBLICATIONS

Comandini et al., Food Chemistry 157 (2014) 290-295 (Year: 2014).*

(Continued)

*Primary Examiner* — San Ming R Hui

(74) *Attorney, Agent, or Firm* — Paratus Law Group, PLLC

(57) ABSTRACT

The preparation, composition, and method of use of an antibacterial formulation utilizing tannins, acceptable for agriculture and for use against bacterial and fungicidal diseases in plants. The composition is based on an organic matrix and may be balanced with dispersants, flocculants and humectants, and may be used against a wide range of agricultural bacterial diseases.

17 Claims, 72 Drawing Sheets

(56) References Cited

OTHER PUBLICATIONS

Product label for System Max, date of product registration Oct. 1, 2019; date of manufacture Nov. 26, 2019.
Dec. 10, 2020, European Communication issued for related EP Application No. 19717360.2.
Jun. 29, 2021, European communication issued for related EP application No. 19717360.2.
Nov. 3, 2021, European Summons issued for related EP application No. 19717360.2.
Karamanidou et al., Fining of Red Wines: Effects on Their Analytical and Sensory Parameters, Journal International des Sciences de la Vigne et du Vin, Mar. 31, 2011, pp. 47-60, vol. 45, No. 1.
Harbertson, A Guide To the Fining of Wine, Aug. 2009, pp. 1-10, Washington University Extension.
Habertson, Winemaker's Fining Techniques, The Sorting Table, Sep. 2015, pp. 1-3, Washington State University.
Anirudhan et al., Adsorptive removal of tannin from aqueous solutions by cationic surfactant-modified bentonite clay, Journal of Colloid and Interface Science, Jul. 1, 2006, pp. 116-124, vol. 299, No. 1.
Awe, Effect of Clarifying Agents (Gelatin and Kaolin) on Fruit Wine Production, International Journal of Agriculture Innovations and Research, Mar. 5, 2018, pp. 130-132, vol. 6, No. 4, ISSN 2319-1473.
Scalbert, "Review Article No. 63 Antimicrobial Properties of Tannins", Phytochemistry, 1991, vol. 30, No. 12, pp. 3875-3883 (total 9 pages).
International Search Report for PCT/182019/052104, dated Jun. 7, 2019 [PCT/ISA/210].
Written Opinion for PCT/182019/052104, dated Jun. 7, 2019 [PCT/ISA/237].

* cited by examiner

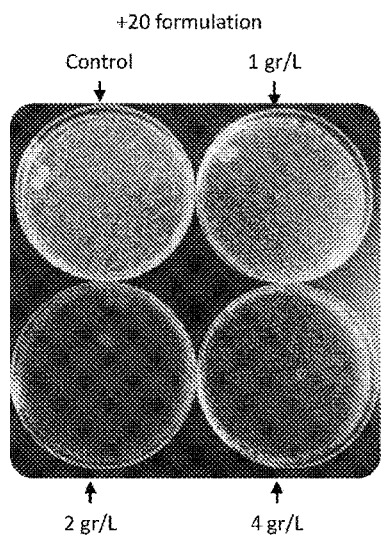 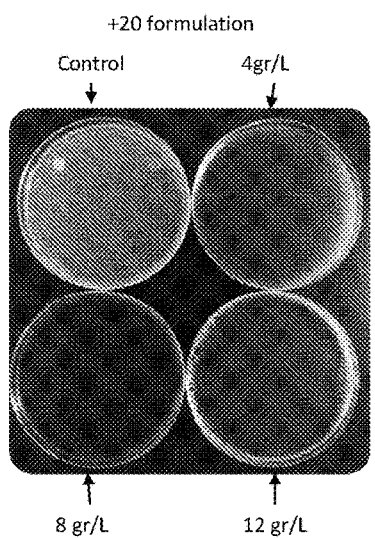 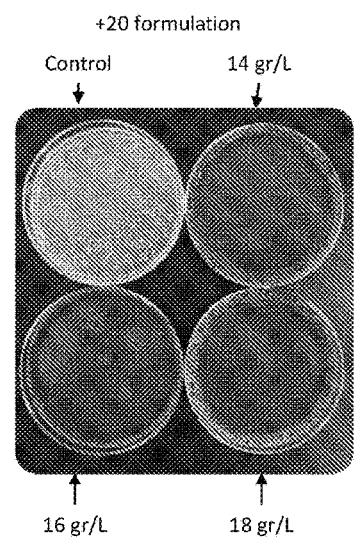
Figure 48(a)        Figure 48 (b)        Figure 48 (c)

TANNIN FORMULATIONS FOR AGRICULTURAL USE IN PLANTS

This application is a divisional of U.S. patent application Ser. No. 16/198,950 filed Nov. 23, 2018, which claims benefit to U.S. provisional application No. 62/722,782, filed Aug. 24, 2018; U.S. provisional application No. 62/723,168, filed Aug. 27, 2018; and U.S. provisional application No. 62/727,237, filed Sep. 5, 2018; the entire contents of each of which are hereby incorporated by reference in its entirety.

BACKGROUND

Bacteria are the most abundant microorganisms on our planet, and the prevention and control of bacteria and the diseases that they cause, particularly in the agricultural field, is of utmost importance as it directly impacts the food production needed for human sustenance. Some examples of this are mentioned below.

*Erwinia amylovora* has caused incalculable losses by destroying complete plantations of apples and pears in the countries in which these fruits trees are cultivated. For example, in the state of Chihuahua, Mexico alone, more than 50 thousand pear trees have died and more than a million trees of different apple varieties have been infected. This has caused both large and the abandonment of the cultivation of such fruits in producing regions of that state. Thus this has evolved from a phytosanitary problem for fruit producers into a serious social problem. Fruit growers are seriously worried about the symptoms of the disease, in that the infected trees seem as if they have been burned with a flamethrower, hence the name "fire blight." This same situation has occurred in highly industrialized countries where these fruits are cultivated, such as, for example, the United States of America, England, France, and the countries of the former Soviet Union. After blossom season, bacteria splashed by moisture events such as drizzle, dew and wind can infect succulent shoots. Blight shoot or shoot blight appears one to several weeks after falling petals. Symptoms of the disease continue to progress through the spring and summer season in susceptible tissues, such as leaves and twigs.

Pierce's disease, caused by the bacteria *Xylella fastidiosa*, has strategic importance due to the amount of money that it cost when it attacks crops such as vine, olive, citrus, stone fruit trees, such as plum and peach, as well as almond trees. This causes a devastating effect as a result of the large surfaces it affects. It is also one of the most studied bacteria by scientists because of the bacteria's colonizing habit, in that it can survive in different varietal cuts that have been transported without strict sanitary control at borders. The disease has spread, and has been reported already in a good number of countries in Latin America, Europe, and Asia. This disease is considered to be a main factor limiting the expansion and success of affected cultivars.

In Central America and South America, thousands of African palm trees are dying because of an illness caused by a bacterium which has not been identified correctly. This has caused a need for alternatives for its control and for a product that can counteract the devastating effects of the plague. To do so, it is necessary to establish research protocols with the appropriate scientific rigor and for those protocols to be carried out with a large team of producers, and potentially governments, in order to establish the biological cycle of the pathogen and how to treat or prevent it.

In banana producing countries threatened by a terrible disease called "moko," caused by a bacterium named *Ralstonia solanacearum*, there has been the loss and abandonment of complete crops, which are impossible to replant because the pathogen survives in the soil for years on the tissues of a sick plant. Farmers have to spend large sums of money to sterilize the soil by applying toxic materials, which causes negative effects on the beneficial flora and fauna in the area, thus altering the balance and delicate nutritional biogeochemical cycles present in that ecosystem.

Having the same importance are the bacteria that attack vegetables, grasses, members of the cruciferous family, members of the solanaceae family, members of the rosaceous family, members of the ericaceous family, and the like when in favorable climatic conditions for the development of the disease you can almost completely lose the crop and to avoid it, farmers will have to invest large sums of money in applying materials based on antibiotics depending on their legislation and their availability.

The use of antibiotics in agriculture, such as gentamicin, oxytetracycline, streptomycin, and kasugamycin, offer viable alternatives for the prevention and control of these exemplary pathogens, but the use of these antibiotics has been limited during recent years in Europe, Japan, Australia, New Zealand, and Brazil. Because of this, producers have very limited options to treat or prevent the bacterial diseases which, year-by-year, reduce their crops and cause large losses of their crops. Producers can only use formulations based on copper for foliar applications, which offers a limited control of the sanitary emergency they have. In these countries, where the use of antibiotics is forbidden for agricultural use, the incidence of bacterial diseases is increasing in a worrying way, and in some places, such as Italy, Spain, New Zealand, France, and others countries, the production of both vine and kiwi are going through a delicate stage due to the presence of diseases caused by bacteria that have devastated complete cultivars. In Australia, there exists a serious worry by the government and producers of a bacterial disease that has been presenting in wheat, blueberries, sugarcane, and cereals, thereby putting in check the production of these foods. The same happens in Brazil, the United States, and England, where producers of citrus crops are reporting incalculable losses resulting from a disease called the "Yellow Dragon," which is caused by the bacterium *Candidatus liberibacter* also affecting China, Taiwan, India, Malaysia, Indonesia, Myanmar, the Philippines, Pakistan, Thailand, Nepal, Saudi Arabia, Afghanistan, and others.

SUMMARY

The main purpose of this disclosure is to provide a new antibacterial formulation acceptable for agricultural use. The formulation is effective to prevent, treat, and control diseases caused by bacteria and fungus in plants, while also providing for an environmentally-friendly composition, thereby permitting its authorized use in those countries that have high registry standards and those countries in which the use of antibiotics have been controlled or forbidden.

The formulation comprises tannins as active ingredient mixed with agriculturally acceptable excipients, for example, a lignin such as sodium lignosulfonate, a polycyclic aromatic hydrocarbon such as naphthalene sulfonate, polysaccharides such as starch, and siliceous sedimentary rock such as diatomaceous earth. The agriculturally acceptable formulation can be deposited in and mixed with a reasonable amount of water to be sprinkled in very thin droplets of water "to the point of dripping" via appropriate equipment to the crop that it is intended to protect, in which bacterial damage may be present and would otherwise continue to harm the plants. The agriculturally acceptable formulation thereby avoids exceeding the profitable economic thresholds for the food producer.

The present disclosure relates, in part, to a composition comprising tannins, a method of using the composition comprising tannins, and the use of the composition comprising tannins. The disclosure below provides additional detail regarding the contents of the composition and how it may be used and applied to plants.

Tannins have been used since ancient times in the tannery industry. Egyptians used the fruits of acacias for tannery purposes, and tannins are also used in wine making and medicine to naturally treat some diseases in humans. Tannins are very astringent polyphenolic compounds and have a bitter taste.

BRIEF DESCRIPTION OF THE DRAWINGS

FIGS. 48(a)-(c) show the results of a test using composition+20.

DETAILED DESCRIPTION

Figures 1A, 1B, 1C:
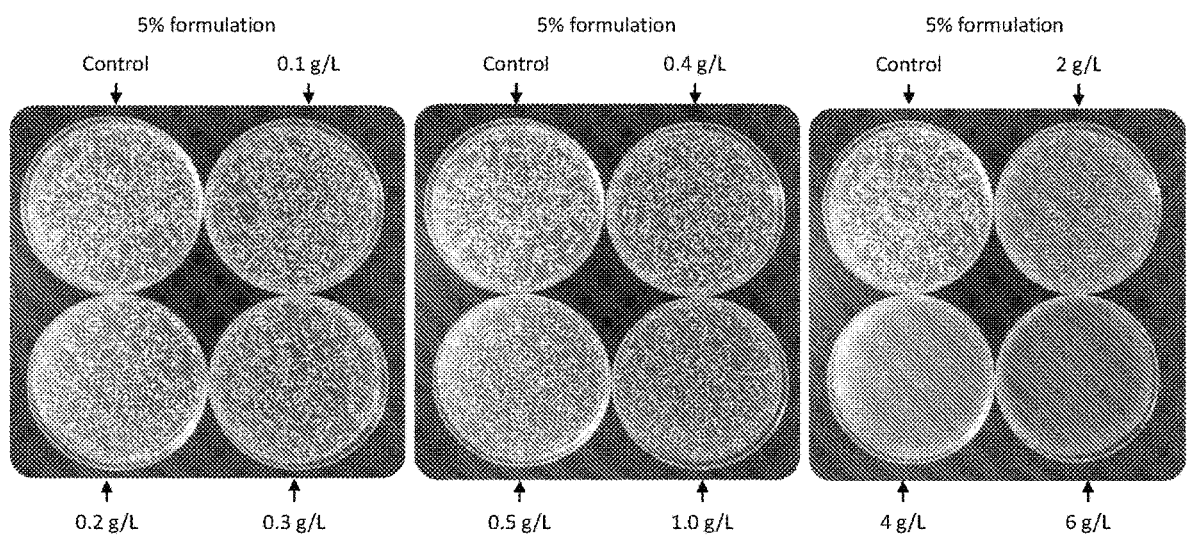
FIGS. 1(a)-(c) show the results when a mixture containing 5% of a premixture of tannins was tested against *Clavibacter* sp.

The agriculturally acceptable formulation of the present disclosure may include tannins as active ingredient mixed with agriculturally acceptable excipients. Such agriculturally acceptable excipients include, for example, bactericides, resistance inductors, biopesticides, fungicides, foliage fertilizers, hormones, and the like.

Tannins that may be used in the agriculturally acceptable formulation include any type of tannin, such as but not limited to ellagic, pyrogallol, or gallic tannins. Also "pseudo-tannins" can be used such as gallic acid, such atrihydroxybenzoic acid, or ellagic acid. Castalagin and vescalagin (both are ellagic tannins) are examples of such tannins, but the tannins are not limited thereto, and other tannins may also be used. For example, flavan-3-ols, such as catechin, epicatechin gallate, epigallocatechin, epigallocatechin gallate, proanthocyanidins, theaflavins, and thearubigins may be used. Chlorogenic acids (CGA), such as hydroxycinnamic acids, caffeic acid, ferulic acid, and p-coumaric acid, and quinic acid may also be used. In addition, ipecacuanhic acids, such as metine, cephaeline, emetamine, ipecacuanhic acid, psychotrine, and O-methylpsychotrine can also be used. Tannins such as roburine, castaline, castanopsinines, casuarictine, excoecarianine, excoecarinines, grandinine, pterocarinine, punicacorteine, punicalagine, rhoipteleanines, roburines, vescaline, gallic acid, ellagic acid, procianidine may also be used. Importantly, the above tannins are exemplary only, and any other tannin may be used. The tannins may be used alone or in combination with one another. Natural or synthetic tannins may be used. In exemplary embodiments, the tannin may be one or more of a flavonoid, procyanidin, proanthocyanin, prodelfinidin, profisetidine, proanthocyanidin, cyanidin, anthocyanin, and catechin. Formulations of the present disclosure may also comprise, in some instances, flavanones and/or flavanols, for example.

The amount of tannins that may be present in the agriculturally acceptable formulation is not particularly limited, but may be an amount of from 0.01% by mass to 99% by mass. For example, they may be present in the formulation in an amount of from 0.1% by mass to 50% by mass. As another example, they may be present in the formulation in an amount of from 0.1% by mass to 10% by mass. As another example, they may be present in the formulation in an amount of from 0.1% by mass to 1% by mass, from 0.5% by mass to 5% by mass, from 1% by mass to 10% by mass, from 10% to 20% by mass, from 20% to 30% by mass, from 30% to 40% by mass, from 40% to 50% by mass, from 50% to 60% by mass, from 60% to 70% by mass, from 70% to 80% by mass, and from 80% to 90% by mass. As another example, they may be present in the formulation in an amount of from 1% by mass to 25% by mass, from 10% by mass to 50% by mass, from 25% by mass to 75% by mass, or from 50% by mass to 99% by mass. However, the amount of tannin is not particularly limited so long as the amount provides for the antibacterial or antifungal effects disclosed herein. The tannins may be used and applied to plants in amounts greater than or less than any amount that may be otherwise present in a plant that has not been treated with the presently disclosed composition. If the tannins are applied to a plant that produces tannins, the tannins applied to a given plant may be different from any tannin produced by that plant, or alternatively may be the same type of tannin produced by that plant.

The tannin-based preparation may include one or more other agriculturally acceptable items, such as dispersants, surfactants and/or humectants, inert components, thickeners, bactericides, resistance inductors, biopesticides, fungicides, foliage fertilizers, hormones, and the like.

Examples of the dispersants that may be used with the agriculturally acceptable formulation include, but are not limited to, sodium lignosulfonate, alpha-olefin sulfonates, alky lauryl sulfonates, lignin sulfonates, block copolymers, ethylene oxide/propylene oxide copolymers, polyoxyethylene-polyoxypropylene copolymers, tridecyl alcohol ethoxylates, and polyacrylates. Mixtures of dispersants may also be used. The amount of dispersant present is not particularly limited. In some exemplary embodiments, the amount of a dispersant in the formulation, or the total amount of a mixture of dispersants in the formulation, may be between 1% and 70%. In yet further exemplary embodiments, the amount of a dispersant in the formulation, or the total amount of a mixture of dispersants in the formulation, may be greater than, for example, 2%, 5%, 10%, 15%, 20%, 25%, 30%, 35%, 40%, 45%, 50%, 55%, 60%, or 65%. In other exemplary embodiments, the amount of a dispersant in the formulation, or the total amount of a mixture of dispersants in the formulation, may be less than, for example, 2%, 5%, 10%, 15%, 20%, 25%, 30%, 35%, 40%, 45%, 50%, 55%, 60%, or 65%. In some exemplary embodiments, the amount of a dispersant in the formulation, or the total amount of a mixture of dispersants in the formulation, may be between 5% and 20%, 15% and 30%, 25% and 40%, 40% and 55% or 55% and 70%.

Examples of the surfactants and/or humectants that may be used with the agriculturally acceptable formulation include, but are not limited to, naphthalene sulfonate, dioctyl sodium sulfosuccinate, glycerin, polyglycerin, castor oil and/or soybean oil, dodecylbenzene sodium sulfonate, sodium lauryl sulfate, and other phosphates. Mixtures of surfactants and/or humectants may also be used. The amount of surfactants and/or humectants present is not particularly limited. In some exemplary embodiments, the amount of a surfactant and/or humectant in the formulation, or the total amount of a mixture of surfactants and/or humectants in the formulation, may be between 1% and 70%. In yet further exemplary embodiments, the amount of a surfactant and/or humectant in the formulation, or the total amount of a mixture of surfactants and/or humectants in the formulation, may be greater than, for example, 2%, 5%, 10%, 15%, 20%, 25%, 30%, 35%, 40%, 45%, 50%, 55%, 60%, or 65%. In other exemplary embodiments, the amount of a surfactant and/or humectant in the formulation, or the total amount of a mixture of surfactants and/or humectants in the formulation, may be less than, for example, 2%, 5%, 10%, 15%, 20%, 25%, 30%, 35%, 40%, 45%, 50%, 55%, 60%, or 65%. In some exemplary embodiments, the amount of a surfactant and/or humectant in the formulation, or the total amount of a mixture of surfactants and/or humectants in the formulation, may be between 5% and 20%, 15% and 30%, 25% and 40%, 40% and 55% or 55% and 70%.

Examples of the inert components that may be used with the agriculturally acceptable formulation include, but are not limited to, celite, diatomaceous earth, bentonite, pyrophyllite, kaolin, montmorillonite, thenardite, attapulgite, dolomite, clay, cork, humic acids, and fulvic acids. Mixtures of inert components may also be used. The amount of inert components present is not particularly limited. In some exemplary embodiments, the amount of an inert component in the formulation, or the total amount of a mixture of inert components in the formulation, may be between 1% and 95%. In yet further exemplary embodiments, the amount of an inert component in the formulation, or the total amount of a mixture of inert components in the formulation, may be greater than, for example, 2%, 5%, 10%, 15%, 20%, 25%, 30%, 35%, 40%, 45%, 50%, 55%, 60%, 65%, 70%, 75%, 80%, 85% or 90%. In other exemplary embodiments, the amount of an inert component in the formulation, or the total amount of a mixture of inert components in the formulation, may be less than, for example, 2%, 5%, 10%, 15%, 20%, 25%, 30%, 35%, 40%, 45%, 50%, 55%, 60%, 65%, 70%, 75%, 80%, 85% or 90%. In some exemplary embodiments, the amount of an inert component in the formulation, or the total amount of a mixture of inert components in the formulation, may be between 5% and 20%, 15% and 30%, 25% and 40%, 40% and 55%, 55% and 70%, 70% and 85%, or 80% and 95%.

Examples of the thickeners that may be used with the agriculturally acceptable formulation include, but are not limited to, xanthan gum, guar gum, maltodextrins, dextrins, lecithin, and polysaccharides. Mixtures of thickeners may also be used. The amount of thickeners present is not particularly limited. In some exemplary embodiments, the amount of a thickener in the formulation, or the total amount of a mixture of thickeners in the formulation, may be between 1% and 70%. In yet further exemplary embodiments, the amount of a thickener in the formulation, or the total amount of a mixture of thickeners in the formulation, may be greater than, for example, 2%, 5%, 10%, 15%, 20%, 25%, 30%, 35%, 40%, 45%, 50%, 55%, 60%, or 65%. In other exemplary embodiments, the amount of a thickener in the formulation, or the total amount of a mixture of thickeners in the formulation, may be less than, for example, 2%, 5%, 10%, 15%, 20%, 25%, 30%, 35%, 40%, 45%, 50%, 55%, 60%, or 65%. In some exemplary embodiments, the amount of a thickener in the formulation, or the total amount of a mixture of thickeners in the formulation, may be between 5% and 20%, 15% and 30%, 25% and 40%, 40% and 55% or 55% and 70%.

Examples of the bactericides that may be used with the agriculturally acceptable formulation include, but are not limited to, gentamicin, streptomycin, oxytetracycline, kasugamicin, kanamycin, TCMTB ((benzothiazol-2-ylthio) methyl thiocyanate), MTC (methylene bis(thiocyanate)), blasticidin, natamicyn, and mixtures thereof. Additional examples of bactericides that may be used include other aminoglycocides and other tetracyclines. The amount of bactericides present is not particularly limited. In some exemplary embodiments, the amount of a bactericide in the formulation, or the total amount of a mixture of bactericides in the formulation, may be between 5% and 60%. In yet further exemplary embodiments, the amount of a bactericide in the formulation, or the total amount of a mixture of bactericides in the formulation, may be greater than, for example, 7%, 10%, 15%, 20%, 25%, 30%, 35%, 40%, 45%, 50%, or 55%. In other exemplary embodiments, the amount of a thickener in the formulation, or the total amount of a mixture of thickeners in the formulation, may be less than, for example, 7%, 10%, 15%, 20%, 25%, 30%, 35%, 40%, 45%, 50%, or 55%. In some exemplary embodiments, the amount of a thickener in the formulation, or the total amount of a mixture of thickeners in the formulation, may be between 5% and 20%, 15% and 30%, 25% and 40%, 40% and 55% or 50% and 60%.

Examples of the resistance inductors that may be used with the agriculturally acceptable formulation include, but are not limited to, fluoxastrobin, metominostrobin, hymexazol, acibenzolar-s-metil, mandestrobin, coumoxystrobin, flufenoxystrobin, mandestrobin, azoxystrobin, enoxastrobin, picoxystrobin, pyraoxystrobin, pyraclostrobin, pyrametostrobin, triclopyricarb, famoxadone, dimoxystrobin, fenaminstrobin, orysastrobin, kresoxim-methyl, trifloxystrobin, laminarin, and mixtures thereof. The amount of resistance inductors present is not particularly limited. In some exemplary embodiments, the amount of a resistance inductor in the formulation, or the total amount of a mixture of resistance inductors in the formulation, may be between 5% and 50%. In yet further exemplary embodiments, the amount of a resistance inductor in the formulation, or the total amount of a mixture of resistance inductors in the formulation, may be greater than, for example, 7%, 10%, 15%, 20%, 25%, 30%, 35%, 40%, or 45%. In other exemplary embodiments, the amount of a resistance inductor in the formulation, or the total amount of a mixture of resistance inductors in the formulation, may be less than, for example, 7%, 10%, 15%, 20%, 25%, 30%, 35%, 40%, or 45%. In some exemplary embodiments, the amount of a resistance inductor in the formulation, or the total amount of a mixture of resistance inductors in the formulation, may be between 5% and 15%, 15% and 25%, 25% and 35%, 35% and 45% or 40% and 50%.

Examples of the biopesticides that may be used with the agriculturally acceptable formulation include, but are not limited to, *Bacillus subtillis, Bacillus amyloliquefasciens*, carboxilic acids, oxolinic acids, *Bacillus micoides, Trichoderma atriviride*, quitosan, and mixtures thereof. The amount of biopesticides present is not particularly limited. In some exemplary embodiments, the amount of a biopesticide in the formulation, or the total amount of a mixture of biopesticides in the formulation, may be between 10% and 50%. In yet further exemplary embodiments, the amount of a biopesticide in the formulation, or the total amount of a mixture of biopesticides in the formulation, may be greater than, for example, 12%, 15%, 20%, 25%, 30%, 35%, 40%, or 45%. In other exemplary embodiments, the amount of a biopesticide in the formulation, or the total amount of a mixture of biopesticides in the formulation, may be less than, for example, 12%, 10%, 15%, 20%, 25%, 30%, 35%, 40%, or 45%. In some exemplary embodiments, the amount of a biopesticide in the formulation, or the total amount of a mixture of biopesticides in the formulation, may be between 10% and 15%, 15% and 25%, 25% and 35%, 35% and 45% or 40% and 50%.

Examples of fungicides that may be used with the agriculturally acceptable formulation include, but are not limited to chlorothalonil, PCNB (pentachloronitrobenzene), maneb, coppers, ziram, mancozeb, metalaxyl, benomyl, iprodione, tifluzamide, dimetomorph, myclobutanil, pentiopirad, fludioxonil, cyazofamid, thiabendazole, propamocarb, fenhexamid, boscalid, fluopicolide, extract of *Reynoutria sachalinensis*, triflumizole, iprodiona, propamocarb, prochloraz, tiabendazole, epoxiconazole, metalaxil, cymoxanil, picarbutrazox, and mixtures thereof. The amount of fungicides present is not particularly limited. In some exemplary embodiments, the amount of a fungicide in the formulation, or the total amount of a mixture of fungicides in the formulation, may be between 5% and 75%. In yet further exemplary embodiments, the amount of a fungicide in the formulation, or the total amount of a mixture of fungicides in the formulation, may be greater than, for example, 7%, 10%, 15%, 20%, 25%, 30%, 35%, 40%, 45%, 50%, 55%, 60%, 65%, or 70%. In other exemplary embodiments, the amount of a fungicide in the formulation, or the total amount of a mixture of fungicides in the formulation, may be less than, for example, 7%, 10%, 15%, 20%, 25%, 30%, 35%, 40%, 45%, 50%, 55%, 60%, 65%, or 70%. In some exemplary embodiments, the amount of a fungicide in the formulation, or the total amount of a mixture of fungicides in the formulation, may be between 5% and 20%, 15% and 30%, 25% and 40%, 40% and 55%, 55% and 70%, or 60% and 75%.

Examples of foliage fertilizers that may be used with the agriculturally acceptable formulation include, but are not limited to magnesium, boron, zinc, nitrogen, manganese, calcium, aluminum, chelates, iron, molybdenum, potassium, cobalt, copper, phosphite, sulfur, and amino acids. The amount of foliage fertilizers present is not particularly limited. In some exemplary embodiments, the amount of a foliage fertilizer in the formulation, or the total amount of a mixture of foliage fertilizers in the formulation, may be between 0.0001% and 60%. In yet further exemplary embodiments, the amount of a foliage fertilizer in the formulation, or the total amount of a mixture of foliage fertilizers in the formulation, may be greater than, for example, 0.0005%, 0.001%, 0.005%, 0.01%, 0.05%, 0.1%, 0.5%, 1%, 5%, 15%, 25%, 35%, 45%, or 55%. In yet further exemplary embodiments, the amount of a foliage fertilizer in the formulation, or the total amount of a mixture of foliage fertilizers in the formulation, may be less than, for example, 0.0005%, 0.001%, 0.005%, 0.01%, 0.05%, 0.1%, 0.5%, 1%, 5%, 15%, 25%, 35%, 45%, or 55%. In some exemplary embodiments, the amount of a foliage fertilizer in the formulation, or the total amount of a mixture of foliage fertilizers in the formulation, may be between 0.0001% and 0.001%, 0.01% and 0.1%, 0.1% and 1%, 1% and 10%, 5% and 25%, 15% and 30%, 25% and 50%, or 40% and 60%.

Examples of hormones that may be used with the agriculturally acceptable formulation include, but are not limited to cytokinins, gibberellins, and auxins. The amount of hormones present is not particularly limited. In some exemplary embodiments, the amount of a hormone in the formulation, or the total amount of a mixture of hormones in the formulation, may be between 0.0001% and 20%. In yet further exemplary embodiments, the amount of a hormone in the formulation, or the total amount of a mixture of hormones in the formulation, may be greater than, for example, 0.0005%, 0.001%, 0.005%, 0.01%, 0.05%, 0.1%, 0.5%, 1%, 2.5%, 5%, 7.5%, 10%, 12.5%, 15%, or 17.5%. In yet further exemplary embodiments, the amount of a hormone in the formulation, or the total amount of a mixture of hormones in the formulation, may be less than, for example, 0.0005%, 0.001%, 0.005%, 0.01%, 0.05%, 0.1%, 0.5%, 1%, 2.5%, 5%, 7.5%, 10%, 12.5%, 15%, or 17.5%. In some exemplary embodiments, the amount of a hormone in the formulation, or the total amount of a mixture of hormones in the formulation, may be between 0.0001% and 0.001%, 0.01% and 0.1%, 0.1% and 1%, 1% and 5%, 5% and 10%, 10% and 15%, or 15% and 20%.

Examples of other agriculturally acceptable materials that may be used with the agriculturally acceptable formulation include, but are not limited to, copper sulfate, copper oxychloride, copper hydroxide, cuprocalcic sulfate, sulfur in all variants, copper gluconate, copper octanoate, tribasic copper sulfate, calcium chloride, phosphoric acid, zinc oxide, phosphite, and mixtures thereof. The amount of other agriculturally acceptable materials present is not particularly limited. In some exemplary embodiments, the amount of another agriculturally acceptable material in the formulation, or the total amount of a mixture of other agriculturally acceptable materials in the formulation, may be between 0.05% and 70%. In yet further exemplary embodiments, the amount of another agriculturally acceptable material in the formulation, or the total amount of a mixture of other agriculturally acceptable materials in the formulation, may be greater than, for example, 0.1%, 0.5%, 1%, 5%, 10%, 15%, 20%, 25%, 30%, 35%, 40%, 45%, 50%, 55%, 60%, or 65%. In other exemplary embodiments, the amount of another agriculturally acceptable material in the formulation, or the total amount of a mixture of other agriculturally acceptable materials in the formulation, may be less than, for example, 0.1%, 0.5%, 1%, 5%, 10%, 15%, 20%, 25%, 30%, 35%, 40%, 45%, 50%, 55%, 60%, or 65%. In some exemplary embodiments, the amount of another agriculturally acceptable material in the formulation, or the total amount of a mixture of other agriculturally acceptable materials in the formulation, may be between 0.05% and 0.1%, 0.1% and 0.5%, 0.5% and 1%, 1% and 5%, 5% and 15%, 15% and 25%, 25% and 40%, 40% and 50%, 50% and 60%, or 60% and 70%.

To form the agriculturally acceptable formulation, a pre-mixture of tannins may be used to which the other materials present in the agriculturally acceptable formulation may be added. An example of a pre-mixture of tannins includes a mixture that contains about 65% tannins (a mixture of about 35.5% castalagin, about 23.3% vascalagin, about 2.0% castalin, and about 5.0% vescalin), about 15% sugars, and about 15% bentonite, with the remainder being water (unless otherwise noted, this pre-mixture will be referred to as Pre-Mixture A). The contents of the pre-mixture are not particularly limited, but an exemplary pre-mixture may comprise tannins, carbohydrates, and bentonite.

One exemplary formulation includes a mixture of 5% by mass of Pre-Mixture A and 95% by mass diatomaceous earth (e.g., 50 grams of tannins per kilogram of the formulation and 950 grams of diatomaceous earth per kilogram of the formulation).

Another exemplary formulation includes a mixture of 10% by mass of Pre-Mixture A and 90% by mass diatomaceous earth (e.g., 100 grams of tannins per kilogram of the formulation and 900 grams of diatomaceous earth per kilogram of the formulation).

Another exemplary formulation includes a mixture of 20% by mass of Pre-Mixture A and 80% by mass diatomaceous earth (e.g., 200 grams of tannins per kilogram of the formulation and 800 grams of diatomaceous earth per kilogram of the formulation).

Another exemplary formulation includes a mixture of Pre-Mixture A (200 grams, 20% by mass), sodium ligno-sulfonate (40 grams, 4% by mass), naphthalene sulfonate (20 grams, 2% by mass), xanthan gum (5 grams, 0.50% by mass), and diatomaceous earth (735 grams, 73.50% by mass).

The agriculturally acceptable formulation of the present disclosure can be, for example, deposited in and mixed with a reasonable amount of water to be sprinkled in very thin droplets of water "to the point of dripping" via appropriate equipment to the crop that it is intended to protect, in which pathogen damage may be present and would otherwise continue to harm the plants. The amount of water that may be mixed with the agriculturally acceptable formulation may be, for example, 50 liters of water per 2 kilograms per hectare when applied by airplane; 1000 liters of water per 2 kilograms per hectare when applied to plants via a sprayer; 400-600 liters of water per 2 kilograms per hectare when used on plants such as tomatoes, peppers, onions, and the like. The amount of water used is not particularly limited, however, and any dilution may be used so long as it provides for the anti-pathogenic effects disclosed herein.

The method by which the agriculturally acceptable formulation may be administered to plants is not particularly restricted. Examples include the application of the agriculturally acceptable formulation by airplane or sprayer (such as an airblast sprayer, a manual sprayer, or a mechanical sprayer). The agriculturally acceptable formulation may also be applied by a drencher, in which the agriculturally acceptable formulation is administered to the soil. In addition, the agriculturally acceptable formulation may be applied to plants via irrigation systems. In certain instances, the agriculturally acceptable formulation may also be injected into a plant.

The agriculturally acceptable formulation may be applied to a plant, a plant's foliage, or may be applied to the soil. For example, the agriculturally acceptable formulation may be applied to the foliage, stem, canopy, trunk, roots, shoots, twigs, and/or flowers of a plant. The agriculturally acceptable formulation may also be applied to seeds and to a plant's rhizomes. The agriculturally acceptable formulation may be applied to seedlings.

If applied to a plant or a plant's foliage, the agriculturally acceptable formulation may be administered in an amount so as to provide for the bactericidal effect of the present disclosure. For example, the agriculturally acceptable formulation may be applied so as to administer the amount of tannin necessary to provide for anti-pathogenic effects of the present invention. Such amounts may be determined based on the concentration of tannins present in the agriculturally acceptable formulation. For example, an amount of 2 kilograms (diluted in an appropriate amount of water) per hectare of plants may be appropriate. The agriculturally acceptable formulation may be administered to plants in intervals of, for example, 1-21 days, preferably intervals of 2-14 days, and also preferably intervals of 3-7 days. However, the amounts and intervals are not limited thereto and may be determined based on the agriculturally acceptable formulation. The agriculturally acceptable formulation can be administered in the nursery stage, the seedling stage, the transplant stage, the vegetative stage, pre-bloom, during full-bloom, post-bloom, and during fruit set. The agriculturally acceptable formulation can also be administered during a plant's dormancy.

The agriculturally acceptable formulation of the present disclosure may be made by mixing together the materials listed above. The manner in which the materials are mixed is not particularly limiting. The agriculturally acceptable formulation may then be added to a predetermined amount of water and, if necessary, water conditioner.

The agriculturally acceptable formulation is a bactericidal and fungicidal formulation that can be used in a wide variety of plants and plant species that have great economic importance. These include, but are not limited to, vegetables crops such as artichoke, asparagus, beet, beetroot, bell pepper, broccoli, brussels sprout, cabbage, carrot, cauliflower, celery, sweet corn, cucumber, eggplant, beans, green bean, onion, green onion, leek, lettuce, pea, pepper, potato, pumpkin, radish, spring onion, squash, sweet potato, tomato, zucchini, and mushrooms; as well as cereal crops such as wheat, oats, corn, rice, barley, sorghum, triticale, quinoa, and the like; as well as fruit crops such as avocado, apple, pears, peaches, plum, banana, prune, citrus, lemons, oranges, pomegranate, papaya, mango, lychee, rambutan, strawberry, cranberry, blackberry, raspberry; as well as other crops such as nuts, pastures, sugar cane, and the like.

The agriculturally acceptable formulation has also shown benefits in the treatment of nurseries and seedbeds, as well as in ornamental plants, such as flowers that include chrysanthemums, daisies, roses, begonias, gladiolas, geraniums, gardenias, and carnations. The agriculturally acceptable formulation is also beneficial to protect shade trees, forest trees, and annual and bi-annual crops from bacterial diseases.

As examples, a preparation of the agriculturally acceptable formulation is effective to control generally gram negative species and gram positive species, such *Erwinia* species, *Pseudomonas* species, *Xanthomonas* species, *Pectobacterium* species, *Enterobacter* species, *Pantoea* species, *Streptomyces* species, *Phytoplasmas* species, *Corynebacterium* species, *Ralstonia* species, *Clavibacter* species, and *Agrobacterium* species. Specifically bacteria that belong to the following species: *Acetobacter aceti, Acetobacter pasteurianus, Acidovorax anthurii, Acidovorax avenae, Acidovorax avenae* subsp. *avenae, Acidovorax avenae* subsp. *cattleyae, Acidovorax avenae* subsp. *citrulli, Acidovorax konjaci, Acidovorax valerianellae, Acidovorax cattleyae, Acidovorax citrulli, Acidovorax oryzae Rhizobium, Rhizobium larrymoorei, Rhizobium radiobacter, Rhizobium rhizogenes, Rhizobium rubi, Rhizobium viti. Arthrobacter* sp. *Arthrobacter ilicis, Bacillus* sp., *Bacillus megaterium, Bacillus megaterium* pv. *cerealis, Bacillus pumilus, Brenneria alni, Brenneria nigrifluens, Brenneria quercina, Brenneria rubrifaciens, Brenneria salicis, Brenneeria quercina* pv. *quercina, Brenneeria quercina* pv. *lupinicola, Burkholderia andropogonis, Burkholderia caryophylli, Burkholderia cepacia, Burkholderia gladioli, Burkholderia gladioli* pv. *agaricicola, Burkholderia gladioli* pv *alliicola, Burkholderia gladioli* pv. *Gladioli, Burkholderia glumae, Burkholderia plantarii, Ralstonia solanacearum, Candidatus liberibacter, Candidatus liberibacter africanis, Candidatus liberibacter africanis* subsp. *capensis, Candidatus liberibacter americanus, Candidatus liberibacter asiaticus, Candidatus phlomobacter, Candidatus phlomobacter fragariae, Candidatus phytoplasma, Candidatus phytoplasma allocasuarinae, Candidatus phytoplasma americanum, Candidatus phytoplasma asteris, Candidatus phytoplasma aurantifolia, Candidatus phytoplasma australasia, Candidatus phytoplasma australiense, Candidatus phytoplasma brasiliense, Candidatus phytoplasma caricae, Candidatus phytoplasma castaniae, Candidatus phytoplasma cynodontis, Candidatus phytoplasma fragariae, Candidatus phytoplasma fraxini, Candidatus phytoplasma graminis, Candidatus phytoplasma japonicum, Candidatus phytoplasma lycopersici, Candidatus phytoplasma mali, Candidatus phytoplasma oryzae, Candidatus phytoplasma phoenicium, Candidatus phytoplasma pini, Candidatus phytoplasma prunorum, Candidatus phytoplasma pyri, Candidatus phytoplasma rhamni, Candidatus phytoplasma spartii, Candidatus phytoplasma trifolii, Candidatus phytoplasma ulmi, Candidatus phytoplasma ziziphi, Candidatus phytoplasma omanense, Candidatus phytoplasma tamaricis, Candidatus liberibacter psyllaurous, Candidatus liberibacter solanacearum, Clavibacter* sp, *Rathayibacter iranicus, Clavibacter michiganensis, Clavibacter michiganensis* subsp. *insidiosus, Clavibacter michiganensis* subsp. *michiganensis, Clavibacter michiganensis* subsp. *nebraskensis, Clavibacter michiganensis* subsp. *sepedonicus, Clavibacter michiganensis* subsp. *tessellarium, Clostridium* sp. *Clostridium puniceum. Corynebacterium* sp. *Curtobacterium* sp., *Curtobacterium flaccumfaciens* pv. *betae, Curtobacterium flaccumfaciens* pv. *flaccumfaciens, Curtobacterium flaccumfaciens* pv. *ilicis, Curtobacterium flaccumfaciens* pv. *oortii, Curtobacterium flaccumfaciens* pv. *poinsettiae, Dickeya* sp., *Dickeya chrysanthemi, Dickeya chrysanthemi* pv. *chrysanthemi, Dickeya chrysanthemi* pv. *parthenii, Dickeya dadantii, Dickeya diantbicola, Dickeya dieffenbachiae, Dickeya paradisiaca, Dickeya zeae, Enterobacter* sp. *Enterobacter cancerogenus, Enterobacter cloacae, Enterobacter cloacae* subsp *dissolvens, Enterobacter nimipressuralis, Enterobacter pyrinus, Erwinia* sp., *Erwinia amylovora, Erwinia mallotivora, Erwiniapapayae, Erwinia persicina, Erwinia psidii, Erwinia pyrfoliae, Erwinia rhapontici, Erwinia tracheiphila, Ewingella* sp., *Ewingella americana, Gluconobacter* sp. *G. oxydans, Herbaspirillum* sp., *Herbaspirillum rubrisubalbicans, Janthinobacterium* sp. *J. agaricidamnosum, Leifsonia* sp. *Leifsonia cynodontis, Leifsonia xyli, Leifsonia xyli* subsp. *cynodontis, Leifsonia xyli* subsp *xyli, Nocardia* sp., *Nocardia vaccinii, Pantoea* sp., *Pantoea agglomerans, Pantoea agglomerans* pv. *gypsophilae, Pantoea agglomerans* pv. *millettiae, Pantoea ananatis, Pantoea ananatis* pv. *ananatis, Pantoea ananatis* pv. *uredova, Pantoea stewartii, Pantoea stewartii* subsp. *indologenes, Pantoea stewartii* subsp. *stewartii, Pectobacterium* sp., *Pectobacterium atrosepticum, Pectobacterium betavasculorum, Pectobacterium cacticida, Pectobacterium carotovorum, Pectobacterium carotovorum* subsp. *carotovorum, Pectobacterium carotovorum* subsp. *odoriferum, Pectobacterium cypripedii, Pectobacterium wasabiae, Pseudomonas* sp., *Pseudomonas agarici, Pseudomonas amygdali, Pseudomonas asplenii, Pseudomonas avellanae, Pseudomonas beteli, Pseudomonas cannabina, Pseudomonas caricapapayae, Pseudomonas cichorii, Pseudomonas cissicola, Pseudomonas corrugata, Pseudomonas costantinii, Pseudomonas ficuserectae, Pseudomonas flectens, Pseudomonas fuscovaginae, Pseudomonas hibiscicola, Pseudomonas marginalis, Pseudomonas matginalis* pv. *alfalfae, Pseudomonas marginalis* pv. *marginalis Pseudomonas marginalis* pv. *pastinacae, Pseudomonas mediterranea, Pseudomonas meliae Pseudomonas palleroniana, Pseudomonas salomonii, Pseudomonas savastanoi, Pseudomonas savastanoi* pv. *fraxini, Pseudomonas savastanoi* pv. *glycinea, Pseudomonas savastanoi* pv. *nerii, Pseudomonas savastanoi* pv. *phaseolitica, Pseudomonas savastanoi* pv. *retacarpa, Pseudomonas savastanoi* pv. *savastanoi, Pseudomonas syringae, Pseudomonas syringae* pv. *aceris, Pseudomonas syringae* pv. *actinidiae, Pseudomonas syringae* pv. *aesculi, Pseudomonas syringae* pv. *alisalensis, Pseudomonas syringae* pv. *antirrhini, Pseudomonas syringae* pv. *apii, Pseudomonas syringae* pv. *aptata, Pseudomonas syringae* pv. *atrofaciens, Pseudomonas syringae* pv. *atropurpura, Pseudomonas avellanae, Pseudomonas syringae* pv. *avvi, Pseudomonas syringae* pv. *berberidis, Pseudomonas cannabina, Pseudomonas syringae* pv. *broussonetiae, Pseudomonas syringae* pv. *castaneae, Pseudomonas syringae* pv *cerasicola, Pseudomonas syringae* pv. *ciccaronei, Pseudomonas syringae* pv *coriandricola, Pseudomonas syringae* pv. *coronafaciens, Pseudomonas syringae* pv. *coryli, Pseudomonas syringae* pv. *cunninghamiae, Pseudomonas syringae* pv. *daphniphylli, Pseudomonas syringae* pv. *delphinii, Pseudomonas syringae* pv. *dendropanacis, Pseudomonas syringae* pv. *disoxyli, Pseudomonas syringae* pv. *eriobotryae, Pseudomonas syringae* pv. *garcae, Pseudomonas sevastanoi* pv. *glycineae, Pseudomonas syringae* pv. *helianthi, Pseudomonas syringae* pv. *hibisci, Pseudomonas syringae* pv. *syringae, Pseudomonas syringae* pv. *lachrymans, Pseudomonas syringae* pv *lapsa, Pseudomonas syringae* pv. *maculicola, Pseudomonas syringae* pv. *mellea, Pseudomonas syringae* pv. *mori, Pseudomonas syringae* pv. *morsprunorum, Pseudomonas syringae* pv. *myricae, Pseudomonas syringae* pv. *oryzae, Pseudomonas syringae* pv. *papulans, Pseudomonas syringae* pv. *passiflorae,*

*Pseudomonas syringae* pv. *persicae, Pseudomonas sevastanoi* pv. *phaseolicola, Pseudomonas syringae* pv. *philadelphi, Pseudomonas syringae* pv. *photiniae, Pseudomonas syringae* pv. *pisi, Pseudomonas syringae* pv. *porri, Pseudomonas syringae* pv. *primulae, Pseudomonas syringae* pv. *rhaphiolepidis, Pseudomonas syringae* pv. *ribicola, Pseudomonas syringae* pv. *sesami, Pseudomonas syringae* pv. *solidagae, Pseudomonas syringae* pv. *spinaceae, Pseudomonas syringae* pv. *striafaciens, Pseudomonas syringae* pv. *syringae, Pseudomonas syringae* pv. *tabaci, Pseudomonas syringae* pv. *tagetis, Pseudomonas syringae* pv. *theae, Pseudomonas syringae* pv. *tomato, Pseudomonas syringae* pv. *ulmi, Pseudomonas syringae* pv. *viburni, Pseudomonas syringae* pv. *zizaniae, Pseudomonas syringae* pv., *Ralstonia solanacearum, Ralstonia syzygii, Rathayibacter iranicus, Rathayibacter rathayi, Rathayibacter toxicus, Rathayibacter tritici, Rhizobacter dauci, Rhizobium larrymoorei, Rhizobium radiobacter, Rhizobium rhizogenes, Rhizobium rubi, Rhizobium vitis, Rhodococcus fascians, Samsonia erythrinae, Serratia marcescens, Serratia proteamaculans, Sphingomonas melonis, Sphingomonas suberifasciens, Spriroplasma citri, Spriroplasma kunkelii, Spriroplasma phoeniceum, Streptomyces acidiscabies, Streptomyces albidoflavus, Streptomyces candidus, Streptomyces caviscabies, Streptomyces collinus, Streptomyces europaeiscabiei, Streptomyces intermedius, Streptomyces ipomocae, Streptomyces luridiscabiei, Streptomyces niveiscabiei, Streptomyces puniciscabiei, Streptomyces reticuliscabei, Streptomyces scabiei, Streptomyces setonii, Streptomyces steliiscabiei, Streptomyces turgidiscabieis, Streptomyces wedmorensis, Xanthomonas albilineans, Xanthomonas alfalfae, Xanthomonas alfalfae* subsp. *alfalfae, Xanthomonas alfalfae* subsp. *citrumelonis, Xanthomonas arboricola, Xanthomonas arboricola* pv. *celebensis, Xanthomonas arboricola* pv. *corylina, Xanthomonas arboricola* pv. *fragariae, Xanthomonas arboricola* pv. *juglandis, Xanthomonas anoxopodis* pv. *poinsettiicola, Xanthomonas arboricola* pv. *populi, Xanthomonas arboricola* pv. *pruni, Xanthomonas anoxopodis, Xanthomonas fuscans* subsp. *aurantifolii, Xanthomonas aranopodis* pv. *allii, Xanthomonas axonopodis* pv. *axonopodis, Xanthomonas axonopodis* pv. *baubiniae, Xanthomonas axonopodis* pv. *begoniae, Xanthomonas axonopodis* pv. *betlicola, Xanthomonas axonopodis* pv. *biophyti, Xanthomonas axonopodis* pv. *cajani, Xanthomonas axonopodis* pv. *cassiae, Xanthomonas citri, Xanthomonas axonopodis* pv. *clitoriae, Xanthomonas axonopodis* pv. *coracanae, Xanthomonas axonopodis* pv. *cyamopsidis, Xanthomonas axonopodis* pv. *desmodii, Xanthomonas axonopodis* pv. *desmodiigangetici, Xanthomonas axonopodis* pv. *desmodiilaxiflori, Xanthomonas axonopodis* pv. *desmodiirotundifolii, Xanthomonas axonopodis* pv. *dieffenbachiae, Xanthomonas axonopodis* pv. *erythrinae, Xanthomonas axonopodis* pv. *fascicularis, Xanthomonas axonopodis* pv. *glycines, Xanthomonas axonopodis* pv. *khayae, Xanthomonas axonopodis* pv. *lespedezae, Xanthomonas axonopodis* pv. *maculifoliigardeniae, Xanthomonas citri* subsp. *malvacearum, Xanthomonas axonopodis* pv. *manibotis, Xanthomonas axonopodis* pv. *martyniicola, Xanthomonas axonopodis* pv. *melbusii, Xanthomonas axonopodis* pv. *nakataecorchori, Xanthomonas campestris* pv. *passiflorae, Xanthomonas axonopodis* pv. *patelii, Xanthomonas axonopodis* pv. *pedalii, Xanthomonas axonopodis* pv. *phaseoli, Xanthomonas axonopodis* pv. *phyllanthi, Xanthomonas axonopodis* pv. *physalidicola, Xanthomonas axonopodis* pv. *poinsettiicola, Xanthomonas axonopodis* pv. *punicae, Xanthomonas axonopodis* pv. *rhynchosiae, Xanthomonas axonopodis* pv. *ricini, Xanthomonas axonopodis* pv. *sesbaniae, Xanthomonas axonopodis* pv. *tamarindi, Xanthomonas axonopodis* pv. *vasculorum, Xanthomonas vesicatoria, Xanthomonas axonopodis* pv. *vignaeradiatae, Xanthomonas axonopodis* pv. *vignicola, Xanthomonas axonopodis* pv. *vitians, Xanthomonas bromi, Xanthomonas campestris, Xanthomonas campestris* pv. *aberrans, Xanthomonas campestris* pv. *armoraciae, Xanthomonas campestris* pv. *barbareae, Xanthomonas campestris* pv. *campestris, Xanthomonas campestris* pv. *incanae, Xanthomonas campestris* pv. *plantaginis, Xanthomonas campestris* pv. *raphani, Xanthomonas campestris* pv. *alangii, Xanthomonas campestris* pv. *amaranthicola, Xanthomonas campestris* pv. *amorphophalli, Xanthomonas campestris* pv. *aracearum. Xanthomonas campestris* pv. *arecae, Xanthomonas campestris* pv. *argemones, Xanthomonas campestris* pv. *arracaciae, Xanthomonas campestris* pv. *asclepiadis, Xanthomonas campestris* pv. *azadirachteae, Xanthomonas campestris* pv. *badrii, Xanthomonas campestris* pv. *betae, Xanthomonas campestris* pv. *bilvae, Xanthomonas campestris* pv. *blepharidis, Xanthomonas campestris* pv. *boerbaaviae, Xanthomonas campestris* pv. *brunneivaginae, Xanthomonas campestris* pv. *cannabis, Xanthomonas campestris* pv. *cannae, Xanthomonas campestris* pv. *carissae, Xanthomonas campestris* pv. *centellae, Xanthomonas campestris* pv. *clerodendri, Xanthomonas campestris* pv. *convolvuli, Xanthomonas campestris* pv. *coriandri, Xanthomonas campestris* pv. *daturae, Xanthomonas campestris* pv. *durantae, Xanthomonas campestris* pv. *esculenti, Xanthomonas campestris* pv. *eucalypti, Xanthomonas campestris* pv. *euphorbiae, Xanthomonas campestris* pv. *fici, Xanthomonas campestris* pv. *guizotiae, Xanthomonas campestris* pv. *gummisudans, Xanthomonas campestris* pv. *heliotropii, Xanthomonas campestris* pv. *ionidii, Xanthomonas campestris* pv. *lantanae, Xanthomonas campestris* pv. *laureliae, Xanthomonas campestris* pv. *lawsoniae, Xanthomonas campestris* pv. *leeana, Xanthomonas campestris* pv. *leersiae, Xanthomonas campestris* pv. *malloti, Xanthomonas campestris* pv. *mangiferaeindicae, Xanthomonas campestris* pv. *merremiae, Xanthomonas campestris* pv. *mirabilis, Xanthomonas campestris* pv. *mori, Xanthomonas campestris* pv. *musacearum, Xanthomonas campestris* pv. *nigromaculans, Xanthomonas campestris* pv. *obscurae, Xanthomonas campestris* pv. *olitorii, Xanthomonas campestris* pv. *papavericola, Xanthomonas campestris* pv. *parthenii, Xanthomonas campestris* pv. *paulliniae, Xanthomonas campestris* pv. *pennamericanum, Xanthomonas campestris* pv. *phormiicola, Xanthomonas campestris* pv. *physalidis, Xanthomonas campestris* pv. *sesami, Xanthomonas campestris* pv. *spermacoces, Xanthomonas campestris syngonii, Xanthomonas campestris* pv. *tardicrescens, Xanthomonas campestris* pv. *thespesiae, Xanthomonas campestris* pv. *thirumalacharii, Xanthomonas campestris* pv. *tribuli, Xanthomonas campestris* pv. *trichodermae, Xanthomonas campestris* pv. *uppalii, Xanthomonas campestris* pv. *vernomiae, Xanthomonas campestris* pv. *viegasii, Xanthomonas campestris* pv. *viticola, Xanthomonas campestris*pv. *vitiscarnosae, Xanthomonas campestris*pv. *vitistrifoliae, Xanthomonas campestris* pv. *vitiswoodrowii, Xanthomonas campestris* pv. *zantedeschiae, Xanthomonas campestris* pv. *zingibericola, Xanthomonas campestris* pv. *zinniae, Xanthomonas cassavae, Xanthomonas citri* subsp *malvarearum, Xanthomonas codiaei, Xanthomonas curcubitae, Xanthomonas cynarae, Xanthomonas euvesicatoria, Xanthomonas fragariae, Xanthomonas fuscans, Xanthomonas fuscans* subsp. *aurantifolii, Xanthomonas fuscans* subsp. *fuscans, Xanthomonas gardneri, Xanthomonas hortorum* pv. *carotae, Xanthomonas* hortorum pv. hederae, Xanthomonas hortorum pv. pelargonii, Xanthomonas hortorum pv. tararaci, Xanthomonas hyacinthi, Xanthomonas melonis, Xanthomonas oryzae, Xanthomonas oryzae pv. oryzae, Xanthomonas oryzae pv. oryzicola, Xanthomonas perforans, Xanthomonas pisi, Xanthomonas populi, Xanthomonas sacchari, Xanthomonas theicola, Xanthomonas translucens, Xanthomonas translucens pv. arrhenatheri, Xanthomonas translucens pv. cerealis, Xanthomonas translucens pv. graminis, Xanthomonas translucens pv. phlei, Xanthomonas translucens pv. phleipratensis, Xanthomonas translucens pv. poae, Xanthomonas translucens pv. secalis, Xanthomonas translucens pv. translucens, Xanthomonas translucens pv. undulosa, Xanthomonas vasicola, Xanthomonas vasicola pv. holcicola, Xanthomonas vesicatoria, Xylella fastidiosa, Xanthomonas fastidiosa subsp. fastidiosa, Xanthomonas fastidiosa subsp. multiplex, Xylophilus ampelinus, Gibbsiella quercinecans, Pantoea citrea, Pantoea cypripedii, Pseudomonas cannabina, Pseudomonas cannabina pv. alisalensis, Pseudomonas cannabina pv. cannabina, Tatumella morbirosei, Tatumella ptyseos, Xanthomonas axonopodis pv. anacardii, Xanthomonas anoxopodis mangiferaeindicae, Xanthomonas axonopodis pv. spondiae, Xanthomonas dyei, Xanthomonas dyei pv. dysoxyli, Xanthomonas dyei pv. eucalypti, Xanthomonas dyei pv. laureliae, Xanthomonas translucen pv. pistaciae.

Other plants, such as *Cotoneaster, Pyracantha, Stranvaesia, Fraxinus, Pyrus, Malus, Capsicum, Cydonia, Crataegus,* and *Soreus* can benefit from the application of the tannin-based agriculturally acceptable formulation. For example: the agriculturally acceptable formulation based on tannins can also be used immediately in plants or trees of the following genera:

*Asparagus officinalis, Alocasia macrorhiza, Acoelorraphe wrightii, Aiphanes aculeata, Archontophoenix alexandrae, Areca catechu, Acer negundo, Acer saccharinum, Arbustus xalapensis, Acasia farmesiana, Alnus acuminata, Aloc barbadensis, Apuntia* spp., *Anthurium andraeanum, Apium graveolens, Avena sativa, Actinidia deliciosa, A. chinensis, A. erguta, Anacardium occidentale, Allium cepa, Allium schoenoprasum, Allium fistulosum, A. ascalonicum, Annona reticulata, Amelanchier alnifolia, A. canadensis, A. laevia, Aronia arbutifolia, A. melanocarpa, Aruncus sylvester, Allium sativum, Allium porrum, Apium graveolens, Arachis hypogaea, Annona squamosa, Annona muricata, Acalypha hispida, Arachis hypogaea, Allium schoeroprassum, Apium graveolens, Allium* spp., *Adianthum* spp, *Brassica oleracea, B. campestris, B. napus, Byrsonima crassifolia, Brassica oleracea, B. oleracea* var. *botrytisBrassica capitate, Begonia argenteo-guttata, Bidens pilosa, Boldoa purpurascens, Bixa orellana, Bucida buceras, Buddleia cordata, Brahea armata, Beta vulgaris, Bougainvillea spectabilis, Bombar emarginatum, Beaucamea recurvata, Bahuinia divaricata, Curcubita moschata, C. maxima, C. pepo, Cucumis melo, Cucumis sativus, Chrysophyllum cainito, Coco nucifera, Carica papaya, Citrus aurantifolia, Citrus limonum, Calocarpum mammosum, Citrus reticulata, Citrullus vulgaris, Citrus aurantium, Citrus sinensis, Crataegus mexicana, Casimiroa edulis, Cucumis sativus, Colocasia esculenta, Cajanus cajan, Chamadorea graminofilia, Caladium* spp., *Chlorophytum comosum, Chysanthemum sinense, Cordyline terminalis, Cycas* spp., *Crocus sativus, Cinnamomum canella wintereana, Castus ruber, Callistephus hortensis, Coriandrum sativum, Coleus blumei, Chysantellum americanum, Casuarina equisetifolia, Cedrela odorata, Ceiba pentandra, Callistemon lanceolatus, Cassia fistula, Magnolia* sp., *Cocos nucifera, Chrysalidocarpus, Cyca circinalis, Cyca revoluta, Cynara cardunculus, C. scolymus, Citrus paradisi, Citrus grandis, Cestrum nocturnus, Chaenomeles japonica, C. lagenaria, Cotoneaster acuminatus, C. Adpressus Bois, C. afinis, C. ambiguus, C. apiculatus, C. ascendens, C. bullatus, C. floribunda, C. buxifolius, C. buxifolius f vellaea, C. commixtus, C. congestus, C. conspicuus, C. dammeri, C. dielsianus, C. divaricatus, C. elegans, C. floccosus, C. foveolatus, C. franchetti, C. frigidus, C. glabratus, C. glaucophyllus, C. harrysmithii, C. henryanus, C. hissarcus, C. ignavus, C. insignia, C. horizontalis, C. khasiensis, C. lacteus, C. laxiflorus, C. lucidus, C. melanocarpus, C. microphyllus, C. moupinensis, C. multiflorus, C. nanshan, C. nitens, C. obscurus, C. obtusus, C. pannosus, C. perpusillus, C. polyanthemus, C. postratus, C. racemiflorus, C. roseus, C. rotundifolius, C. rubens, C. salsifolius, C. siminsii, C. soongoricus, C. spendens, C. sternianus, C. tenuipes, C. tormentosus, C. veitchii, C. villosulus, C. wardii, C. watereri, C, zabelii, Cowania stanburiana, Crataegomespilus dardarii, Crataegus arnoldiana, C. crusgalli, C. douglassi, C. flavellata, C. mollis, C. monogyna, C. oxyacantha, C. pedicellata, C. phaenopyrum, C. punctata, C. succulenta, C. uniflora, Capsicum annuum, Citrus* sp., *Cydonia oblonga, C. sinensis, Carya illinoinensis, Cocos nucifera, Chenopodium ambrosoides, Chamaerops humilis, Chamaedorea elegans, Citrus paradisi-reticulata, Catleya* spp., *Carum carvi, Chrysalidocarpus lutescens, Curcuma longa, Ceratozania mexicana, Caryota urens, Coccothrinax readii, Chamaedorea tepejilote, Coffea arabica, Dryas* sp., *Dianthus caryophyllus, Dieffenbachia* spp., *Dracaena deremensis, Daucus carota, Delonix regia, Dioscorea* spp, *Dypsis decaryi, Dicon espinolosum, Dicon edule, Daucus carota, Dracaena marginata, Delonix regia, Eriobotryajaponica, Exochorda* sp., *Eryobotriajaponica, Echeveria* spp., *Euphorbia pulcherrima, Enterolobium cyclocarpum, Erythrina crista-galli, Elaeis guineensislutences, Eryngium foetidum, Erythrina Americana, Fragaria Xananassa, F. virginiana, Ficus carica, Fraxinus uhdei, Ficus lirata, Fragaria vesca, Ficus benjamina, Ficus retusa, Foeniculum vulgare, Geum* sp., *G. herbaceum, G. barbadense, G. hirstiumlpomoes batatas, Gossypium hirsutum, Glycine max, Geranium* sp., *Gardenia jasminoides, Gladiolus communis, Gerberajamesonii, Guazuma ulmifolia, Grevillea robusta, Howea fosteriana, Hyophorbe lagenicaulis, Hibiscus rosa-sinensis, Helianthus annuus, Hoffmannia ghiresbreghtii, Helychrysum bracteanum, Heteromeles arbutifolia, Holodiscus discolor, Hibiscus elatus, Hyptis suaveolens, Helianthus tuberosus, Hibiscus esculentus, Higrangea macrophylla, Hedychium coronarium, Ixora incarnata, Iris* spp., *Impatiens balsamina, Juglandis nigra, Juglans regia, Justicia pectoralis, Jacaranda mimosifolia, Kageneckia oblonga, Kerriajaponica, Kalanchoe pinnata, Lactuca sativa, Lycopersicon esculentum, Licuala grandis, Licuala peltata, L. paludosa, L. orbicularis, Ligustrum japonicum, Livistona chinensis, Lippia* sp., *Lens culinaris, Liquidambar styraciflua, Lagerstroemia indica, Malpighia punicifolia, Mammea americano, Melicocea bijuga, Mangifera indicaAnanas comosus, Musa paradisiaca, Musa balsisiana, Myrciaria cauliflora, Malus domestica tomanthes tristaneae carpa Malus malus* spp., *Mespillus germanica, Morus alba, Manihot esculenta, Medicago sativa, Monstera* spp., *Murraya paniculata, Mysotis scorpioides, Mejorana hortensis, Mentha arvensis, Mentha nemorosa, Morus alba, Nepholepsis* spp., *Nasturtium officinale, Nerium oleander, Osteomeles anthyllidfolia, Oryza sativa, Olea europea, Ocimum basilicum, Ocimum santum, P. capuli, P. allehaniensis, P. avium, P. besseyi, Prunus armeniaca, P. salicina, P. simonii, P. spinosa, P. triloba, P. mexicana, P. ceracifera, P.*

*dasycarpa, P. domestica, P. fremontii, P. ilicifolia, P. lusitanica, P. mume, P. nigra, Prunus persica, Pyracantha angustifolia, P. atalantioides, P. coccinea, P. crenulata, P. crenulata* var. *kansuensis, P. fortuneana, P. koidzummi, P. rogersiana, P. umbellata, Phaseolus vulgaris, Psidium cattleianum, Photinia deflexa, P. glabra, P. villona, Physocarpus* sp. *Protentilia* sp., *Prinsepia* sp., *Pyrus communis, Pisum sativum, Pistacia vera, Prunus avium, Pachyrhizus erosus, Phyllantus acidus, Philodendron* spp., *Polianthes tuberosa, Pilea rotundifolia, Portulaca pilosa, Parkinsonia aculeata, Phoenix roebelenii, Pilea microphylla, Pimpinella asisum, Piper auritum, Pluchea carolinensis, Populus tremuloides, Populus canadensis, Populus italica, Pithecellobium dulce, Prosopis juliflora, Plumeria rubra, Platanus mexicanus, Phoenix datilifera, Pritchardia pacifica, Phoenix roebelenii, Pandanus utilis, Pastinaca sativa, Persea americana, Pouteria campechiana, Psidium guajaba, Punica granatum, Passiflora laurifolia, Peraphyllum ramossissimum, Pachypodium lamerei, Phoenix canadiensis, Quercus laurina, Quercus mexicana, Quercus rubra, Quercus rugosa, Quercus virginiana, Raphiolepia indica, Rhodotypos scandens, Rosa blanda, R. multiflora, R. rubiginasa, R. rubrifolia, Rubus idaeos, Rheum rhabarbarum, Rumex acetosa, Ravenea rivularis, Rhapis excelsa, Roystonea regia, Rhoeo discolor, Rosmarinus officinalis, Rubus ulmifolius, Rosa* spp, *Rhoeo discolor, Raphanus sativus, Roystonea regia, Rhizophora mangle, Salycopersicum esculentum, Sorbaria* sp., *Sorbus americana, S. aria, S. aucuparia, S. mougeotii, S. occidentalis, S. tianshanica, Spiraea cantoniensis, S. densiflora, S. van houteii, Solanum meolongenaSechium edule, Spinacia olereasa, Scindapsus* spp., *Spathyphyllum wallisii, Schefflera actinophylla, Sedum morganiarum, Sorghum bicolor, Salix bonplandiana, Schinus molle, Schinus terebinthefolius, Salix chilensis, Salix babylonica, Syagrus romanzoffiana, Scheelea liebmannii, Sabal palmetto, Sabal minor, Scorzonera hispanica, Saccharum officinarum, Spondias dulcis, Solanum tuberosum, Sansevieria* spp, *Strelitzia reginae, Tebebuia rosea, Tebebuia donnell-smithiiTamarix gallica, Thrinax radiata, Tragopogon porrifolius, Thuja orientalis, Talinum palicunatum, Tithonia diversofilia, Theobroma cacao, Tripticum aestivum, Tamarindus indica, Terminalia catapa, Ulmus parviflora, Vitis vinifera, Valerianella locusta, Vaccinium myrtillus, Vicia faba, Veitchia merrilli, Vetiveria zizanioides, Veitchia merilli, Verbena domingensis, Weddelia rugosa tenuis, Xanthosoma sugittifollum, Zea mays, Zinnia elegans, Zebrina pendula, Zingonium* spp., *Zanthoxylum pistacifolium, Zingiber cassumunar, Zamia furfuracea*

Without wishing to be bound by theory, it is believed that tannins affect bacteria by actively modifying the environment where they grow, multiply and feed, developing a condition of hyper change.

Tannins react with the bacterial cell membrane and cause the death of the bacterial cell.

Bacteria are divided mainly into two groups (gram negative and gram positive), whose difference lies in the composition of their cell wall. Gram-negative bacteria have a single layer of peptidoglycan and a surface membrane composed of lipoproteins and glycoproteins, while gram-positive bacteria do not have a surface membrane and contain many layers of peptidoglycan, so their thickness is considerable.

The function of the cell wall is to shape and protect the interior of the cell from changes in pressure or exchange of extracellular fluids. This determines the survival of the cell. As mentioned above, the cell wall consists mainly of proteins in their different forms (phosphoproteins, glycoproteins, lipoproteins, and the like). Gram-negative bacteria contain a greater amount of proteins, while gram-positive bacteria on the surface contain teichoic acid, which is formed by glycerol polymers and a few proteins.

For this reason, an organic agriculturally acceptable formulation containing ellagic tannins mainly damages gram-negative bacteria and fungus, and also damages gram-positive bacteria that may be susceptible to the product.

Upon contact of the tannins with the cell wall, the cell wall is lysed and destroyed, and cell survival is compromised due to osmotic pressure and damage by external agents.

EXAMPLES

Some of the tests discussed herein were carried out in a laboratory, and objectively show the bactericidal effect of the presently disclosed agriculturally acceptable formula based on tannins in different concentrations against five genera of bacteria which are the most important that attack plants of economic importance.

For the relevant Examples, phytopathogenic strains, such as *Xanthomonas* sp., *Clavibacter* sp., *Erwinia* sp., *Pseudomonas* sp., and *Ralstonia* sp., were isolated from different fruits and vegetable crops. A mixture for agricultural use was developed in accordance with the following descriptions.

The sensitivity of bacteria to a given formulation was evaluated in petri dishes using a poisoned food method, using agar culture media mixed with the proper amount of the formulation. The poisoned food method is commonly used to evaluate antifungal effects against molds, and the method was modified to test bacteria instead of mold. In the method, the relevant formulation was incorporated into molten agar at a desired final concentration and mixed well. Then, the resulting medium was poured into petri dishes. After overnight pre-incubation, the petri dishes containing the medium were inoculated with the relevant bacteria. After further incubation under suitable conditions for the bacterial strain tested, the positive or negative growth in the control and sample plates was measured. Thus, in brief, this methodology used the agar as a vehicle for the product dose, and after solidification, a very high concentration of bacterial suspension, was inoculated, while leaving a control petri dish inoculated with the same bacterial suspension containing only agar without the formulation.

The respective formulation was mixed with agar to prepare the appropriate concentration for each example. For example, to form a 0.1 grams per liter formulation, 0.1 grams of the formulation was added to 1 liter of agar. It is understood that the results using agar will correspond to the results that would be obtained if using water instead of agar. Thus, the results obtained using agar are understood to correspond to results that would be obtained if water were used as a medium.

Results were measured after 96 hours. The number of bacterial colonies was counted by a technique that is based on counting the "colony forming units," or CFU, present in a gram or milliliter of the sample. It was considered that each colony that develops in the culture medium of choice after a certain incubation time at the appropriate temperature comes from a microorganism, or an aggregate of them, of the sample under study. It was also considered that the microorganism or microorganisms were capable of forming the colony, i.e., that the microorganism(s) is a CFU. To reliably count the colonies, the necessary decimal dilutions of a sample were made before putting it in the culture medium. The most common procedure for the enumeration of bacteria is the viable plate count. In this method, serial dilutions of a sample containing viable microorganisms were plated onto a suitable growth medium. The suspension was either spread onto the surface of agar plates (spread plate method), or was mixed with molten agar, poured into plates, and allowed to solidify (pour plate method). The plates were then incubated under conditions that permitted microbial reproduction so that colonies that could be seen without the aid of a microscope were formed. It was assumed that each bacterial colony arises from an individual cell that has undergone cell division. Therefore, by counting the number of colonies and accounting for the dilution factor, the number of bacteria in the original sample was determined.

For the noted Examples, the results were positive, as discussed below, and showed a bactericide effect in some instances from a dose of 1 or 2 grams per liter, where no bacterial growth was shown, as compared to a control that contained the bacterial suspension without any formulation.

As described below, some mixtures were assigned codes A5, B15, A, and +20. A5 described a composition that included Pre-Mixture A (21.98% by mass), gentamicin sulphate (8.08% by mass), sodium lignosulfonate (4% by mass), naphthalene sulfonate (2% by mass), xanthan gum (0.50% by mass), and diatomaceous earth (63.44% by mass). B15 described a composition that included Pre-Mixture A (21.98% by mass), oxytetracycline (15.69% by mass), sodium lignosulfonate (4% by mass), naphthalene sulfonate (2% by mass), xanthan gum (0.50% by mass), and diatomaceous earth (55.83% by mass). Composition A was a composition containing 20% by mass of Pre-Mixture A, 4% by mass of sodium lignosulfonate, 2% by mass of naphthalene sulfonate, 0.50% by mass fo xanthan gum, and 73.5% by mass of diatomaceous earth. "+20" described a composition that included Pre-Mixture A (21.98% by mass), copper oxychloride (20% by mass), sodium lignosulfonate (4% by mass), naphthalene sulfonate (2% by mass), xanthan gum (0.50% by mass), and diatomaceous earth (51.52% by mass).

In each formulation for the Examples herein, the diatomaceous earth (when used) was sterilized at 200° C. for 2 hours prior to its addition to the formulation.

Premixture

Where indicated, Pre-Mixture A was used. As noted above, Pre-Mixture A contained about 65% tannins (a mixture of about 35.5% castalagin, about 23.3% vascalagin, about 2.0% castalin, and about 5.0% vescalin), about 15% sugars, and about 15% bentonite, with the remainder being water.

Example 1A

The effectiveness of the formulation on *Clavibacter* sp. was tested using different concentrations of the premixture of tannins in the formulations (e.g., 5%, 10%, and 20%) and by applying different concentrations of each formulation.

The formulation containing 5% of the premixture of tannins included a mixture of 5% by mass of Pre-Mixture A and 95% by mass diatomaceous earth (50 grams of tannins per kilogram of the formulation and 950 grams of diatomaceous earth per kilogram of the formulation).

The formulation containing 10% of the premixture of tannins included a mixture of 10% by mass of Pre-Mixture A and 90% by mass diatomaceous earth (100 grams of tannins per kilogram of the formulation and 900 grams of diatomaceous earth per kilogram of the formulation).

The formulation containing 20% of the premixture of tannins that included a mixture of 20% by mass of Pre-Mixture A and 80% by mass diatomaceous earth (200 grams of tannins per kilogram of the formulation and 800 grams of diatomaceous earth per kilogram of the formulation).

FIGS. 1(*a*)-(*c*) show the results when the premixture of tannins was present in the formulation at an amount of 5% by mass. The upper left hand petri dish in each of FIGS. 1(*a*)-(*c*) are the control petri dishes, in which no formulation was applied. FIG. 1(*a*) shows results when the formulation containing 5% by mass of the premixture of tannins was administered in a solution containing 0.1 g/L, 0.2 g/L, and 0.3 g/L of the formulation. FIG. 1(*b*) shows results when the formulation containing 5% by mass of the premixture of tannins was administered in a solution containing 0.4 g/L, 0.5 g/L, and 1.0 g/L of the formulation. FIG. 1(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 1(*a*)-(*c*).

TABLE 1

| Sample | CFU's |
|---|---|
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | >250 |
| 2 g/L | >250 |
| 4 g/L | None visible |
| 6 g/L | None visible |

As can be seen from FIGS. 1(*a*)-(*c*), effective doses of the 5% formulation in this test were deemed to be 4 g/L and 6 g/L, which were the concentrations at which the *Clavibacter* sp. grew at a much lower rate than the control. In the 4 g/L and 6 g/L concentrations, the *Clavibacter* sp. was not visibly present, and hence did not grow in the agar.

FIGS. 2(*a*)-(*c*) show the results when the tannins were present in the formulation at an amount of 10% by mass of the premixture. The upper left hand petri dish in each of FIGS. 2(*a*)-(*c*) are the control petri dishes, in which no formulation was applied. FIG. 2(*a*) shows results when the formulation containing 10% by mass of the premixture of tannins was administered in a solution containing 0.1 g/L, 0.2 g/L, and 0.3 g/L of the formulation. FIG. 2(*b*) shows results when the formulation containing 10% by mass of the premixture of tannins was administered in a solution containing 0.4 g/L, 0.5 g/L, and 1.0 g/L of the formulation. FIG. 2(*c*) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 2(*a*)-(*c*).

TABLE 2

| Sample | CFU's |
|---|---|
| Control | >250 |
| 0.1 g/L | >250 |
| 0.2 g/L | >250 |
| 0.3 g/L | >250 |

TABLE 2-continued

| Sample | CFU's |
| --- | --- |
| 0.4 g/L | >250 |
| 0.5 g/L | >250 |
| 1.0 g/L | None visible |
| 2 g/L | None visible |
| 4 g/L | None visible |
| 6 g/L | None visible |

Figures 2A, 2B, 2C:
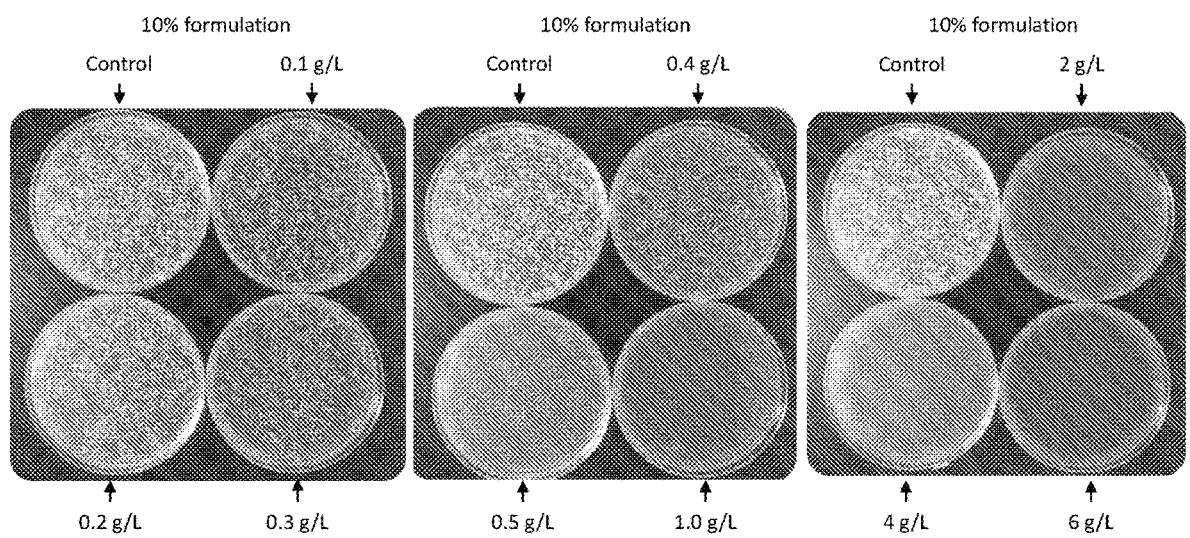
FIGS. 2(a)-(c) show the results when a mixture containing 10% of a premixture of tannins was tested against *Clavibacter* sp.
Figures 3A, 3B, 3C:
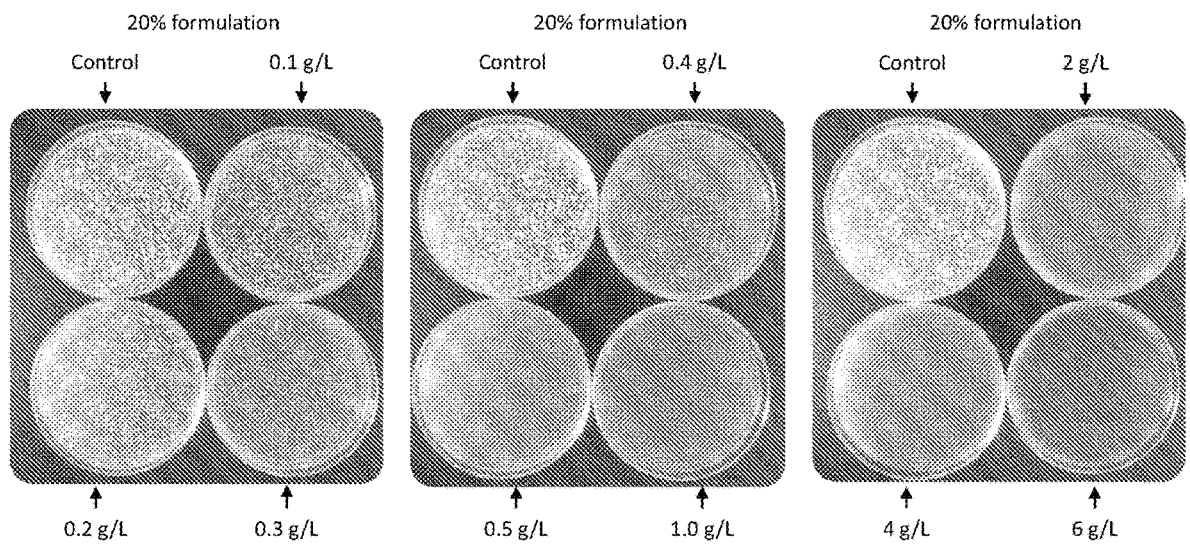
FIGS. 3(a)-(c) show the results when a mixture containing 20% of a premixture of tannins was tested against *Clavibacter* sp.
Figures 4A, 4B, 4C:
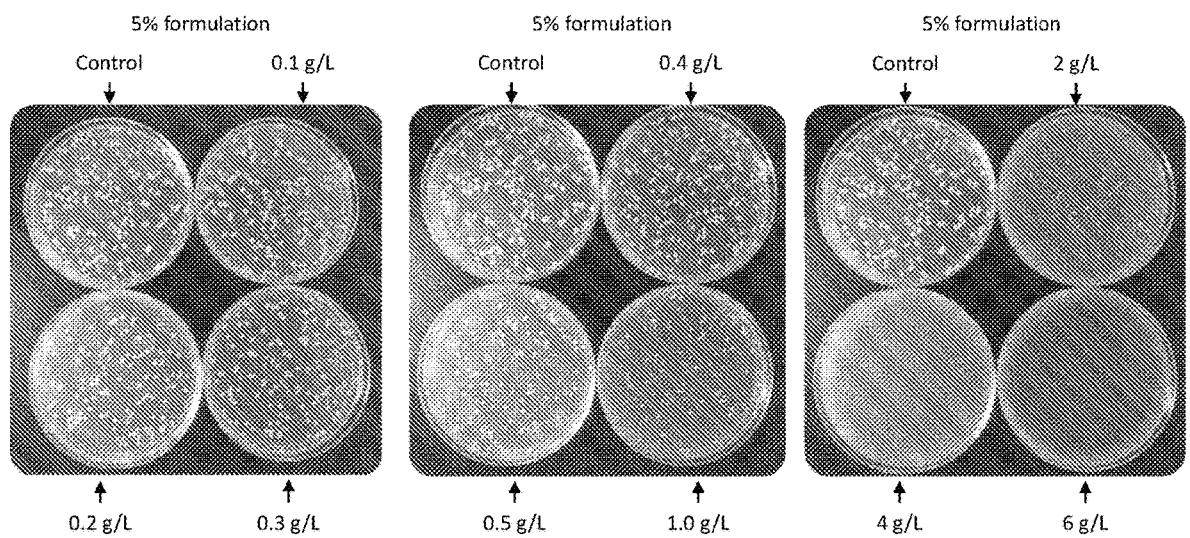
FIGS. 4(a)-(c) show the results when a mixture containing 5% of a premixture of tannins was tested against *Clavibacter* sp.
Figure 5A:
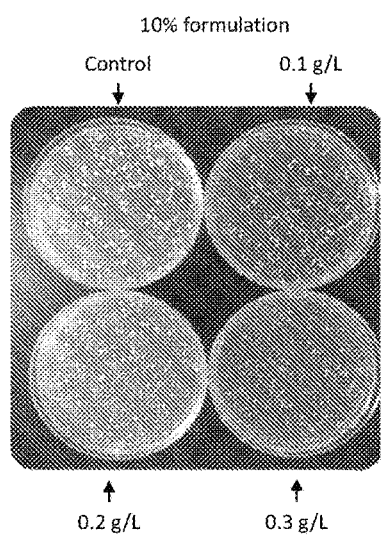
FIGS. 5(a)-(c) show the results when a mixture containing 10% of a premixture of tannins was tested against *Clavibacter* sp.
Figure 5B:
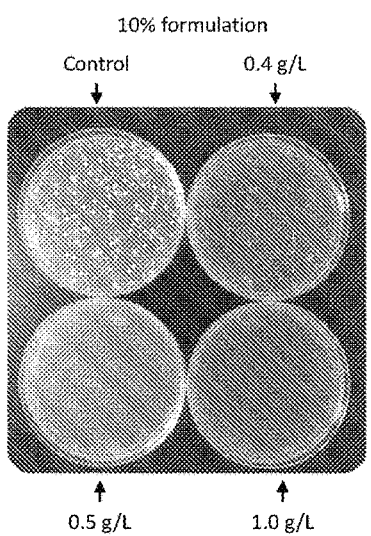
Figure 5C:
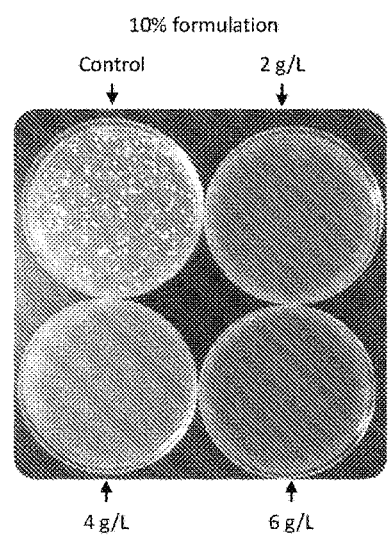

As can be seen from FIGS. 2(a)-(c), effective doses of the 10% formulation in this test were deemed to be 1 g/L, 2 g/L, 4 g/L, and 6 g/L, which were the concentrations at which the *Clavibacter* sp. grew at a much lower rate than the control. In the 1 g/L, 2 g/L, 4 g/L, and 6 g/L concentrations, the *Clavibacter* sp. was not visibly present, and hence did not grow in the agar.

FIGS. 3(*a*)-(*c*) show the results when the premixture of tannins were present in the formulation at an amount of 20% by mass. The upper left hand petri dish in each of FIGS. 3(*a*)-(*c*) are the control petri dishes, in which no formulation was applied. FIG. 3(*a*) shows results when the formulation containing 20% by mass of the premixture of tannins was administered in a solution containing 0.1 g/L, 0.2 g/L, and 0.3 g/L of the formulation. FIG. 3(*b*) shows results when the formulation containing 20% by mass of the premixture of tannins was administered in a solution containing 0.4 g/L, 0.5 g/L, and 1.0 g/L of the formulation. FIG. 3(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 3(*a*)-(*c*).

TABLE 3

| Sample | CFU's |
|---|---|
| Control | >250 |
| 0.1 g/L | >250 |
| 0.2 g/L | >250 |
| 0.3 g/L | >250 |
| 0.4 g/L | >250 |
| 0.5 g/L | None visible |
| 1.0 g/L | None visible |
| 2 g/L | None visible |
| 4 g/L | None visible |
| 6 g/L | None visible |

As can be seen from FIGS. 3(*a*)-(*c*), effective doses of the 20% formulation in this test were deemed to be 0.5 g/L, 1 g/L, 2 g/L, 4 g/L, and 6 g/L, which were the concentrations at which the *Clavibacter* sp. grew at a much lower rate than the control. In the 0.5 g/L, 1 g/L, 2 g/L, 4 g/L, and 6 g/L concentrations, the *Clavibacter* sp. was not visibly present, and hence did not grow in the agar.

Example 1B

Example 1A was reproduced with the exception that the bacteria added to the agar was diluted. In Example 1A, the bacteria that was added to the agar was obtained from a bacterial broth. For this Example, the bacteria added to the agar was obtained by diluting 1 mL of the bacterial broth used in Example 1A in 9 mL of saline solution, thereby forming a first diluted bacterial solution.

FIGS. 4(*a*)-(*c*) show the results when the tannins were present in the formulation at an amount of 5% by mass of the premixture. The upper left hand petri dish in each of FIGS. 4(*a*)-(*c*) are the control petri dishes, in which no formulation was applied. FIG. 4(*a*) shows results when the formulation containing 5% by mass of the premixture of tannins was administered in a solution containing 0.1 g/L, 0.2 g/L, and 0.3 g/L of the formulation. FIG. 4(*b*) shows results when the formulation containing 5% by mass of the premixture of tannins was administered in a solution containing 0.4 g/L, 0.5 g/L, and 1.0 g/L of the formulation. FIG. 4(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 4(*a*)-(*c*).

TABLE 4

| Sample | CFU's |
|---|---|
| Control | 173 |
| 0.1 g/L | 152 |
| 0.2 g/L | 129 |
| 0.3 g/L | 145 |
| 0.4 g/L | 198 |
| 0.5 g/L | 147 |
| 1.0 g/L | 124 |
| 2 g/L | 141 |
| 4 g/L | None visible |
| 6 g/L | None visible |

As can be seen from FIGS. 4(*a*)-(*c*), effective doses of the 5% formulation in this test were deemed to be 4 g/L and 6 g/L, which were the concentrations at which the *Clavibacter* sp. grew at a much lower rate than the control. In the 4 g/L and 6 g/L concentrations, the *Clavibacter* sp. was not visibly present, and hence did not grow in the agar.

FIGS. 5(*a*)-(*c*) show the results when the tannins were present in the formulation at an amount of 10% by mass of the premixture. The upper left hand petri dish in each of FIGS. 5(*a*)-(*c*) are the control petri dishes, in which no formulation was applied. FIG. 5(*a*) shows results when the formulation containing 10% by mass of the premixture of tannins was administered in a solution containing 0.1 g/L, 0.2 g/L, and 0.3 g/L of the formulation. FIG. 5(*b*) shows results when the formulation containing 10% by mass of the premixture of tannins was administered in a solution containing 0.4 g/L, 0.5 g/L, and 1.0 g/L of the formulation. FIG. 5(*c*) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 5(*a*)-(*c*).

TABLE 5

| Sample | CFU's |
|---|---|
| Control | 217 |
| 0.1 g/L | 253 |
| 0.2 g/L | 198 |
| 0.3 g/L | 241 |
| 0.4 g/L | 243 |
| 0.5 g/L | None visible |
| 1.0 g/L | None visible |
| 2 g/L | None visible |
| 4 g/L | None visible |
| 6 g/L | None visible |

As can be seen from FIGS. 5(*a*)-(*c*), effective doses of the 10% formulation in this test were deemed to be 1.0 g/L, 2 g/L, 4 g/L, and 6 g/L, which were the concentrations at which the *Clavibacter* sp. grew at a much lower rate than the control. In the 1.0 g/L, 2 g/L, 4 g/L, and 6 g/L concentrations, the *Clavibacter* sp. was not visibly present, and hence did not grow in the agar.

Figure 6A:
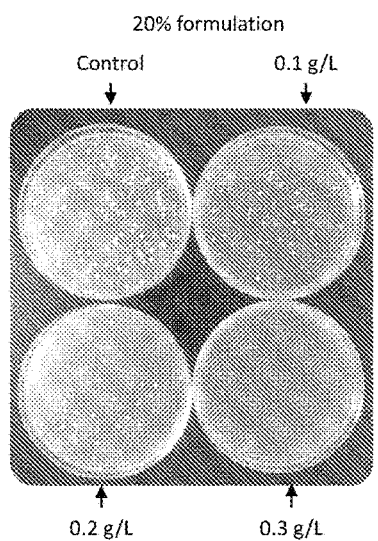
FIGS. 6(a)-(c) show the results when a mixture containing 20% of a premixture of tannins was tested against *Clavibacter* sp.
Figure 6B:
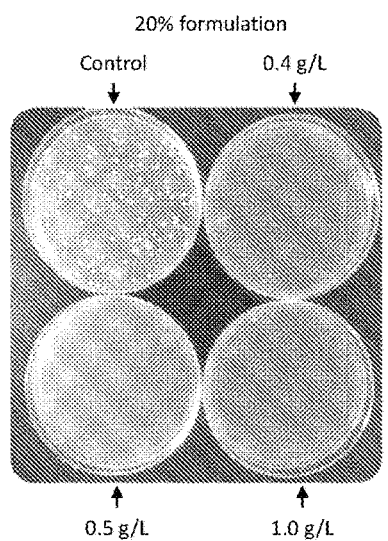
Figure 6C:
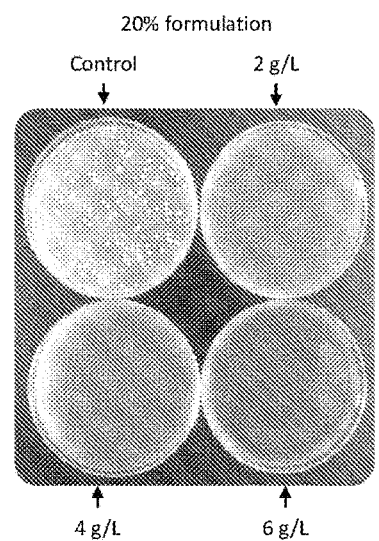
Figures 7A, 7B, 7C:
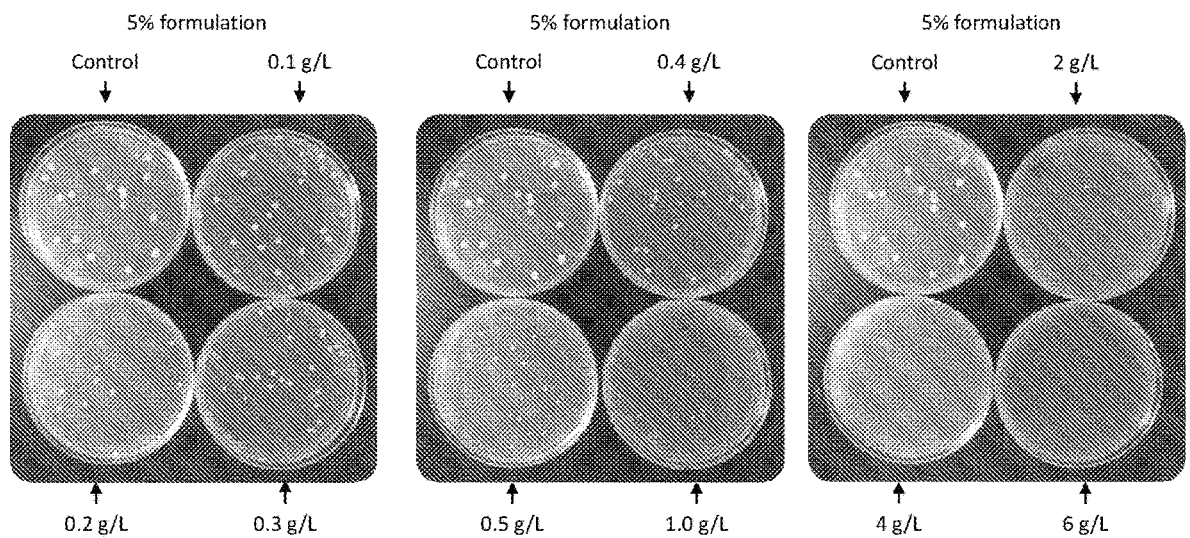
FIGS. 7(a)-(c) show the results when a mixture containing 5% of a premixture of tannins was tested against *Clavibacter* sp.
Figures 8A, 8B, 8C:
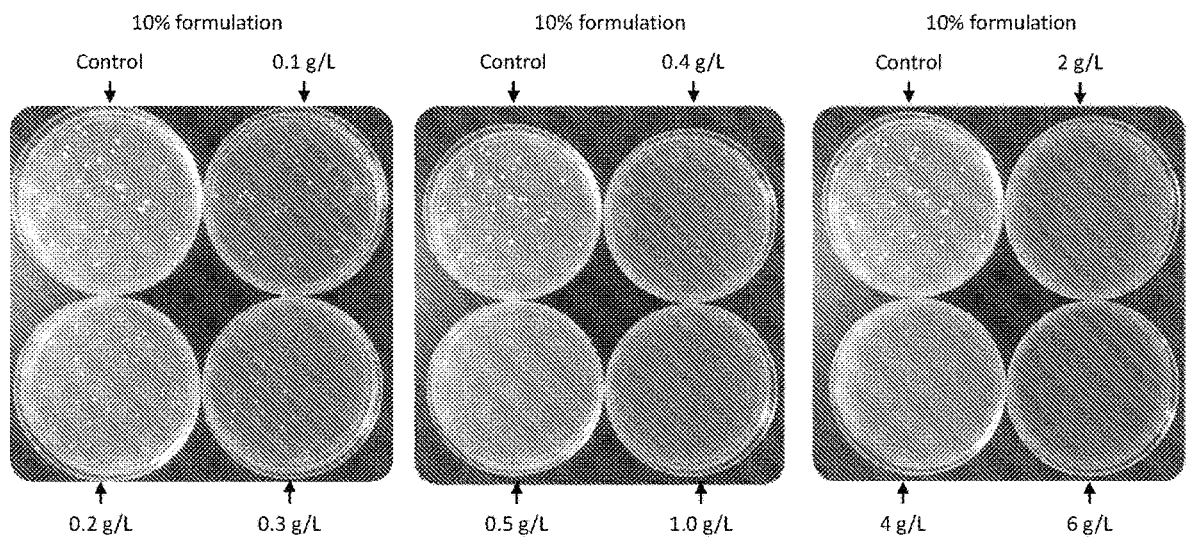
FIGS. 8(a)-(c) show the results when a mixture containing 10% of a premixture of tannins was tested against *Clavibacter* sp.

FIGS. 6(*a*)-(*c*) show the results when the tannins were present in the formulation at an amount of 20% by mass of the premixture. The upper left hand petri dish in each of FIGS. 6(*a*)-(*c*) are the control petri dishes, in which no formulation was applied. FIG. 6(*a*) shows results when the formulation containing 20% by mass of the premixture of tannins was administered in a solution containing 0.1 g/L, 0.2 g/L, and 0.3 g/L of the formulation. FIG. 6(*b*) shows results when the formulation containing 20% by mass of the premixture of tannins was administered in a solution containing 0.4 g/L, 0.5 g/L, and 1.0 g/L of the formulation. FIG. 6(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 6(*a*)-(*c*).

TABLE 6

| Sample | CFU's |
|---|---|
| Control | 146 |
| 0.1 g/L | 140 |
| 0.2 g/L | 135 |
| 0.3 g/L | 145 |
| 0.4 g/L | None visible |
| 0.5 g/L | None visible |
| 1.0 g/L | None visible |
| 2 g/L | None visible |
| 4 g/L | None visible |
| 6 g/L | None visible |

As can be seen from FIGS. 6(*a*)-(*c*), effective doses of the 20% formulation in this test were deemed to be 0.4 g/L, 0.5 g/L, 1.0 g/L, 2 g/L, 4 g/L, and 6 g/L, which were the concentrations at which the *Clavibacter* sp. grew at a much lower rate than the control. In the 0.4 g/L, 0.5 g/L, 1.0 g/L, 2 g/L, 4 g/L, and 6 g/L concentrations, the *Clavibacter* sp. was not visibly present, and hence did not grow in the agar.

Example 1C

Example 1A was reproduced with the exception that the bacteria added to the agar was diluted. For this Example, the bacteria added to the agar was obtained by adding 1 mL of the first diluted bacterial solution of Example 1B to 9 mL of saline solution, thereby forming a second diluted bacterial solution.

FIGS. 7(*a*)-(*c*) show the results when the tannins were present in the formulation at an amount of 5% by mass of the premixture. The upper left hand petri dish in each of FIGS. 7(*a*)-(*c*) are the control petri dishes, in which no formulation was applied. FIG. 7(*a*) shows results when the formulation containing 5% by mass of the premixture of tannins was administered in a solution containing 0.1 g/L, 0.2 g/L, and 0.3 g/L of the formulation. FIG. 7(*b*) shows results when the formulation containing 5% by mass of the premixture of tannins was administered in a solution containing 0.4 g/L, 0.5 g/L, and 1.0 g/L of the formulation. FIG. 7(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 7(*a*)-(*c*).

TABLE 7

| Sample | CFU's |
|---|---|
| Control | 18 |
| 0.1 g/L | 15 |
| 0.2 g/L | 13 |
| 0.3 g/L | 17 |
| 0.4 g/L | 23 |
| 0.5 g/L | 22 |
| 1.0 g/L | 24 |
| 2 g/L | 12 |
| 4 g/L | None visible |
| 6 g/L | None visible |

As can be seen from FIGS. 7(*a*)-(*c*), effective doses of the 5% formulation in this test were deemed to be 4 g/L and 6 g/L, which were the concentrations at which the *Clavibacter* sp. grew at a much lower rate than the control. In the 4 g/L and 6 g/L concentrations, the *Clavibacter* sp. was not visibly present, and hence did not grow in the agar.

FIGS. 8(*a*)-(*c*) show the results when the tannins were present in the formulation at an amount of 10% by mass of the premixture. The upper left hand petri dish in each of FIGS. 8(*a*)-(*c*) are the control petri dishes, in which no formulation was applied. FIG. 8(*a*) shows results when the formulation containing 10% by mass of the premixture of tannins was administered in a solution containing 0.1 g/L, 0.2 g/L, and 0.3 g/L of the formulation. FIG. 8(*b*) shows results when the formulation containing 10% by mass of the premixture of tannins was administered in a solution containing 0.4 g/L, 0.5 g/L, and 1.0 g/L of the formulation. FIG. 8(*c*) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 8(*a*)-(*c*).

TABLE 8

| Sample | CFU's |
|---|---|
| Control | 31 |
| 0.1 g/L | 26 |
| 0.2 g/L | 30 |
| 0.3 g/L | 37 |
| 0.4 g/L | 35 |
| 0.5 g/L | None visible |
| 1.0 g/L | None visible |
| 2 g/L | None visible |
| 4 g/L | None visible |
| 6 g/L | None visible |

As can be seen from FIGS. 8(*a*)-(*c*), effective doses of the 10% formulation in this test were deemed to be 0.5 g/L, 1.0 g/L, 2 g/L, 4 g/L, and 6 g/L, which were the concentrations at which the *Clavibacter* sp. grew at a much lower rate than the control. In the 0.5 g/L, 1.0 g/L, 2 g/L, 4 g/L, and 6 g/L concentrations, the *Clavibacter* sp. was not visibly present, and hence did not grow in the agar.

FIGS. 9(*a*)-(*c*) show the results when the tannins were present in the formulation at an amount of 20% by mass of the premixture. The upper left hand petri dish in each of FIGS. 9(*a*)-(*c*) are the control petri dishes, in which no formulation was applied. FIG. 9(*a*) shows results when the formulation containing 20% by mass of the premixture of tannins was administered in a solution containing 0.1 g/L, 0.2 g/L, and 0.3 g/L of the formulation. FIG. 9(*b*) shows results when the formulation containing 20% by mass of the premixture of tannins was administered in a solution containing 0.4 g/L, 0.5 g/L, and 1.0 g/L of the formulation. FIG. 9(c) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 9(a)-(c).

TABLE 9

| Sample | CFU's |
|---|---|
| Control | 27 |
| 0.1 g/L | 23 |
| 0.2 g/L | 21 |
| 0.3 g/L | 12 |
| 0.4 g/L | None visible |
| 0.5 g/L | None visible |
| 1.0 g/L | None visible |
| 2 g/L | None visible |
| 4 g/L | None visible |
| 6 g/L | None visible |

Figure 9A:
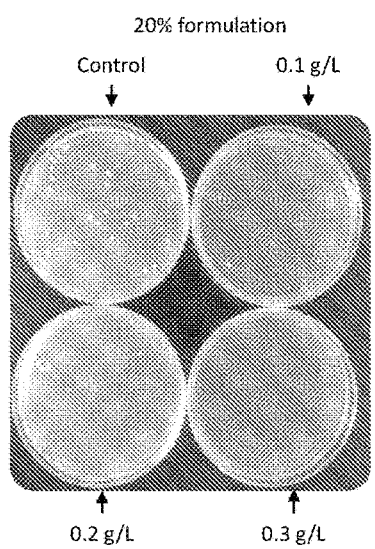
FIGS. 9(a)-(c) show the results when a mixture containing 20% of a premixture of tannins was tested against *Clavibacter* sp.
Figure 9B:
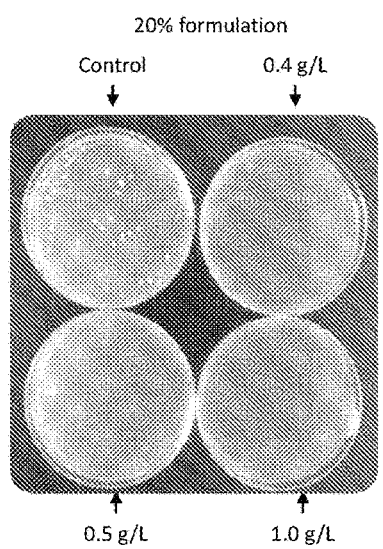
Figure 9C:
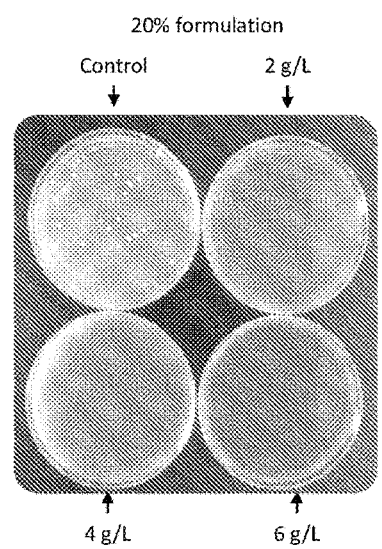
Figures 10A, 10B, 10C:
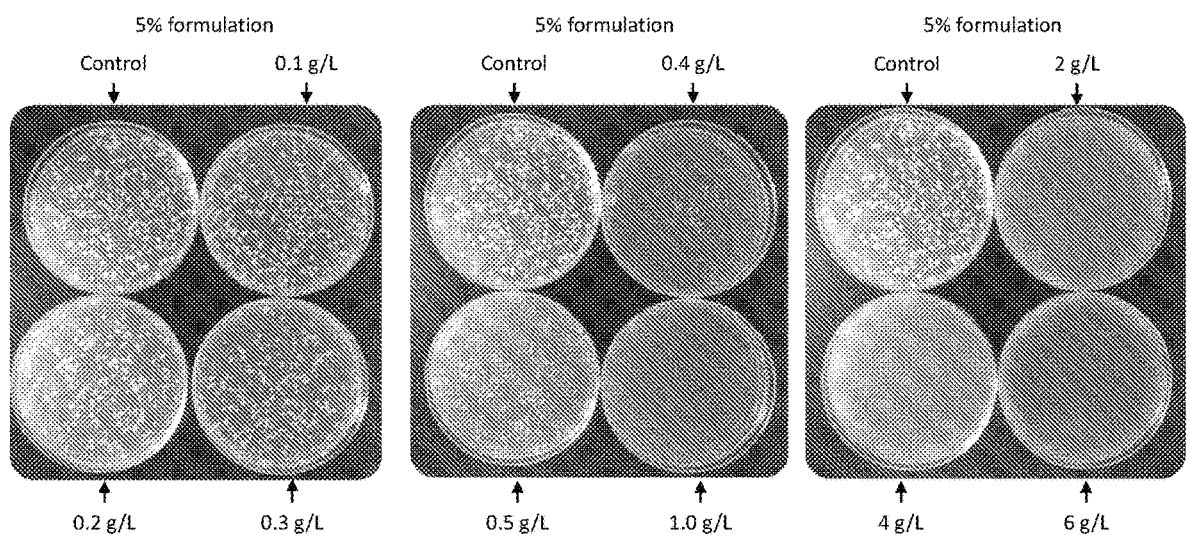
FIGS. 10(a)-(c) show the results when a mixture containing 5% of a premixture of tannins was tested against *Erwinia* sp.
Figures 11A, 11B, 11C:
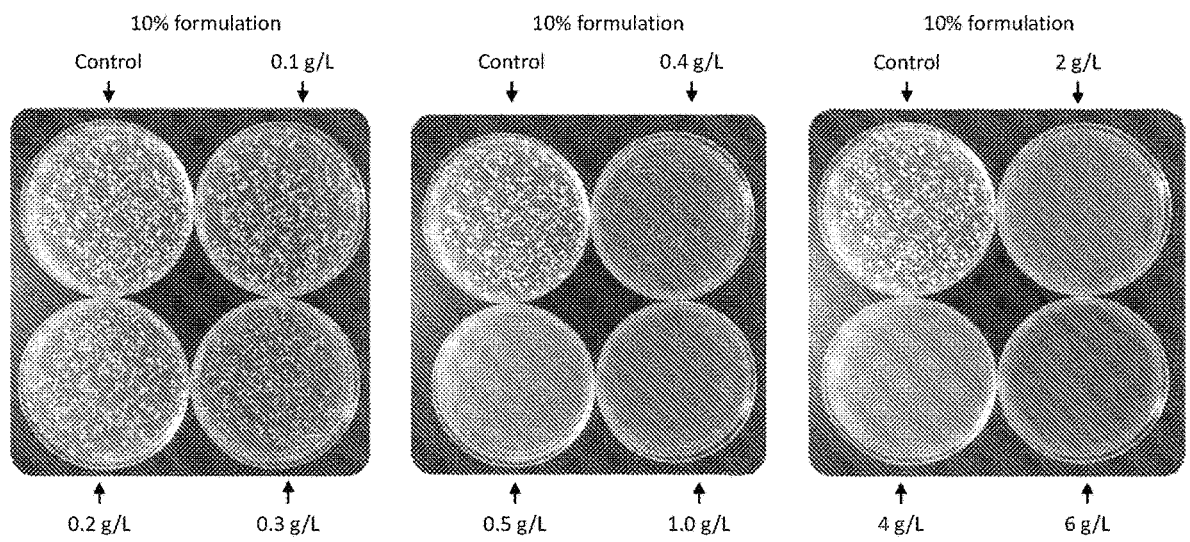
FIGS. 11(a)-(c) show the results when a mixture containing 10% of a premixture of tannins was tested against *Erwinia* sp.

As can be seen from FIGS. 9(a)-(c), effective doses of the 20% formulation in this test were deemed to be 0.4 g/L, 0.5 g/L, 1.0 g/L, 2 g/L, 4 g/L, and 6 g/L, which were the concentrations at which the *Clavibacter* sp. grew at a much lower rate than the control. In the 0.4 g/L, 0.5 g/L, 1.0 g/L, 2 g/L, 4 g/L, and 6 g/L concentrations, the *Clavibacter* sp. was not visibly present, and hence did not grow in the agar.

Example 2A

The effectiveness of the formulation on *Erwinia* sp. was tested in the same manner as Example 1A, with the exception that *Erwinia* sp. was the bacteria.

FIGS. 10(*a*)-(*c*) show the results when the tannins were present in the formulation at an amount of 5% by mass of the premixture. The upper left hand petri dish in each of FIGS. 10(*a*)-(*c*) are the control petri dishes, in which no formulation was applied. FIG. 10(*a*) shows results when the formulation containing 5% by mass of the premixture of tannins was administered in a solution containing 0.1 g/L, 0.2 g/L, and 0.3 g/L of the formulation. FIG. 10(*b*) shows results when the formulation containing 5% by mass of the premixture of tannins was administered in a solution containing 0.4 g/L, 0.5 g/L, and 1.0 g/L of the formulation. FIG. 10(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 10(*a*)-(*c*).

TABLE 10

| Sample | CFU's |
|---|---|
| Control | 210 |
| 0.1 g/L | 240 |
| 0.2 g/L | 240 |
| 0.3 g/L | 230 |
| 0.4 g/L | 110 |
| 0.5 g/L | 250 |
| 1.0 g/L | None visible |
| 2 g/L | None visible |
| 4 g/L | None visible |
| 6 g/L | None visible |

As can be seen from FIGS. 10(*a*)-(*c*), effective doses of the 5% formulation in this test were deemed to be 1.0 g/L, 2 g/L, 4 g/L, and 6 g/L, which were the concentrations at which the *Erwinia* sp. grew at a much lower rate than the control. In the 1.0 g/L, 2 g/L, 4 g/L, and 6 g/L concentrations, the *Erwinia* sp. was not visibly present, and hence did not grow in the agar.

FIGS. 11(*a*)-(*c*) show the results when the tannins were present in the formulation at an amount of 10% by mass of the premixture. The upper left hand petri dish in each of FIGS. 11(*a*)-(*c*) are the control petri dishes, in which no formulation was applied. FIG. 11*l*(a) shows results when the formulation containing 10% by mass of the premixture of tannins was administered in a solution containing 0.1 g/L, 0.2 g/L, and 0.3 g/L of the formulation. FIG. 11(*b*) shows results when the formulation containing 10% by mass of the premixture of tannins was administered in a solution containing 0.4 g/L, 0.5 g/L, and 1.0 g/L of the formulation. FIG. 11(*c*) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 11(*a*)-(*c*).

TABLE 11

| Sample | CFU's |
|---|---|
| Control | >250 |
| 0.1 g/L | >250 |
| 0.2 g/L | >250 |
| 0.3 g/L | >250 |
| 0.4 g/L | >250 |
| 0.5 g/L | None visible |
| 1.0 g/L | None visible |
| 2 g/L | None visible |
| 4 g/L | None visible |
| 6 g/L | None visible |

As can be seen from FIGS. 11(*a*)-(*c*), effective doses of the 10% formulation in this test were deemed to be 0.5 g/L, 1.0 g/L, 2 g/L, 4 g/L, and 6 g/L, which were the concentrations at which the *Erwinia* sp. grew at a much lower rate than the control. In the 0.5 g/L, 1.0 g/L, 2 g/L, 4 g/L, and 6 g/L concentrations, the *Erwinia* sp. was not visibly present, and hence did not grow in the agar.

FIGS. 12(*a*)-(*c*) show the results when the tannins were present in the formulation at an amount of 20% by mass of the premixture. The upper left hand petri dish in each of FIGS. 12(*a*)-(*c*) are the control petri dishes, in which no formulation was applied. FIG. 12(*a*) shows results when the formulation containing 20% by mass of the premixture of tannins was administered in a solution containing 0.1 g/L, 0.2 g/L, and 0.3 g/L of the formulation. FIG. 12(*b*) shows results when the formulation containing 20% by mass of the premixture of tannins was administered in a solution containing 0.4 g/L, 0.5 g/L, and 1.0 g/L of the formulation. FIG. 12(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 12(*a*)-(*c*).

TABLE 12

| Sample | CFU's |
|---|---|
| Control | >250 |
| 0.1 g/L | >250 |
| 0.2 g/L | None visible |

TABLE 12-continued

| Sample | CFU's |
| --- | --- |
| 0.3 g/L | None visible |
| 0.4 g/L | None visible |
| 0.5 g/L | None visible |
| 1.0 g/L | None visible |
| 2 g/L | None visible |
| 4 g/L | None visible |
| 6 g/L | None visible |

Figures 12A, 12B, 12C:
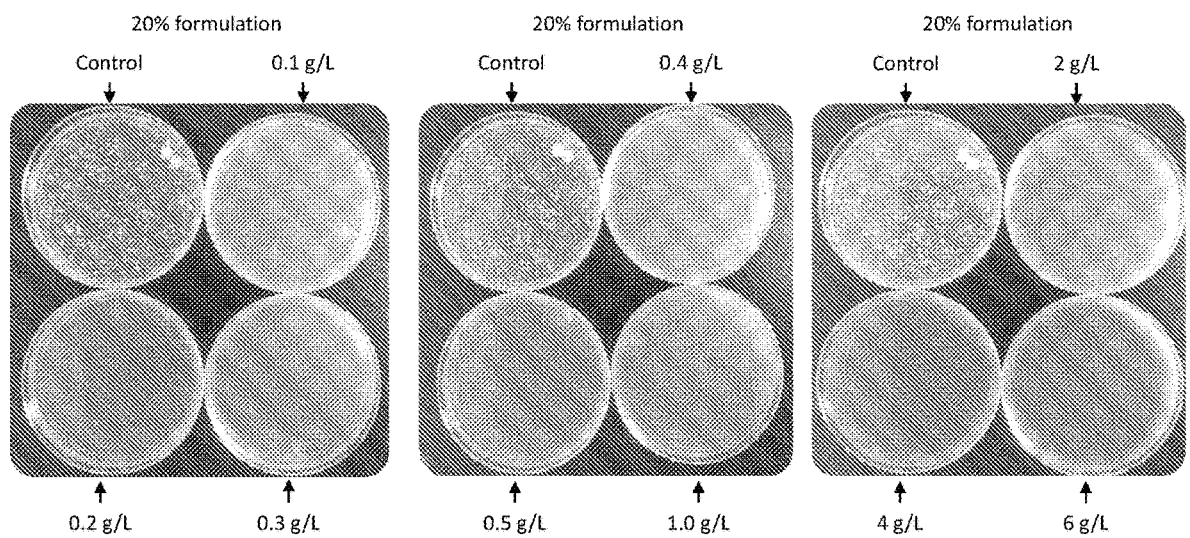
FIGS. 12(a)-(c) show the results when a mixture containing 20% of a premixture of tannins was tested against *Erwinia* sp.

As can be seen from FIGS. 12(a)-(c), effective doses of the 20% formulation in this test were deemed to be 0.2 g/L, 0.3 g/L, 0.4 g/L, 0.5 g/L, 1.0 g/L, 2 g/L, 4 g/L, and 6 g/L, which were the concentrations at which the *Erwinia* sp. grew at a much lower rate than the control. In the 0.2 g/L, 0.3 g/L, 0.4 g/L, 0.5 g/L, 1.0 g/L, 2 g/L, 4 g/L, and 6 g/L concentrations, the *Erwinia* sp. was not visibly present, and hence did not grow in the agar.

Example 2B

The conditions of Example 1B were reproduced, with the exception that *Erwinia* sp. was the bacteria.

Figure 13A:
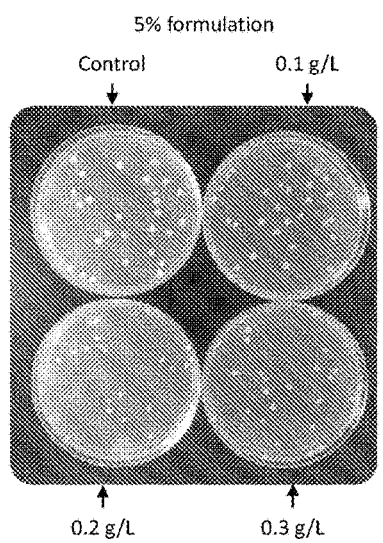
FIGS. 13(a)-(c) show the results when a mixture containing 5% of a premixture of tannins was tested against *Erwinia* sp.
Figure 13B:
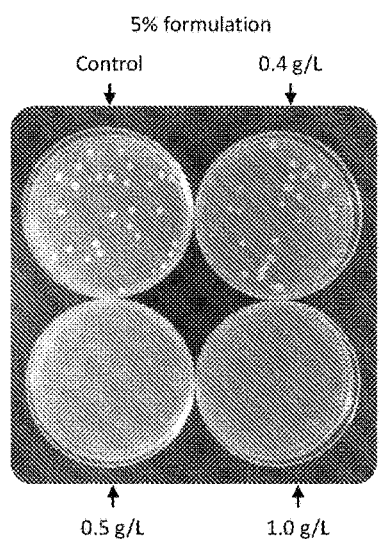
Figure 13C:
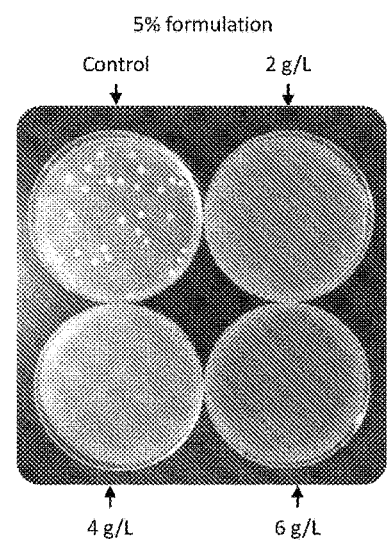

FIGS. 13(a)-(c) show the results when the tannins were present in the formulation at an amount of 5% by mass of the premixture. The upper left hand petri dish in each of FIGS. 13(a)-(c) are the control petri dishes, in which no formulation was applied. FIG. 13(a) shows results when the formulation containing 5% by mass of the premixture of tannins was administered in a solution containing 0.1 g/L, 0.2 g/L, and 0.3 g/L of the formulation. FIG. 13(b) shows results when the formulation containing 5% by mass of the premixture of tannins was administered in a solution containing 0.4 g/L, 0.5 g/L, and 1.0 g/L of the formulation. FIG. 13(c) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 13(a)-(c).

TABLE 13

| Sample | CFU's |
| --- | --- |
| Control | 31 |
| 0.1 g/L | 35 |
| 0.2 g/L | 22 |
| 0.3 g/L | 22 |
| 0.4 g/L | 27 |
| 0.5 g/L | None visible |
| 1.0 g/L | None visible |
| 2 g/L | None visible |
| 4 g/L | None visible |
| 6 g/L | None visible |

As can be seen from FIGS. 13(a)-(c), effective doses of the 5% formulation in this test were deemed to be 0.5 g/L, 1.0 g/L, 2 g/L, 4 g/L, and 6 g/L, which were the concentrations at which the *Erwinia* sp. grew at a much lower rate than the control. In the 0.5 g/L, 1.0 g/L, 2 g/L, 4 g/L, and 6 g/L concentrations, the *Erwinia* sp. was not visibly present, and hence did not grow in the agar.

Figure 14A:
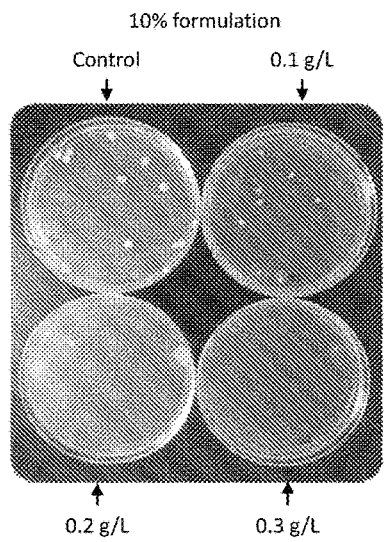
FIGS. 14(a)-(c) show the results when a mixture containing 10% of a premixture of tannins was tested against *Erwinia* sp.
Figure 14B:
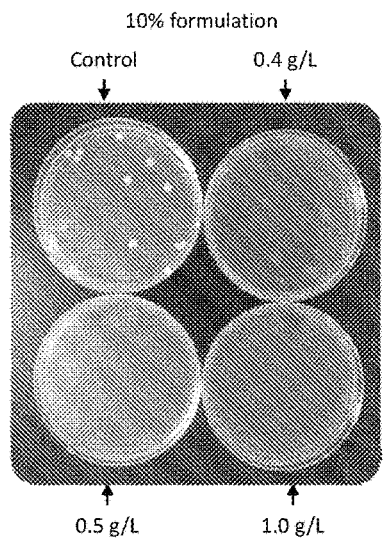
Figure 14C:
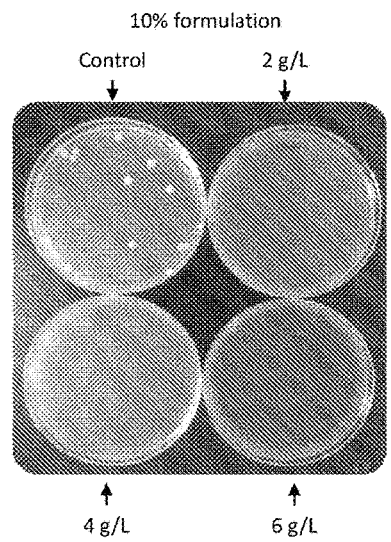

FIGS. 14(a)-(c) show the results when the tannins were present in the formulation at an amount of 10% by mass of the premixture. The upper left hand petri dish in each of FIGS. 14(a)-(c) are the control petri dishes, in which no formulation was applied. FIG. 14(a) shows results when the formulation containing 10% by mass of the premixture of tannins was administered in a solution containing 0.1 g/L, 0.2 g/L, and 0.3 g/L of the formulation. FIG. 14(b) shows results when the formulation containing 10% by mass of the premixture of tannins was administered in a solution containing 0.4 g/L, 0.5 g/L, and 1.0 g/L of the formulation. FIG. 14(c) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 14(a)-(c).

TABLE 14

| Sample | CFU's |
| --- | --- |
| Control | 11 |
| 0.1 g/L | 7 |
| 0.2 g/L | 7 |
| 0.3 g/L | 7 |
| 0.4 g/L | None visible |
| 0.5 g/L | None visible |
| 1.0 g/L | None visible |
| 2 g/L | None visible |
| 4 g/L | None visible |
| 6 g/L | None visible |

As can be seen from FIGS. 14(a)-(c), effective doses of the 10% formulation in this test were deemed to be 0.4 g/L, 0.5 g/L, 1.0 g/L, 2 g/L, 4 g/L, and 6 g/L, which were the concentrations at which the *Erwinia* sp. grew at a much lower rate than the control. In the 0.4 g/L, 0.5 g/L, 1.0 g/L, 2 g/L, 4 g/L, and 6 g/L concentrations, the *Erwinia* sp. was not visibly present, and hence did not grow in the agar.

Figures 15A, 15B, 15C:
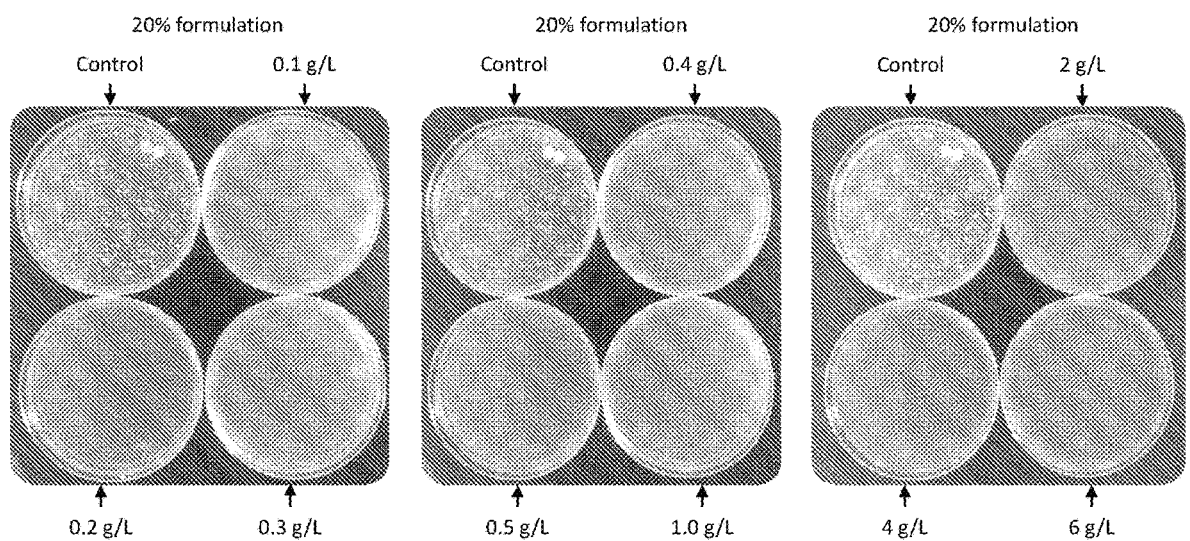
FIGS. 15(a)-(c) show the results when a mixture containing 20% of a premixture of tannins was tested against *Erwinia* sp.

FIGS. 15(a)-(c) show the results when the tannins were present in the formulation at an amount of 20% by mass of the premixture. The upper left hand petri dish in each of FIGS. 15(a)-(c) are the control petri dishes, in which no formulation was applied. FIG. 15(a) shows results when the formulation containing 20% by mass of the premixture of tannins was administered in a solution containing 0.1 g/L, 0.2 g/L, and 0.3 g/L of the formulation. FIG. 15(b) shows results when the formulation containing 20% by mass of the premixture of tannins was administered in a solution containing 0.4 g/L, 0.5 g/L, and 1.0 g/L of the formulation. FIG. 15(c) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 15(a)-(c).

TABLE 15

| Sample | CFU's |
| --- | --- |
| Control | >250 |
| 0.1 g/L | None visible |
| 0.2 g/L | None visible |
| 0.3 g/L | None visible |
| 0.4 g/L | None visible |
| 0.5 g/L | None visible |
| 1.0 g/L | None visible |
| 2 g/L | None visible |
| 4 g/L | None visible |
| 6 g/L | None visible |

As can be seen from FIGS. 15(a)-(c), effective doses of the 20% formulation in this test were deemed to be 0.1 g/L, 0.2 g/L, 0.3 g/L, 0.4 g/L, 0.5 g/L, 1.0 g/L, 2 g/L, 4 g/L, and 6 g/L, which were the concentrations at which the *Erwinia* sp. grew at a much lower rate than the control. In the 0.1 g/L, 0.2 g/L, 0.3 g/L, 0.4 g/L, 0.5 g/L, 1.0 g/L, 2 g/L, 4 g/L, and 6 g/L concentrations, the *Erwinia* sp. was not visibly present, and hence did not grow in the agar.

Example 3A

The effectiveness of the formulation on *Pseudomonas* sp. was tested in the same manner as Example 1A, with the exception that *Pseudomonas* sp. was the bacteria.

Figures 16A, 16B, 16C:
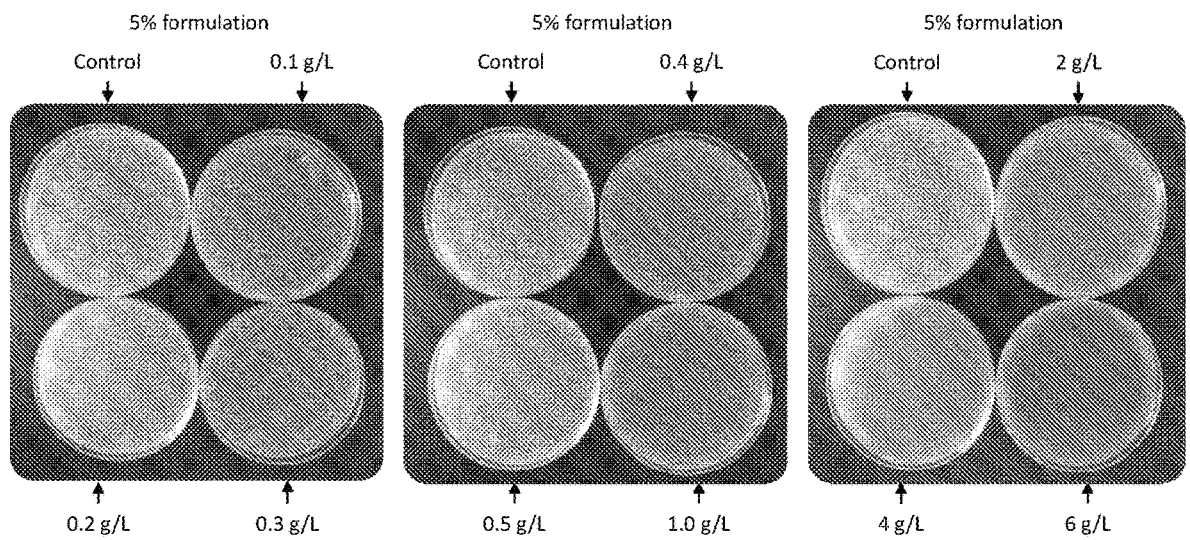
FIGS. 16(a)-(c) show the results when a mixture containing 5% of a premixture of tannins was tested against *Pseudomonas* sp.

FIGS. 16(*a*)-(*c*) show the results when the tannins were present in the formulation at an amount of 5% by mass of the premixture. The upper left hand petri dish in each of FIGS. 16(*a*)-(*c*) are the control petri dishes, in which no formulation was applied. FIG. 16(*a*) shows results when the formulation containing 5% by mass of the premixture of tannins was administered in a solution containing 0.1 g/L, 0.2 g/L, and 0.3 g/L of the formulation. FIG. 16(*b*) shows results when the formulation containing 5% by mass of the premixture of tannins was administered in a solution containing 0.4 g/L, 0.5 g/L, and 1.0 g/L of the formulation. FIG. 16(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 16(*a*)-(*c*).

TABLE 16

| Sample | CFU's |
| --- | --- |
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | >250 |
| 2 g/L | >250 |
| 4 g/L | None visible |
| 6 g/L | None visible |

As can be seen from FIGS. 16(*a*)-(*c*), effective doses of the 5% formulation in this test were deemed to be 4 g/L and 6 g/L, which were the concentrations at which the *Pseudomonas* sp. grew at a much lower rate than the control. In the 4 g/L and 6 g/L concentrations, the *Pseudomonas* sp. was not visibly present, and hence did not grow in the agar.

Figure 17A:
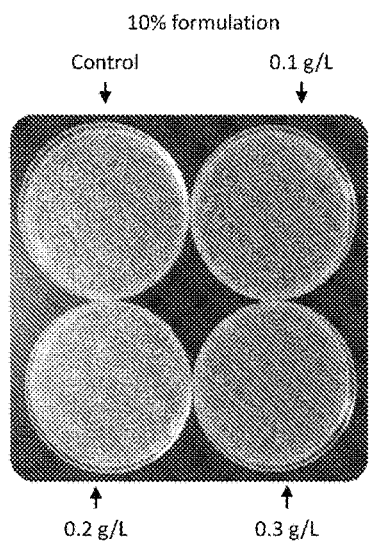
FIGS. 17(a)-(c) show the results when a mixture containing 10% of a premixture of tannins was tested against *Pseudomonas* sp.
Figure 17B:
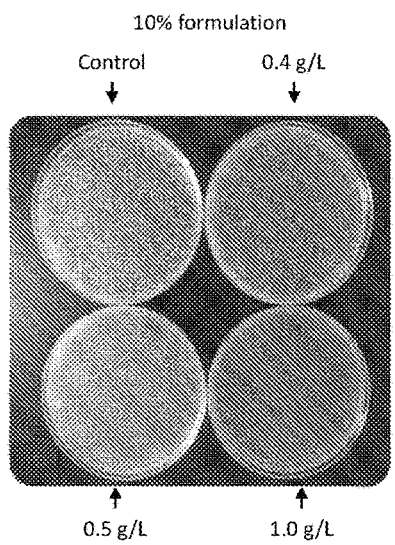
Figure 17C:
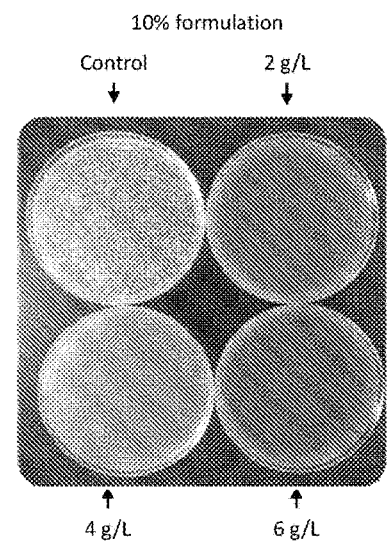

FIGS. 17(*a*)-(*c*) show the results when the tannins were present in the formulation at an amount of 10% by mass of the premixture. The upper left hand petri dish in each of FIGS. 17(*a*)-(*c*) are the control petri dishes, in which no formulation was applied. FIG. 17(*a*) shows results when the formulation containing 10% by mass of the premixture of tannins was administered in a solution containing 0.1 g/L, 0.2 g/L, and 0.3 g/L of the formulation. FIG. 17(*b*) shows results when the formulation containing 10% by mass of the premixture of tannins was administered in a solution containing 0.4 g/L, 0.5 g/L, and 1.0 g/L of the formulation. FIG. 17(*c*) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 17(*a*)-(*c*).

TABLE 17

| Sample | CFU's |
| --- | --- |
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | >250 |
| 2 g/L | None visible |
| 4 g/L | None visible |
| 6 g/L | None visible |

As can be seen from FIGS. 17(*a*)-(*c*), effective doses of the 10% formulation in this test were deemed to be 2 g/L, 4 g/L, and 6 g/L, which were the concentrations at which the *Pseudomonas* sp. grew at a much lower rate than the control. In the 2 g/L, 4 g/L, and 6 g/L concentrations, the *Pseudomonas* sp. was not visibly present, and hence did not grow in the agar.

Figures 18A, 18B, 18C:
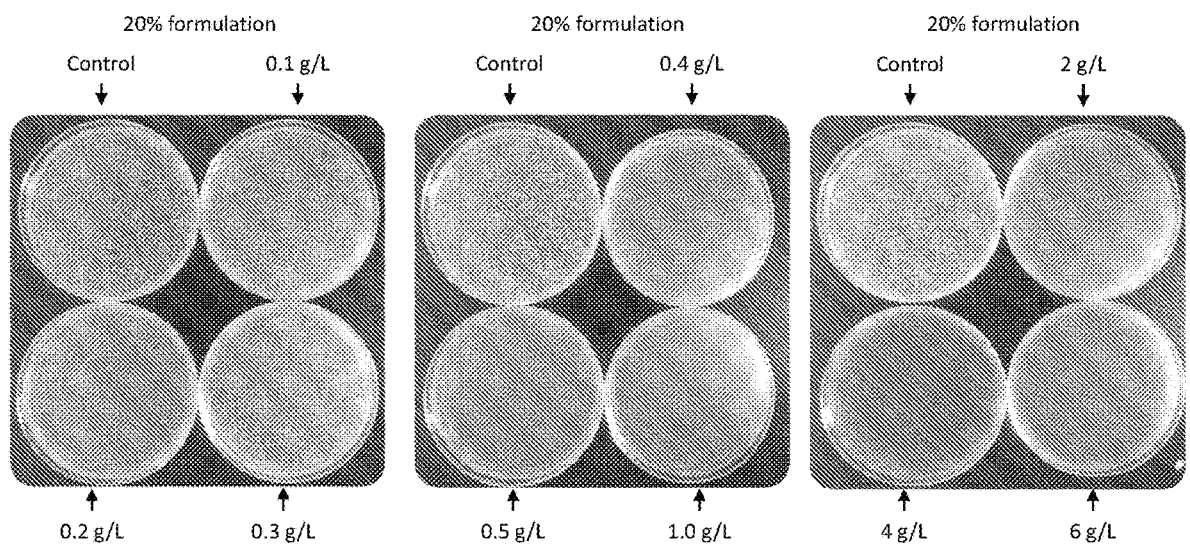
FIGS. 18(a)-(c) show the results when a mixture containing 20% of a premixture of tannins was tested against *Pseudomonas* sp.

FIGS. 18(*a*)-(*c*) show the results when the tannins were present in the formulation at an amount of 20% by mass of the premixture. The upper left hand petri dish in each of FIGS. 18(*a*)-(*c*) are the control petri dishes, in which no formulation was applied. FIG. 18(*a*) shows results when the formulation containing 20% by mass of the premixture of tannins was administered in a solution containing 0.1 g/L, 0.2 g/L, and 0.3 g/L of the formulation. FIG. 18(*b*) shows results when the formulation containing 20% by mass of the premixture of tannins was administered in a solution containing 0.4 g/L, 0.5 g/L, and 1.0 g/L of the formulation. FIG. 18(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 18(*a*)-(*c*).

TABLE 18

| Sample | CFU's |
| --- | --- |
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | None visible |
| 2 g/L | None visible |
| 4 g/L | None visible |
| 6 g/L | None visible |

As can be seen from FIGS. 18(*a*)-(*c*), effective doses of the 20% formulation in this test were deemed to be 1 g/L, 2 g/L, 4 g/L, and 6 g/L, which were the concentrations at which the *Pseudomonas* sp. grew at a much lower rate than the control. In the 1 g/L, 2 g/L, 4 g/L, and 6 g/L concentrations, the *Pseudomonas* sp. was not visibly present, and hence did not grow in the agar.

Example 3B

The conditions of Example 1B were reproduced, with the exception that *Pseudomonas* sp. was the bacteria.

Figure 19A:
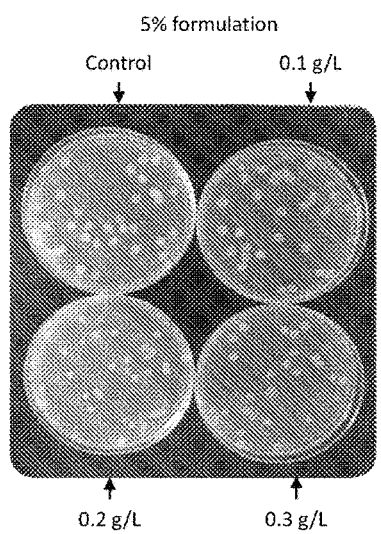
FIGS. 19(a)-(c) show the results when a mixture containing 5% of a premixture of tannins was tested against *Pseudomonas* sp.
Figure 19B:
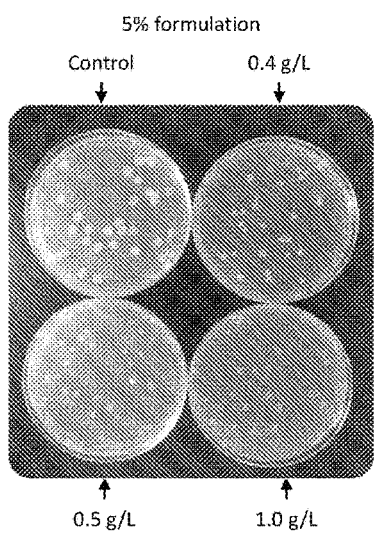
Figure 19C:
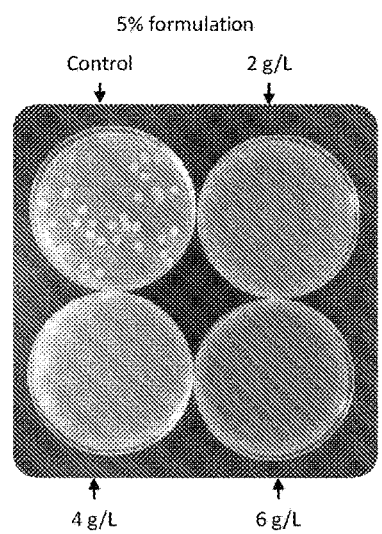

FIGS. 19(*a*)-(*c*) show the results when the tannins were present in the formulation at an amount of 5% by mass of the premixture. The upper left hand petri dish in each of FIGS. 19(*a*)-(*c*) are the control petri dishes, in which no formulation was applied. FIG. 19(*a*) shows results when the formulation containing 5% by mass of the premixture of tannins was administered in a solution containing 0.1 g/L, 0.2 g/L, and 0.3 g/L of the formulation. FIG. 19(*b*) shows results when the formulation containing 5% by mass of the premixture of tannins was administered in a solution containing 0.4 g/L, 0.5 g/L, and 1.0 g/L of the formulation. FIG. 19(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 19(*a*)-(*c*).

TABLE 19

| Sample | CFU's |
| --- | --- |
| Control | 32 |
| 0.1 g/L | 32 |
| 0.2 g/L | 32 |
| 0.3 g/L | 28 |
| 0.4 g/L | 26 |
| 0.5 g/L | 32 |
| 1.0 g/L | 29 |
| 2 g/L | None visible |
| 4 g/L | None visible |
| 6 g/L | None visible |

As can be seen from FIGS. 19(*a*)-(*c*), effective doses of the 5% formulation in this test were deemed to be 2 g/L, 4 g/L, and 6 g/L, which were the concentrations at which the *Pseudomonas* sp. grew at a much lower rate than the control. In the 2 g/L, 4 g/L, and 6 g/L concentrations, the *Pseudomonas* sp. was not visibly present, and hence did not grow in the agar.

Figure 20A:
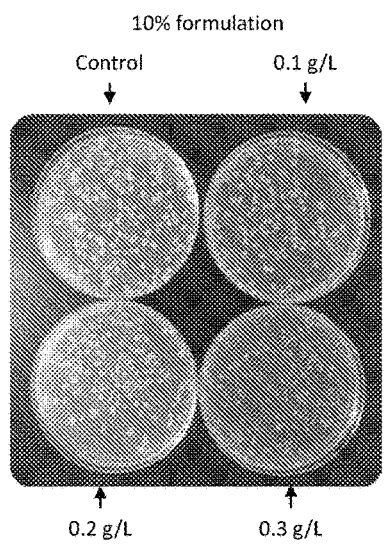
FIGS. 20(a)-(c) show the results when a mixture containing 10% of a premixture of tannins was tested against *Pseudomonas* sp.
Figure 20B:
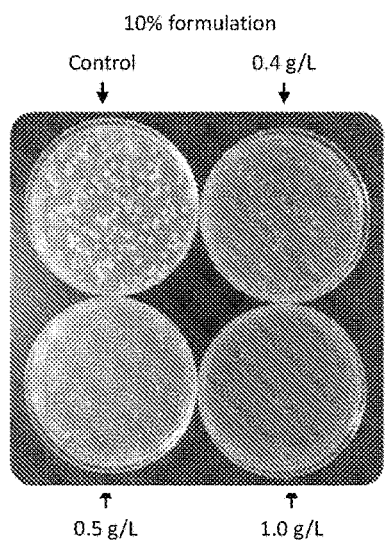
Figure 20C:
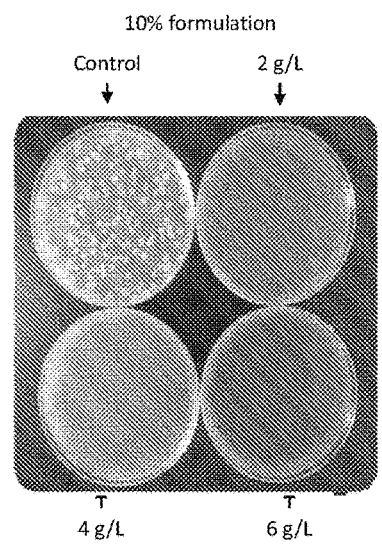

FIGS. 20(*a*)-(*c*) show the results when the tannins were present in the formulation at an amount of 10% by mass of the premixture. The upper left hand petri dish in each of FIGS. 20(*a*)-(*c*) are the control petri dishes, in which no formulation was applied. FIG. 20(*a*) shows results when the formulation containing 10% by mass of the premixture of tannins was administered in a solution containing 0.1 g/L, 0.2 g/L, and 0.3 g/L of the formulation. FIG. 20(*b*) shows results when the formulation containing 10% by mass of the premixture of tannins was administered in a solution containing 0.4 g/L, 0.5 g/L, and 1.0 g/L of the formulation. FIG. 20(*c*) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 20(*a*)-(*c*).

TABLE 20

| Sample | CFU's |
| --- | --- |
| Control | 148 |
| 0.1 g/L | 152 |
| 0.2 g/L | 146 |
| 0.3 g/L | 137 |
| 0.4 g/L | 140 |
| 0.5 g/L | 123 |
| 1.0 g/L | 137 |
| 2 g/L | None visible |
| 4 g/L | None visible |
| 6 g/L | None visible |

As can be seen from FIGS. 20(*a*)-(*c*), effective doses of the 10% formulation in this test were deemed to be 2 g/L, 4 g/L, and 6 g/L, which were the concentrations at which the *Pseudomonas* sp. grew at a much lower rate than the control. In the 2 g/L, 4 g/L, and 6 g/L concentrations, the *Pseudomonas* sp. was not visibly present, and hence did not grow in the agar.

Figure 21A:
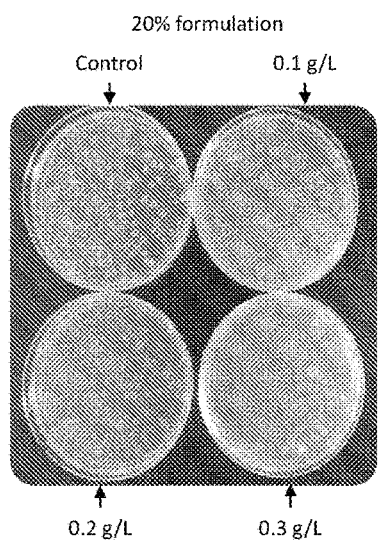
FIGS. 21(a)-(c) show the results when a mixture containing 20% of a premixture of tannins was tested against *Pseudomonas* sp.
Figure 21B:
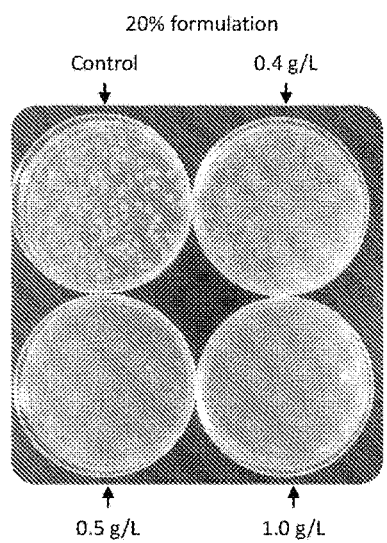
Figure 21C:
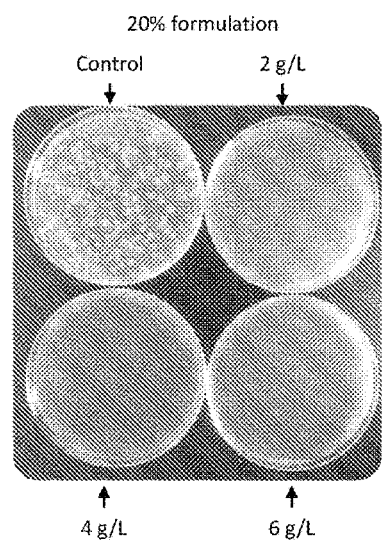

FIGS. 21(*a*)-(*c*) show the results when the tannins were present in the formulation at an amount of 20% by mass of the premixture. The upper left hand petri dish in each of FIGS. 21(*a*)-(*c*) are the control petri dishes, in which no formulation was applied. FIG. 21(*a*) shows results when the formulation containing 20% by mass of the premixture of tannins was administered in a solution containing 0.1 g/L, 0.2 g/L, and 0.3 g/L of the formulation. FIG. 21(*b*) shows results when the formulation containing 20% by mass of the premixture of tannins was administered in a solution containing 0.4 g/L, 0.5 g/L, and 1.0 g/L of the formulation. FIG. 21(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 21(*a*)-(*c*).

TABLE 21

| Sample | CFU's |
| --- | --- |
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | None visible |
| 2 g/L | None visible |
| 4 g/L | None visible |
| 6 g/L | None visible |

As can be seen from FIGS. 21(*a*)-(*c*), effective doses of the 20% formulation in this test were deemed to be 1 g/L, 2 g/L, 4 g/L, and 6 g/L, which were the concentrations at which the *Pseudomonas* sp. grew at a much lower rate than the control. In the 1 g/L, 2 g/L, 4 g/L, and 6 g/L concentrations, the *Pseudomonas* sp. was not visibly present, and hence did not grow in the agar.

Example 4A

The effectiveness of the formulation on *Ralstonia* sp. was tested in the same manner as Example 1A, with the exception that *Ralstonia* sp. was the bacteria.

FIGS. 22(*a*)-(*c*) show the results when the tannins were present in the formulation at an amount of 5% by mass of the premixture. The upper left hand petri dish in each of FIGS. 22(*a*)-(*c*) are the control petri dishes, in which no formulation was applied. FIG. 22(*a*) shows results when the formulation containing 5% by mass of the premixture of tannins was administered in a solution containing 0.1 g/L, 0.2 g/L, and 0.3 g/L of the formulation. FIG. 22(*b*) shows results when the formulation containing 5% by mass of the premixture of tannins was administered in a solution containing 0.4 g/L, 0.5 g/L, and 1.0 g/L of the formulation. FIG. 22(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 22(*a*)-(*c*).

TABLE 22

| Sample | CFU's |
| --- | --- |
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | >250 |
| 2 g/L | >250 |
| 4 g/L | >250 |
| 6 g/L | >250 |

Figures 22A, 22B, 22C:
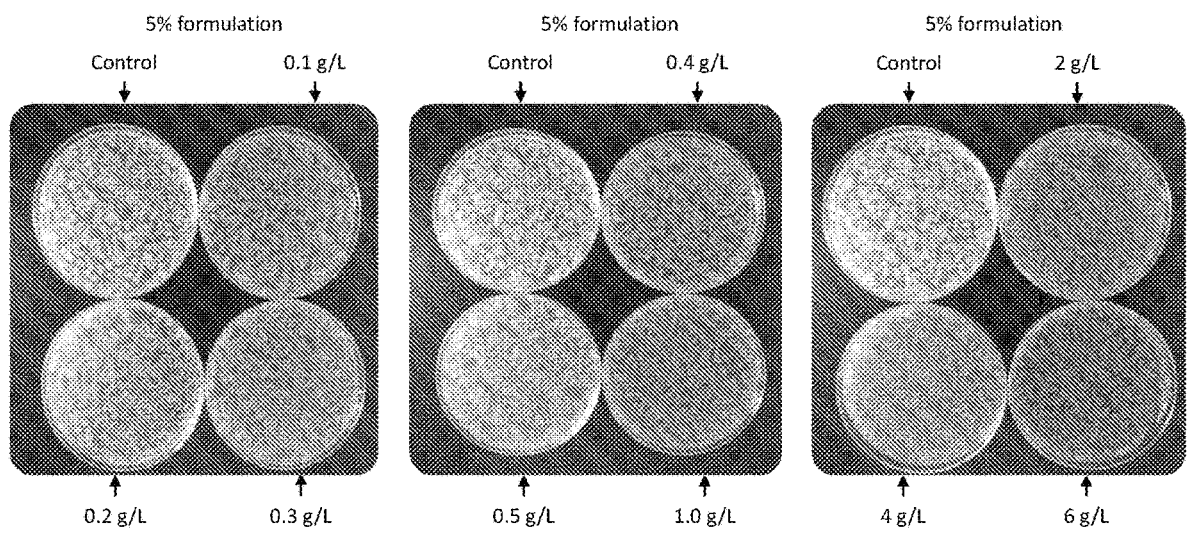
FIGS. 22(a)-(c) show the results when a mixture containing 5% of a premixture of tannins was tested against *Ralstonia* sp.

As can be seen from FIGS. 22(a)-(c), higher concentrations may be necessary to be effective for this test.

Figures 23A, 23B, 23C:
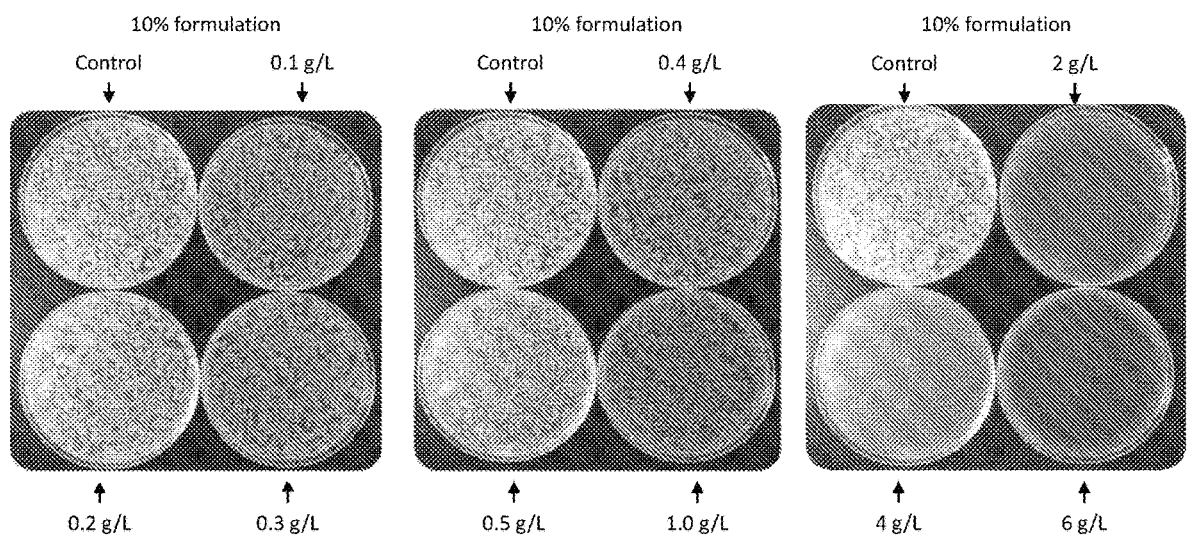
FIGS. 23(a)-(c) show the results when a mixture containing 10% of a premixture of tannins was tested against *Ralstonia* sp.

FIGS. 23(a)-(c) show the results when the tannins were present in the formulation at an amount of 10% by mass of the premixture. The upper left hand petri dish in each of FIGS. 23(a)-(c) are the control petri dishes, in which no formulation was applied. FIG. 23(a) shows results when the formulation containing 10% by mass of the premixture of tannins was administered in a solution containing 0.1 g/L, 0.2 g/L, and 0.3 g/L of the formulation. FIG. 23(b) shows results when the formulation containing 10% by mass of the premixture of tannins was administered in a solution containing 0.4 g/L, 0.5 g/L, and 1.0 g/L of the formulation. FIG. 23(c) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 23(a)-(c).

TABLE 23

| Sample | CFU's |
| --- | --- |
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | >250 |
| 2 g/L | None visible |
| 4 g/L | None visible |
| 6 g/L | None visible |

As can be seen from FIGS. 23(a)-(c), effective doses of the 10% formulation in this test were deemed to be 2 g/L, 4 g/L, and 6 g/L, which were the concentrations at which the Ralstonia sp. grew at a much lower rate than the control. In the 2 g/L, 4 g/L, and 6 g/L concentrations, the Ralstonia sp. was not visibly present, and hence did not grow in the agar.

Figures 24A, 24B, 24C:
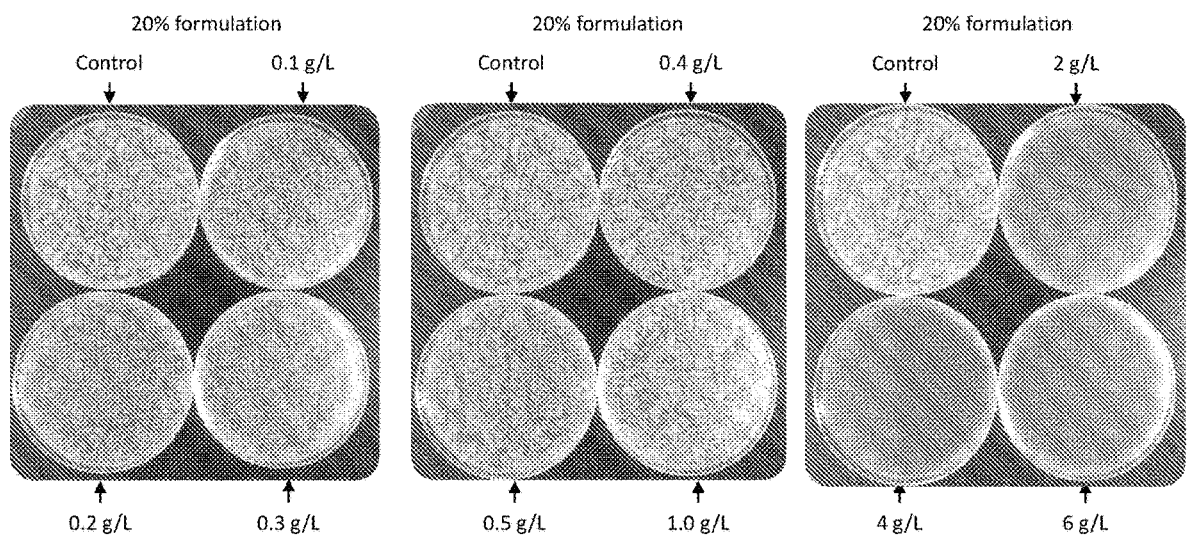
FIGS. 24(a)-(c) show the results when a mixture containing 20% of a premixture of tannins was tested against *Ralstonia* sp.

FIGS. 24(a)-(c) show the results when the results when the tannins were present in the formulation at an amount of 20% by mass of the premixture. The upper left hand petri dish in each of FIGS. 24(a)-(c) are the control petri dishes, in which no formulation was applied. FIG. 24(a) shows results when the formulation containing 20% by mass of the premixture of tannins was administered in a solution containing 0.1 g/L, 0.2 g/L, and 0.3 g/L of the formulation. FIG. 24(b) shows results when the formulation containing 20% by mass of the premixture of tannins was administered in a solution containing 0.4 g/L, 0.5 g/L, and 1.0 g/L of the formulation. FIG. 24(c) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 24(a)-(c).

TABLE 24

| Sample | CFU's |
| --- | --- |
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | >250 |
| 2 g/L | None visible |
| 4 g/L | None visible |
| 6 g/L | None visible |

As can be seen from FIGS. 24(a)-(c), effective doses of the 20% formulation in this test were deemed to be 2 g/L, 4 g/L, and 6 g/L, which were the concentrations at which the Ralstonia sp. grew at a much lower rate than the control. In the 2 g/L, 4 g/L, and 6 g/L concentrations, the Ralstonia sp. was not visibly present, and hence did not grow in the agar.

Example 4B

The conditions of Example 1B were reproduced, with the exception that Ralstonia sp. was the bacteria.

Figures 25A, 25B, 25C:
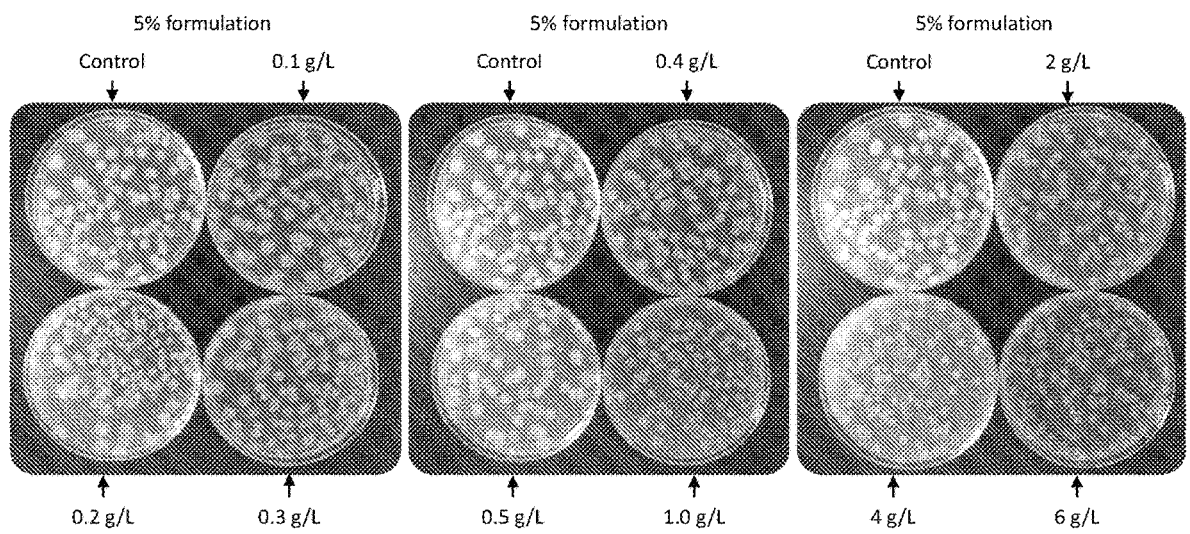
FIGS. 25(a)-(c) show the results when a mixture containing 5% of a premixture of tannins was tested against *Ralstonia* sp.

FIGS. 25(a)-(c) show the results when the tannins were present in the formulation at an amount of 5% by mass of the premixture. The upper left hand petri dish in each of FIGS. 25(a)-(c) are the control petri dishes, in which no formulation was applied. FIG. 25(a) shows results when the formulation containing 5% by mass of the premixture of tannins was administered in a solution containing 0.1 g/L, 0.2 g/L, and 0.3 g/L of the formulation. FIG. 25(b) shows results when the formulation containing 5% by mass of the premixture of tannins was administered in a solution containing 0.4 g/L, 0.5 g/L, and 1.0 g/L of the formulation. FIG. 25(c) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 25(a)-(c).

TABLE 25

| Sample | CFU's |
| --- | --- |
| Control | 98 |
| 0.1 g/L | 104 |
| 0.2 g/L | 97 |
| 0.3 g/L | 93 |
| 0.4 g/L | 93 |
| 0.5 g/L | 94 |
| 1.0 g/L | 104 |
| 2 g/L | 126 |
| 4 g/L | 99 |
| 6 g/L | 96 |

As can be seen from FIGS. 25(a)-(c), a higher concentration may be necessary to be effective in this test.

Figures 26A, 26B, 26C:
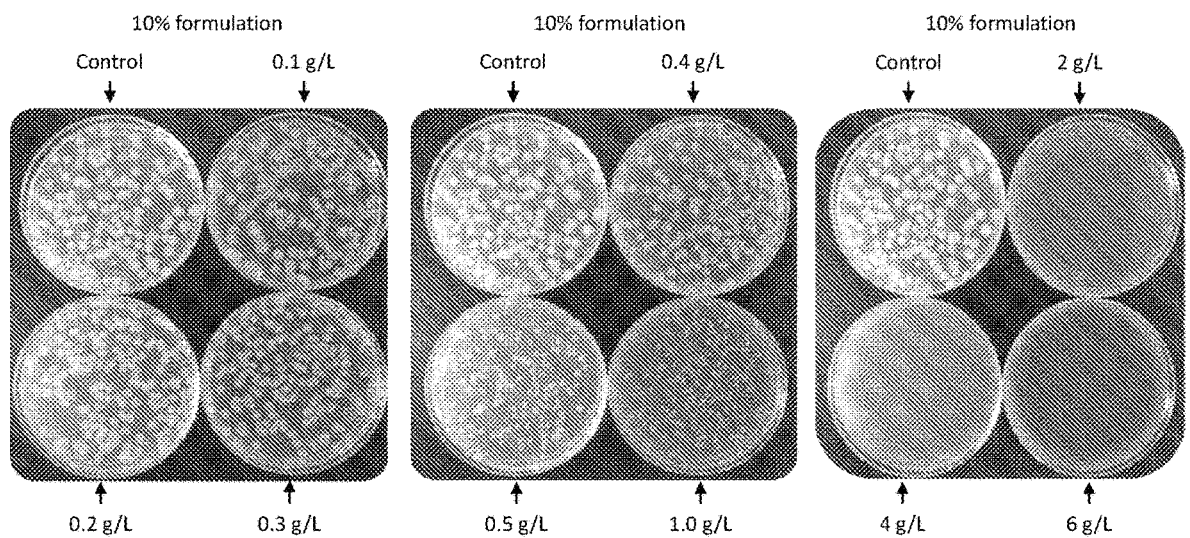
FIGS. 26(a)-(c) show the results when a mixture containing 10% of a premixture of tannins was tested against *Ralstonia* sp.

FIGS. 26(a)-(c) show the results when the tannins were present in the formulation at an amount of 10% by mass of the premixture. The upper left hand petri dish in each of FIGS. 26(a)-(c) are the control petri dishes, in which no formulation was applied. FIG. 26(a) shows results when the formulation containing 10% by mass of the premixture of tannins was administered in a solution containing 0.1 g/L, 0.2 g/L, and 0.3 g/L of the formulation. FIG. 26(b) shows results when the formulation containing 10% by mass of the premixture of tannins was administered in a solution containing 0.4 g/L, 0.5 g/L, and 1.0 g/L of the formulation. FIG. 26(c) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 26(a)-(c).

TABLE 26

| Sample | CFU's |
| --- | --- |
| Control | 171 |
| 0.1 g/L | 172 |
| 0.2 g/L | 188 |
| 0.3 g/L | 174 |
| 0.4 g/L | 158 |
| 0.5 g/L | 171 |
| 1.0 g/L | 194 |
| 2 g/L | None visible |
| 4 g/L | None visible |
| 6 g/L | None visible |

As can be seen from FIGS. 26(a)-(c), effective doses of the 10% formulation in this test were deemed to be 2 g/L, 4 g/L, and 6 g/L, which were the concentrations at which the Ralstonia sp. grew at a much lower rate than the control. In the 2 g/L, 4 g/L, and 6 g/L concentrations, the Ralstonia sp. was not visibly present, and hence did not grow in the agar.

Figures 27A, 27B, 27C:
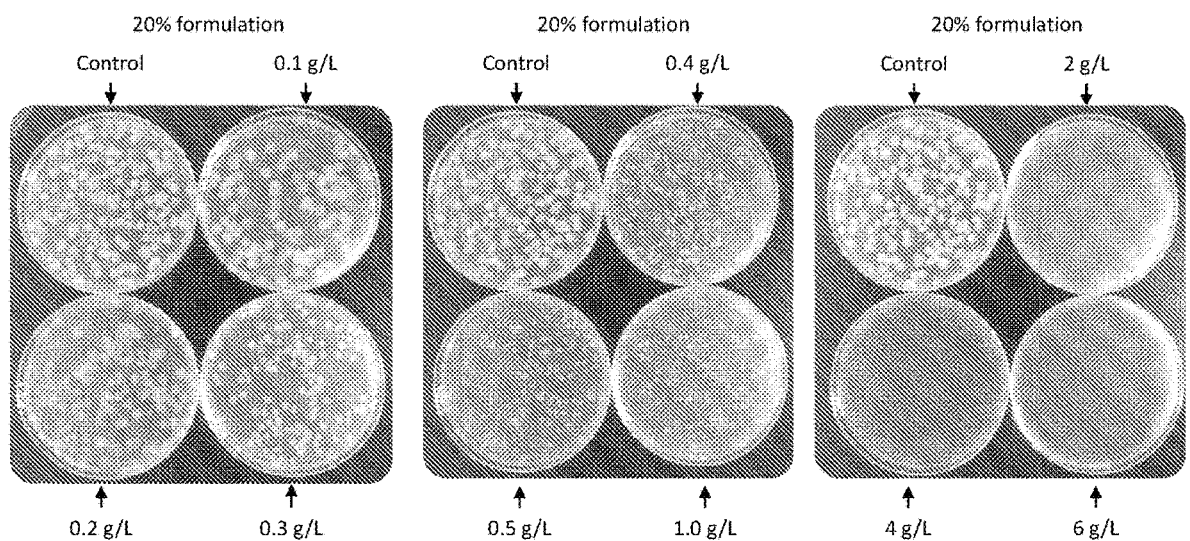
FIGS. 27(a)-(c) show the results when a mixture containing 20% of a premixture of tannins was tested against *Ralstonia* sp.
Figures 28A, 28B, 28C:
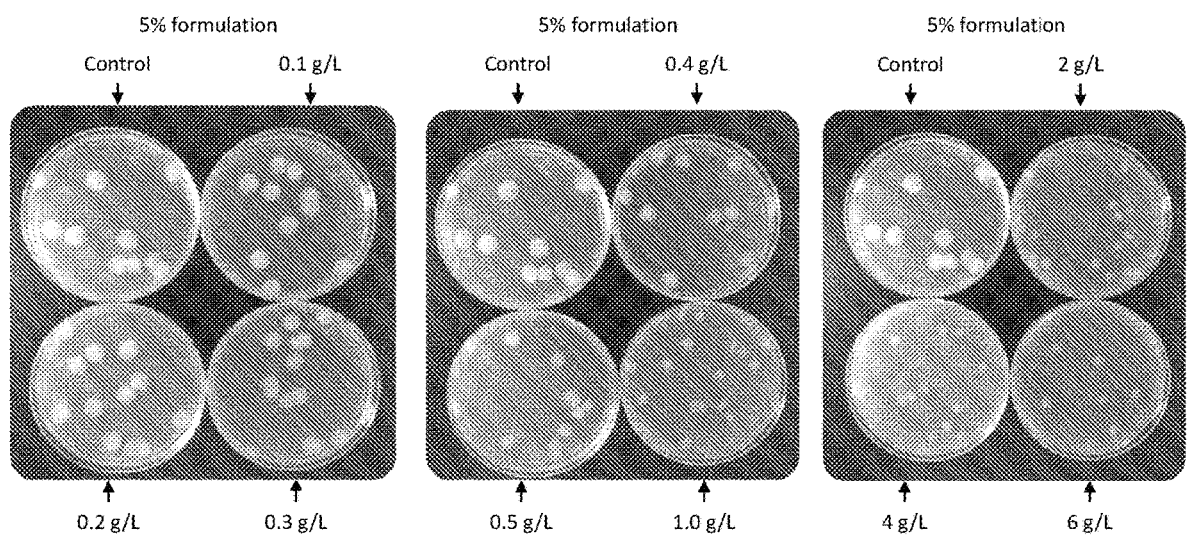
FIGS. 28(a)-(c) show the results when a mixture containing 5% of a premixture of tannins was tested against *Ralstonia* sp.
Figures 29A, 29B, 29C:
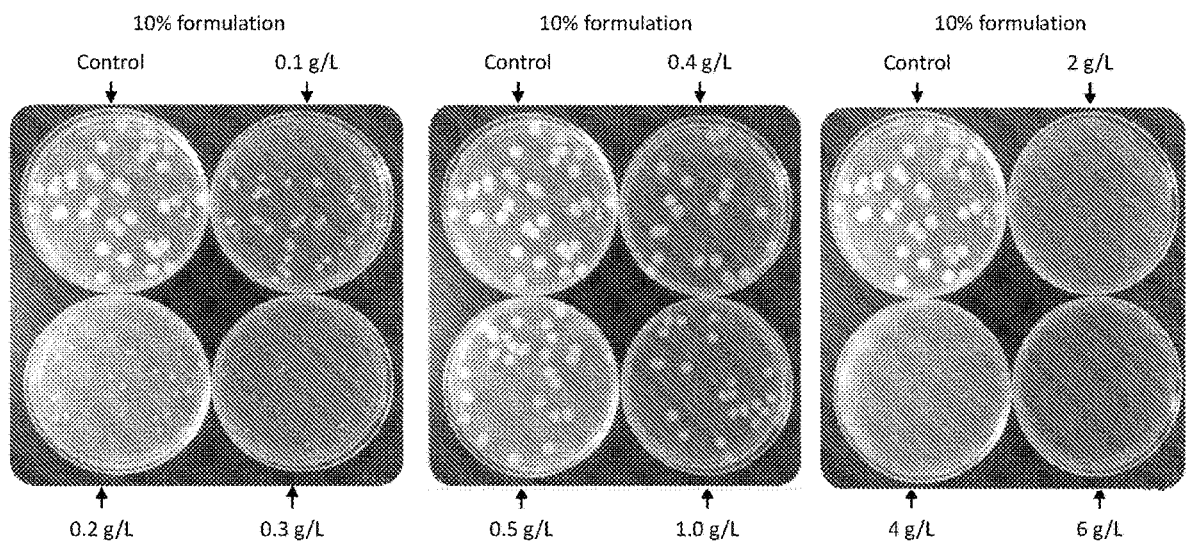
FIGS. 29(a)-(c) show the results when a mixture containing 10% of a premixture of tannins was tested against *Ralstonia* sp.
Figure 30A:
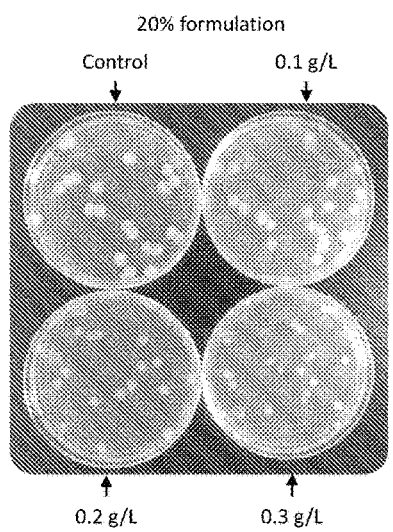
FIGS. 30(a)-(c) show the results when a mixture containing 20% of a premixture of tannins was tested against *Ralstonia* sp.
Figure 30B:
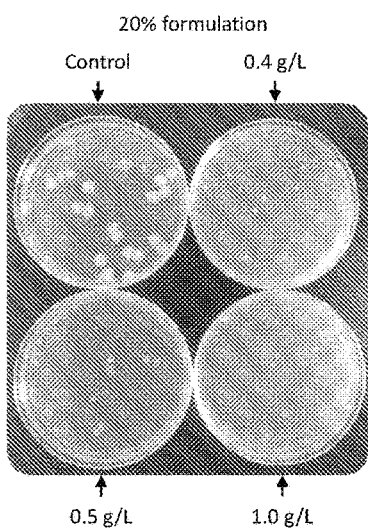
Figure 30C:
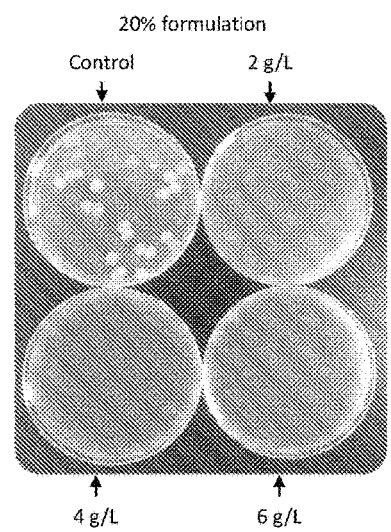
Figure 31A:
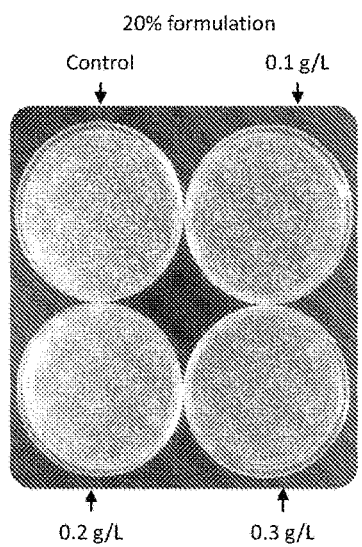
FIGS. 31 (a)-(c) show the results when a mixture containing 20% of a premixture of tannins was tested against *Xanthomonas* sp.
Figure 31B:
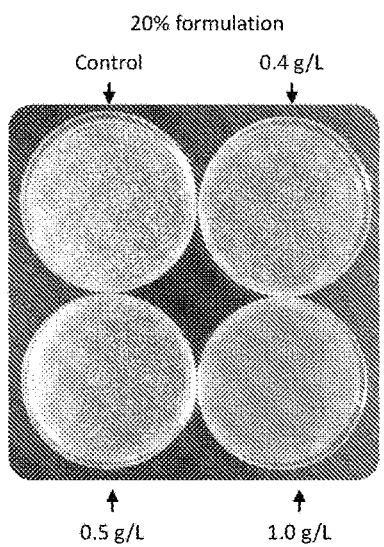
Figure 31C:
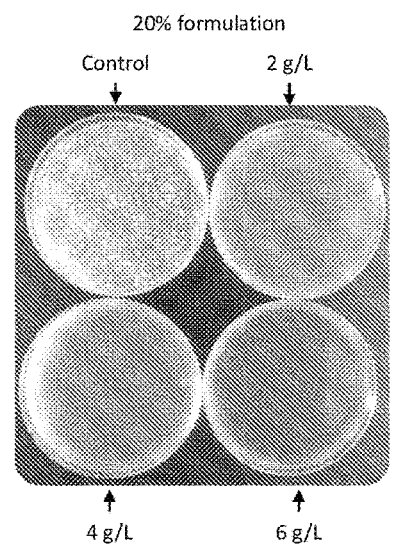
Figure 32A:
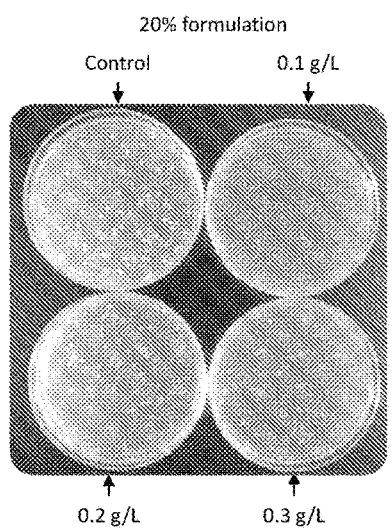
FIGS. 32(a)-(c) show the results when a mixture containing 20% of a premixture of tannins was tested against *Xanthomonas* sp.
Figure 32B:
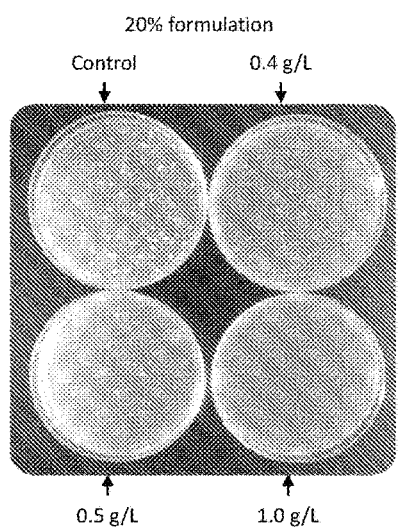
Figure 32C:
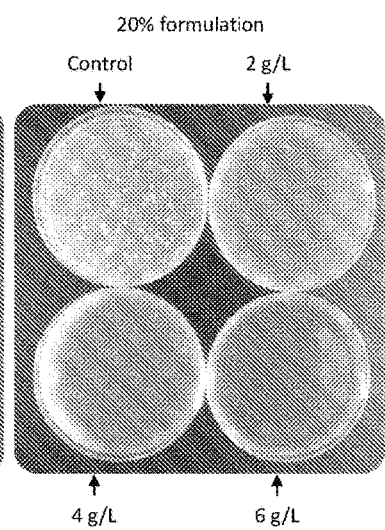

FIGS. 27(a)-(c) show the results when the tannins were present in the formulation at an amount of 20% by mass of the premixture. The upper left hand petri dish in each of FIGS. 27(a)-(c) are the control petri dishes, in which no formulation was applied. FIG. 27(*a*) shows results when the formulation containing 20% by mass of the premixture of tannins was administered in a solution containing 0.1 g/L, 0.2 g/L, and 0.3 g/L of the formulation. FIG. 27(*b*) shows results when the formulation containing 20% by mass of the premixture of tannins was administered in a solution containing 0.4 g/L, 0.5 g/L, and 1.0 g/L of the formulation. FIG. 27(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 27(*a*)-(*c*).

TABLE 27

| Sample | CFU's |
|---|---|
| Control | 144 |
| 0.1 g/L | 127 |
| 0.2 g/L | 138 |
| 0.3 g/L | 178 |
| 0.4 g/L | 170 |
| 0.5 g/L | 162 |
| 1.0 g/L | 198 |
| 2 g/L | None visible |
| 4 g/L | None visible |
| 6 g/L | None visible |

As can be seen from FIGS. 27(*a*)-(*c*), effective doses of the 20% formulation in this test were deemed to be 2 g/L, 4 g/L, and 6 g/L, which were the concentrations at which the *Ralstonia* sp. grew at a much lower rate than the control. In the 2 g/L, 4 g/L, and 6 g/L concentrations, the *Ralstonia* sp. was not visibly present, and hence did not grow in the agar.

Example 4C

The conditions of Example 1C were reproduced, with the exception that *Ralstonia* sp. was the bacteria.

FIGS. 28(*a*)-(*c*) show the results when the tannins were present in the formulation at an amount of 5% by mass of the premixture. The upper left hand petri dish in each of FIGS. 28(*a*)-(*c*) are the control petri dishes, in which no formulation was applied. FIG. 28(*a*) shows results when the formulation containing 5% by mass of the premixture of tannins was administered in a solution containing 0.1 g/L, 0.2 g/L, and 0.3 g/L of the formulation. FIG. 28(*b*) shows results when the formulation containing 5% by mass of the premixture of tannins was administered in a solution containing 0.4 g/L, 0.5 g/L, and 1.0 g/L of the formulation. FIG. 28(*c*) shows results when the formulation containing 5% by mass of the premixture of tannins was administered in a solution containing 2 g/L, 4 g/L, and 6 g/L of the formulation.

The Table below shows the number of CFU's in the petri dishes in FIGS. 28(*a*)-(*c*).

TABLE 28

| Sample | CFU's |
|---|---|
| Control | 13 |
| 0.1 g/L | 12 |
| 0.2 g/L | 13 |
| 0.3 g/L | 13 |
| 0.4 g/L | 8 |
| 0.5 g/L | 11 |
| 1.0 g/L | 11 |
| 2 g/L | 13 |
| 4 g/L | 9 |
| 6 g/L | 10 |

As can be seen from FIGS. 28(*a*)-(*c*), a higher concentration may be necessary to be effective in this test.

FIGS. 29(*a*)-(*c*) show the results when the tannins were present in the formulation at an amount of 10% by mass of the premixture. The upper left hand petri dish in each of FIGS. 29(*a*)-(*c*) are the control petri dishes, in which no formulation was applied. FIG. 29(*a*) shows results when the formulation containing 10% by mass of the premixture of tannins was administered in a solution containing 0.1 g/L, 0.2 g/L, and 0.3 g/L of the formulation. FIG. 29(*b*) shows results when the formulation containing 10% by mass of the premixture of tannins was administered in a solution containing 0.4 g/L, 0.5 g/L, and 1.0 g/L of the formulation. FIG. 29(*c*) shows results when the formulation containing 10% by mass of the premixture of tannins was administered in a solution containing 2 g/L, 4 g/L, and 6 g/L of the formulation.

The Table below shows the number of CFU's in the petri dishes in FIGS. 29(*a*)-(*c*).

TABLE 29

| Sample | CFU's |
|---|---|
| Control | 26 |
| 0.1 g/L | 26 |
| 0.2 g/L | 27 |
| 0.3 g/L | 24 |
| 0.4 g/L | 22 |
| 0.5 g/L | 18 |
| 1.0 g/L | 24 |
| 2 g/L | None visible |
| 4 g/L | None visible |
| 6 g/L | None visible |

As can be seen from FIGS. 29(a)-(c), effective doses of the 10% formulation in this test were deemed to be 2 g/L, 4 g/L, and 6 g/L, which were the concentrations at which the *Ralstonia* sp. grew at a much lower rate than the control. In the 2 g/L, 4 g/L, and 6 g/L concentrations, the *Ralstonia* sp. was not visibly present, and hence did not grow in the agar.

FIGS. 30(*a*)-(*c*) show the results when the tannins were present in the formulation at an amount of 20% by mass of the premixture. The upper left hand petri dish in each of FIGS. 30(*a*)-(*c*) are the control petri dishes, in which no formulation was applied. FIG. 30(*a*) shows results when the formulation containing 20% by mass of the premixture of tannins was administered in a solution containing 0.1 g/L, 0.2 g/L, and 0.3 g/L of the formulation. FIG. 30(*b*) shows results when the formulation containing 20% by mass of the premixture of tannins was administered in a solution containing 0.4 g/L, 0.5 g/L, and 1.0 g/L of the formulation. FIG. 30(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 30(*a*)-(*c*).

TABLE 30

| Sample | CFU's |
|---|---|
| Control | 25 |
| 0.1 g/L | 17 |
| 0.2 g/L | 19 |
| 0.3 g/L | 19 |
| 0.4 g/L | 20 |
| 0.5 g/L | 21 |
| 1.0 g/L | 13 |
| 2 g/L | None visible |
| 4 g/L | None visible |
| 6 g/L | None visible |

As can be seen from FIGS. 30(*a*)-(*c*), effective doses of the 20% formulation in this test were deemed to be 2 g/L, 4 g/L, and 6 g/L, which were the concentrations at which the *Ralstonia* sp. grew at a much lower rate than the control. In the 2 g/L, 4 g/L, and 6 g/L concentrations, the *Ralstonia* sp. was not visibly present, and hence did not grow in the agar.

Example 5A

The effectiveness of the formulation on *Xanthomonas* sp. was tested in the same manner as Example 1A, with the exception that *Xanthomonas* sp. was the bacteria.

FIGS. 31(*a*)-(*c*) show the results when the tannins were present in the formulation at an amount of 20% by mass of the premixture. The upper left hand petri dish in each of FIGS. 31(*a*)-(*c*) are the control petri dishes, in which no formulation was applied. FIG. 31(*a*) shows results when the formulation containing 20% by mass of the premixture of tannins was administered in a solution containing 0.1 g/L, 0.2 g/L, and 0.3 g/L of the formulation. FIG. 31(*b*) shows results when the formulation containing 20% by mass of the premixture of tannins was administered in a solution containing 0.4 g/L, 0.5 g/L, and 1.0 g/L of the formulation. FIG. 31(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 31(*a*)-(*c*).

TABLE 31

| Sample | CFU's |
|---|---|
| Control | >250 |
| 0.1 g/L | >250 |
| 0.2 g/L | >250 |
| 0.3 g/L | >250 |
| 0.4 g/L | >250 |
| 0.5 g/L | >250 |
| 1.0 g/L | None visible |
| 2 g/L | None visible |
| 4 g/L | None visible |
| 6 g/L | None visible |

As can be seen from FIGS. 31(*a*)-(*c*), effective doses of the 20% formulation in this test were deemed to be 1.0 g/L, 2 g/L, 4 g/L, and 6 g/L, which were the concentrations at which the *Xanthomonas* sp. grew at a much lower rate than the control. In the 1.0 g/L, 2 g/L, 4 g/L, and 6 g/L concentrations, the *Xanthomonas* sp. was not visibly present, and hence did not grow in the agar.

Example 5B

The conditions of Example 1B were reproduced, with the exception that *Xanthomonas* sp. was the bacteria.

FIGS. 32(*a*)-(*c*) show the results when the tannins were present in the formulation at an amount of 20% by mass of the premixture. The upper left hand petri dish in each of FIGS. 32(*a*)-(*c*) are the control petri dishes, in which no formulation was applied. FIG. 32(*a*) shows results when the formulation containing 20% by mass of the premixture of tannins was administered in a solution containing 0.1 g/L, 0.2 g/L, and 0.3 g/L of the formulation. FIG. 32(*b*) shows results when the formulation containing 20% by mass of the premixture of tannins was administered in a solution containing 0.4 g/L, 0.5 g/L, and 1.0 g/L of the formulation. FIG. 32(*c*) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 32(*a*)-(*c*).

TABLE 32

| Sample | CFU's |
|---|---|
| Control | 120 |
| 0.1 g/L | 120 |
| 0.2 g/L | 100 |
| 0.3 g/L | 97 |
| 0.4 g/L | 120 |
| 0.5 g/L | 100 |
| 1.0 g/L | 12 |
| 2 g/L | None visible |
| 4 g/L | None visible |
| 6 g/L | None visible |

As can be seen from FIGS. 32(*a*)-(*c*), effective doses of the 20% formulation in this test were deemed to be 1 g/L, 2 g/L, 4 g/L, and 6 g/L, which were the concentrations at which the *Xanthomonas* sp. grew at a much lower rate than the control. In the 1 g/L, 2 g/L, 4 g/L, and 6 g/L concentrations, the *Xanthomonas* sp. was not visibly present, and hence did not grow in the agar.

Example 5C

The conditions of Example 1C were reproduced, with the exception that *Xanthomonas* sp. was the bacteria.

Figures 33A, 33B, 33C:
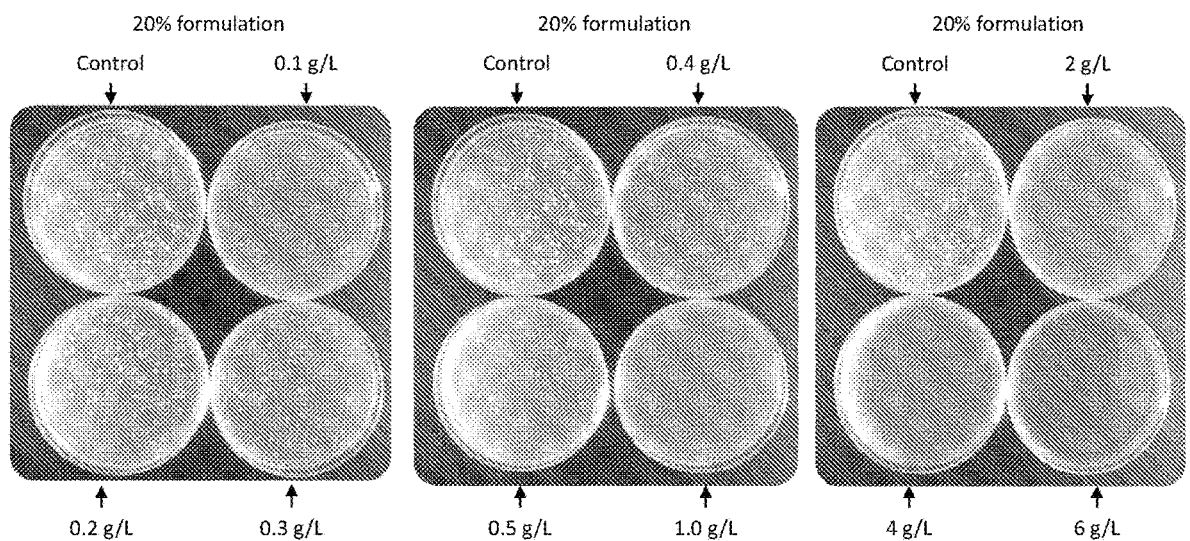
FIGS. 33(a)-(c) show the results when a mixture containing 20% of a premixture of tannins was tested against *Xanthomonas* sp.

FIGS. 33(a)-(c) show the results when the tannins were present in the formulation at an amount of 20% by mass of the premixture. The upper left hand petri dish in each of FIGS. 33(a)-(c) are the control petri dishes, in which no formulation was applied. FIG. 33(a) shows results when the formulation containing 20% by mass of the premixture of tannins was administered in a solution containing 0.1 g/L, 0.2 g/L, and 0.3 g/L of the formulation. FIG. 33(b) shows results when the formulation containing 20% by mass of the premixture of tannins was administered in a solution containing 0.4 g/L, 0.5 g/L, and 1.0 g/L of the formulation. FIG. 33(c) shows results when the formulation containing 20% by mass of the premixture of tannins was administered in a solution containing 2 g/L, 4 g/L, and 6 g/L of the formulation.

The Table below shows the number of CFU's in the petri dishes in FIGS. 33(a)-(c).

TABLE 33

| Sample | CFU's |
| --- | --- |
| Control | 120 |
| 0.1 g/L | 160 |
| 0.2 g/L | 130 |
| 0.3 g/L | 100 |
| 0.4 g/L | 150 |
| 0.5 g/L | 130 |
| 1.0 g/L | None visible |
| 2 g/L | None visible |
| 4 g/L | None visible |
| 6 g/L | None visible |

As can be seen from FIGS. 33(a)-(c), effective doses of the 20% formulation in this test were deemed to be 1.0 g/L, 2 g/L, 4 g/L, and 6 g/L, which were the concentrations at which the *Xanthomonas* sp. grew at a much lower rate than the control. In the 1.0 g/L, 2 g/L, 4 g/L, and 6 g/L concentrations, the *Xanthomonas* sp. was not visibly present, and hence did not grow in the agar.

Example 6

The testing conditions of Example 1C were repeated, except that each of compositions A5, B15, A, and +20 were individually used in place of the formulations used in Example 1C. Compositions A, A5, B15, and +20 were tested against *Clavibacter* sp., using a control, at concentrations of 1 g/L, 2 g/L, and 4 g/L.

Figure 34:
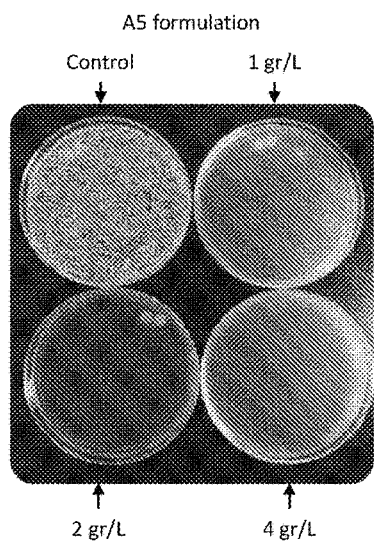
FIG. 34 shows the results of a test using composition A5.

FIG. 34 shows the results of the test using composition A5. The control exhibited bacterial growth, whereas lack of bacterial growth in the petri dishes exposed to 1 g/L, 2 g/L, and 4 g/L of composition A5 showed the antibacterial effect of composition A5.

Figure 35:
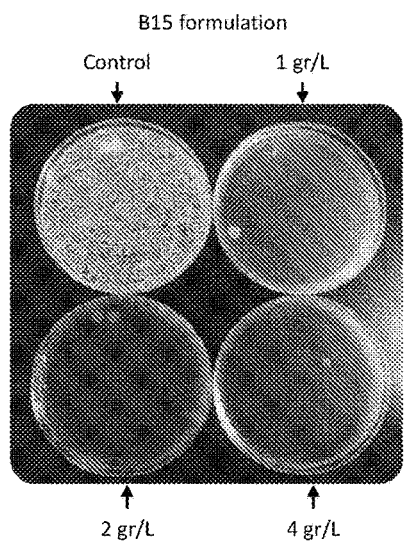
FIG. 35 shows the results of a test using composition B15.

FIG. 35 shows the results of the test using composition B15. The control exhibited bacterial growth, whereas lack of bacterial growth in the petri dishes exposed to 1 g/L, 2 g/L, and 4 g/L of composition B15 showed the antibacterial effect of composition B15.

Figure 36:
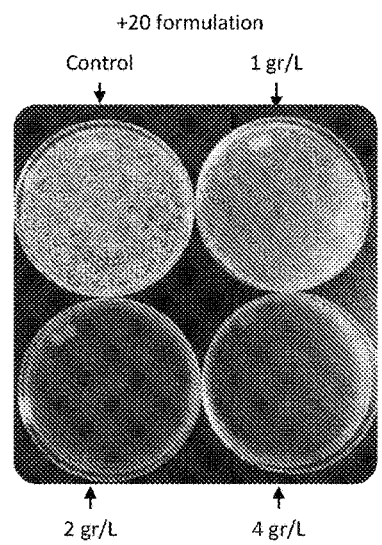
FIG. 36 shows the results of a test using composition+20.

FIG. 36 shows the results of the test using composition+20. The control and the 1 g/L composition exhibited bacterial growth, whereas lack of bacterial growth in the petri dishes exposed to 2 g/L and 4 g/L of composition+20 showed the antibacterial effect of composition+20.

Figure 37:
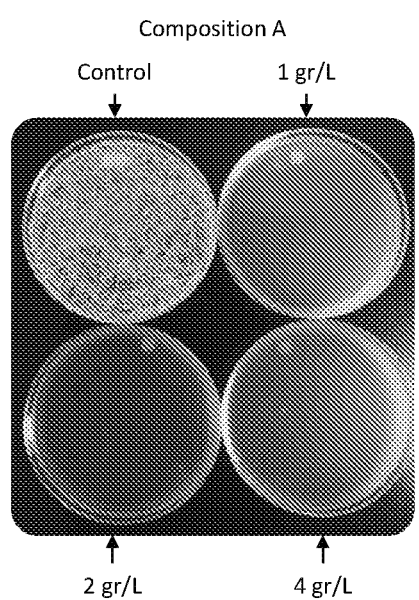
FIG. 37 shows the results of a test using Composition A.

FIG. 37 shows the results of the test using Composition A. The control exhibited bacterial growth, whereas lack of bacterial growth in the petri dishes exposed to 1 g/L, 2 g/L, and 4 g/L of Composition A showed the antibacterial effect of Composition A.

Example 7

The testing conditions of Example 2C were repeated, except that each of compositions A5, B15, A, and +20 were individually used in place of the formulation used in Example 2. Compositions A5, B15, and +20 were tested against *Erwinia* sp., using a control, at concentrations of 1 g/L, 2 g/L, and 4 g/L.

Figures 38, 39, 40:
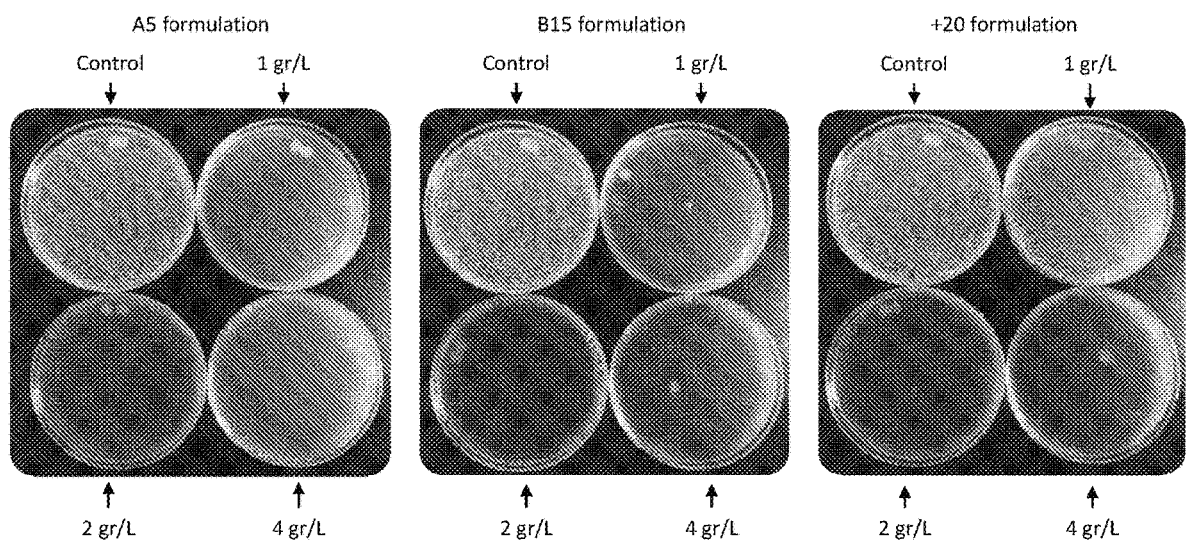
FIG. 38 shows the results of a test using composition A5.
FIG. 39 shows the results of a test using composition B15.
FIG. 40 shows the results of a test using composition+20.

FIG. 38 shows the results of the test using composition A5. The control exhibited bacterial growth, whereas lack of bacterial growth in the petri dishes exposed to 1 g/L, 2 g/L, and 4 g/L of composition A5 showed the antibacterial effect of composition A5.

FIG. 39 shows the results of the test using composition B15. The control exhibited bacterial growth, whereas lack of bacterial growth in the petri dishes exposed to 1 g/L, 2 g/L, and 4 g/L of composition B15 showed the antibacterial effect of composition B15.

FIG. 40 shows the results of the test using composition+20. The control and the 1 g/L composition exhibited bacterial growth, whereas lack of bacterial growth in the petri dishes exposed to 2 g/L and 4 g/L of composition+20 showed the antibacterial effect of composition+20.

Figure 41:
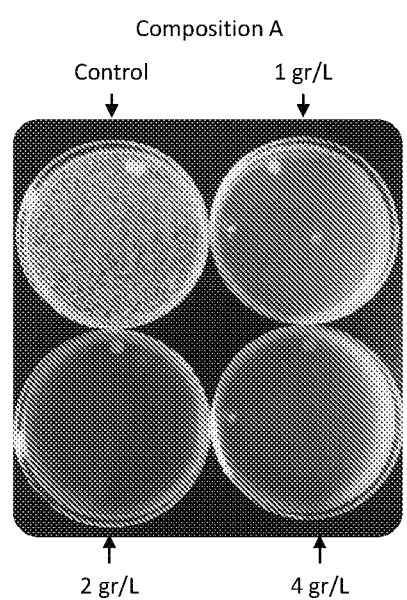
FIG. 41 shows the results of a test using Composition A.

FIG. 41 shows the results of the test using Composition A. The control exhibited bacterial growth, whereas lack of bacterial growth in the petri dishes exposed to 1 g/L, 2 g/L, and 4 g/L of Composition A showed the antibacterial effect of Composition A.

Example 8

The testing conditions of Example 4C were repeated, except that each of compositions A5, B15, A, and +20 were individually used in place of the formulation used in Example 4. Compositions A5, B15, A, and +20 were tested against *Ralstonia* sp., using a control, at, e.g., concentrations of 1 g/L, 2 g/L, and 4 g/L.

Figure 42:
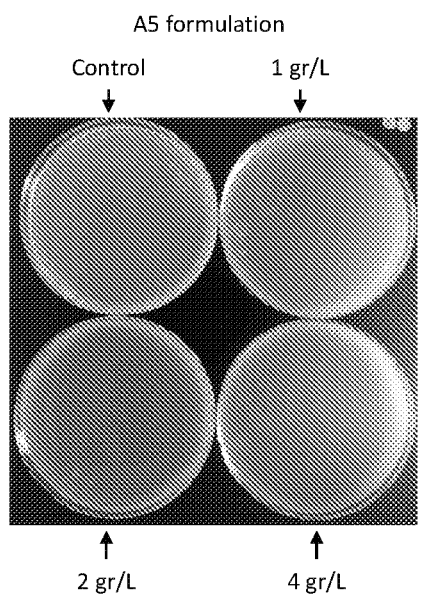
FIG. 42 shows the results of a test using composition A5.

FIG. 42 shows the results of the test using composition A5. The control exhibited bacterial growth, whereas lack of bacterial growth in the petri dishes exposed to 1 g/L, 2 g/L, and 4 g/L of composition A5 showed the antibacterial effect of composition A5.

Figure 43:
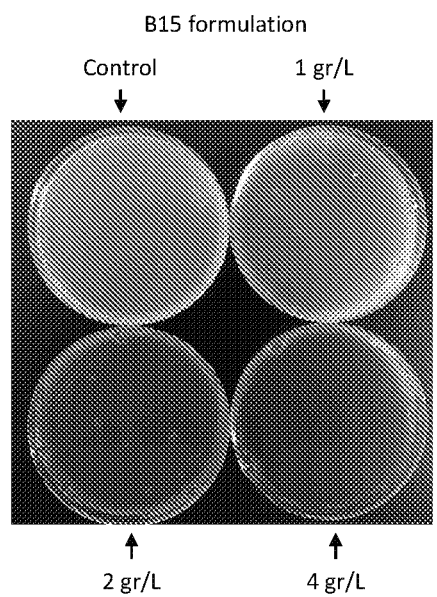
FIG. 43 shows the results of a test using composition B15.

FIG. 43 shows the results of the test using composition B15. The control exhibited bacterial growth, whereas lack of bacterial growth in the petri dishes exposed to 1 g/L, 2 g/L, and 4 g/L of composition B15 showed the antibacterial effect of composition B15.

Figure 44A:
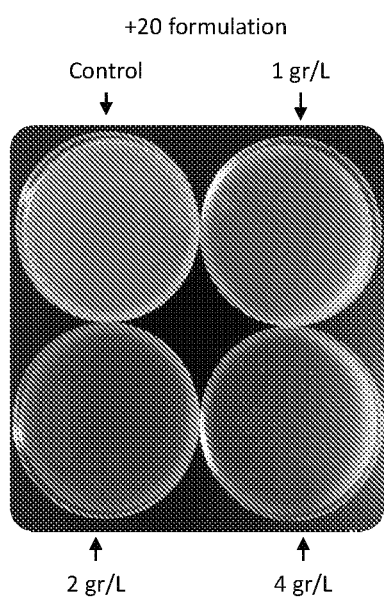
FIGS. 44(a) and (b) show the results of a test using composition+20.
Figure 44B:
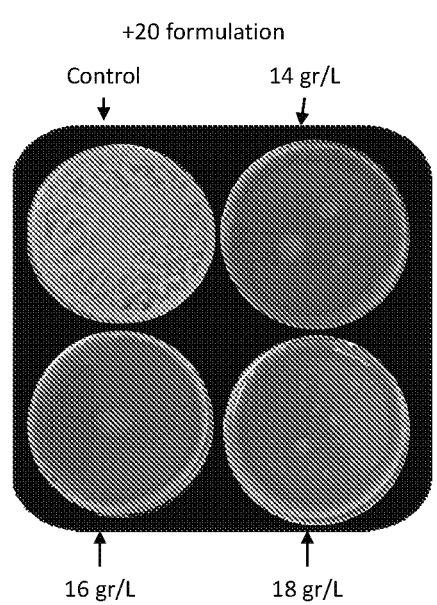

FIGS. 44(a) and (b) show the results of the test using composition+20. The control exhibited bacterial growth, as did the petri dishes exposed to 1 g/L, 2 g/L, and 4 g/L of composition+20, whereas lack of bacterial growth in the petri dishes exposed to 14 g/L, 16 g/L, and 18 g/L of composition+20 showed the antibacterial effect of composition+20.

Figure 45A:
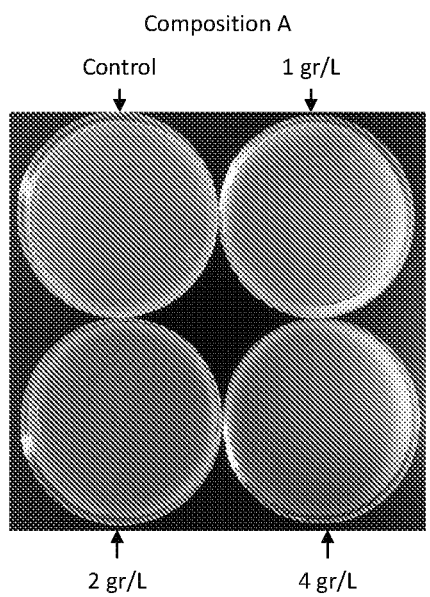
FIGS. 45(a) and (b) show the results of a test using Composition A.
Figure 45B:
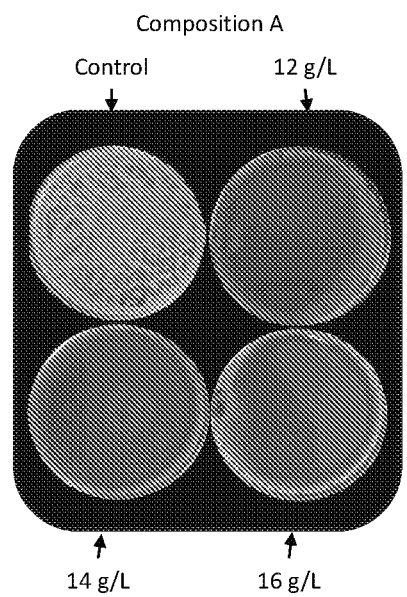

FIGS. 45(a) and (b) show the results of the test using Composition A. The control and the compositions containing 12 g/L, 14 g/L, and 16 g/L exhibited bacterial growth, whereas lack of bacterial growth in the petri dishes exposed to 12 g/L, 14 g/L, and 16 g/L of Composition A showed the antibacterial effect of Composition A.

Example 9

The testing conditions of Example 5C were repeated, except that each of compositions A5, B15, A, and +20 were individually used in place of the formulation used in Example 5. Compositions A5, B15, A, and +20 were tested against *Xanthomonas* sp., using a control, at, e.g., concentrations of 1 g/L, 2 g/L, and 4 g/L.

Figures 46, 47:
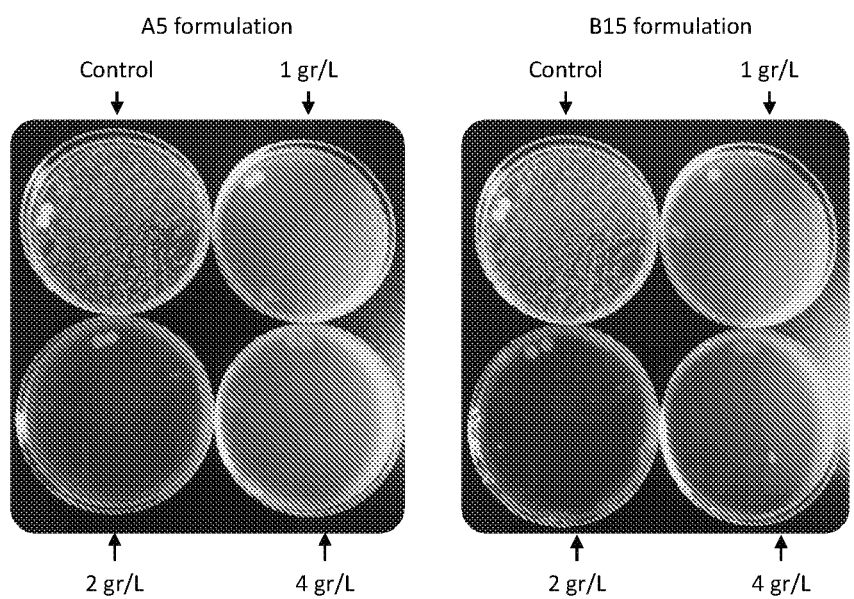
FIG. 46 shows the results of a test using composition A5.
FIG. 47 shows the results of a test using composition B15.

FIG. 46 shows the results of the test using composition A5. The control exhibited bacterial growth, whereas lack of bacterial growth in the petri dishes exposed to 1 g/L, 2 g/L, and 4 g/L of composition A5 showed the antibacterial effect of composition A5.

FIG. 47 shows the results of the test using composition B15. The control exhibited bacterial growth, whereas lack of bacterial growth in the petri dishes exposed to 1 g/L, 2 g/L, and 4 g/L of composition B15 showed the antibacterial effect of composition B15.

FIGS. 48(a)-(c) show the results of the test using composition+20. The control exhibited bacterial growth, whereas lack of bacterial growth in the petri dishes exposed to 14 g/L, 16 g/L, and 18 g/L of composition+20 showed the antibacterial effect of composition +20.

Figure 49:
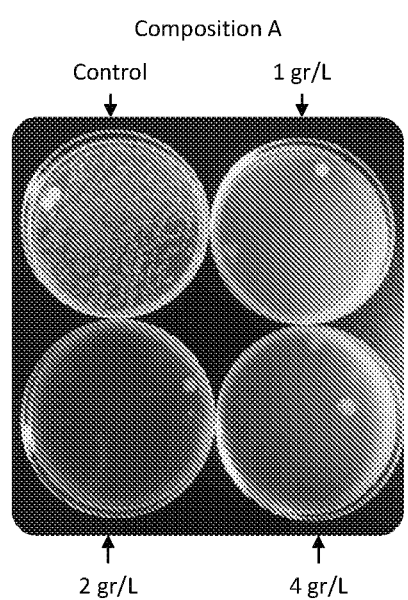
FIG. 49 shows the results of the test using Composition A.

FIG. 49 shows the results of the test using Composition A. The control exhibited bacterial growth, whereas lack of bacterial growth in the petri dishes exposed to 1 g/L, 2 g/L, and 4 g/L of Composition A showed the antibacterial effect of Composition A.

Example 10

An agriculturally acceptable formulation was created having a composition of a mixture of Pre-Mixture A (200 grams, 20% by mass), sodium lignosulfonate (40 grams, 4% by mass), naphthalene sulfonate (20 grams, 2% by mass), xanthan gum (5 grams, 0.50% by mass), and diatomaceous earth (735 grams, 73.50% by mass).

The agriculturally acceptable formulation at a concentration of 2000 g/1000 L of solution was tested, alongside an untreated control, to which no type of antibiotic was applied during the test, in an apple orchard that had a history of strong disease (*Erwinia amylovora*) pressure. The orchard contained and was surrounded by conditions conducive to the development of the disease such as: high moisture content in the upper part of the subsoil, adjacent orchards that had the Gala apple variety with a high contamination in previous years, and a manifestation of zooglea pre-sprouting in its own sectors, which led to the decision to plant new trees in the orchard. The cultivation that was tested was an apple tree of the variety Golden Smoothie.

In this test, five applications were made on 220 trees, using 250 liters of water to cover/4 Ha (hectare) with an airblast sprayer. Trees in the treatment area were sprayed using an airblast sprayer until water run off covering 4 rows. Sprays were timed to coincide with the tree fruit bloom and petal fall. The test area was sprayed once every 6-9 days during bloom season. Thus, the pre-bloom period was covered as well as the flowering period.

The applications were made on the following days at the following dosages:

TABLE 34

| Date | Dosage |
| --- | --- |
| Day 1 | 500 g/Ha |
| Day 9 | 1 kg/Ha |
| Day 15 | 1 kg/Ha |
| Day 24 | 1 kg/Ha |
| Day 33 | 1 kg/Ha |

An evaluation was made on Day 38, a date in which any infection caused by the disease during the bloom period (blossom blight) would be visible.

The experiment was arranged in a paired T-test. Data were analyzed through a T-Test analysis using the statistical package R (R Core Team (2016). R: A language and environment for statistical computing. R Foundation for Statistical Computing, Vienna, Austria. URL https://www.R-project.org/). As noted above, one evaluation was made 5 days after the last spray. Mean data of the number of blossom infection per tree was collected. Data collected from the orchard showed that the effect of the new antibacterial formulation based on tannins was significant ($P<0.05$). Compared with the untreated control, the new antibacterial formulation based on tannins controlled the blossom blight infection.

Figure 50A:
FIGS. 50(a) and (b) show examples of blossom blight that were measured during a test.
Figure 50B:
Figure 51:
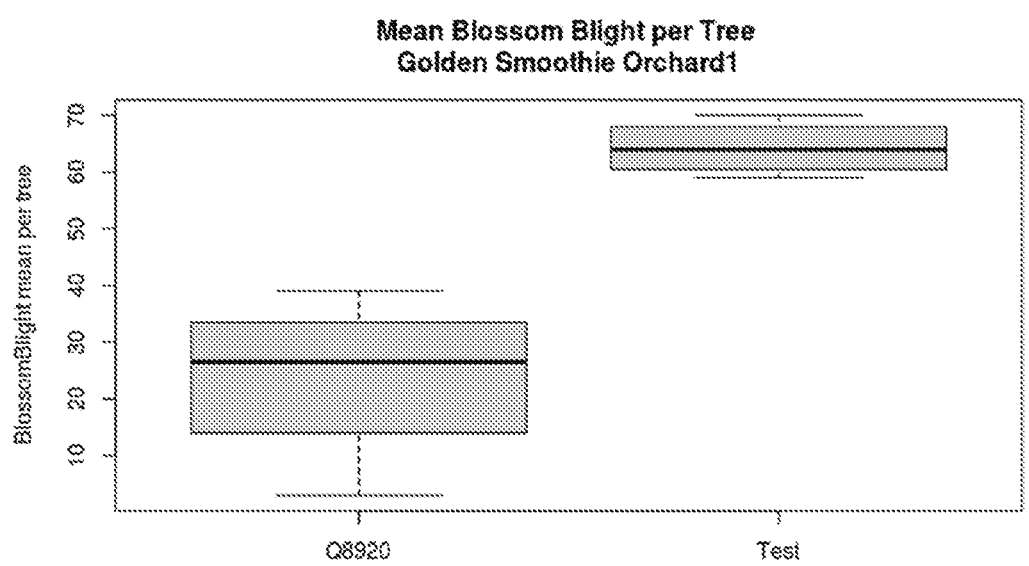
FIG. 51 is a graphical representation of tabular data.

FIGS. 50(a) and (b) show examples of blossom blight that were measured during this test. Table 35 shows the statistics measured in this test. FIG. 51 is a graphical representation of the data in Table 35.

TABLE 35

| | Mean number of blossom blights per tree | |
| --- | --- | --- |
| Tree row | Treated trees | Control |
| 1 | 3 | 62 |
| 2 | 25 | 70 |
| 3 | 39 | 66 |
| 4 | 28 | 59 |

The Shapiro-Wilk normality test value is $W=0.91053$ with a p-value of 0.3578. The t value of this data was $-5.1178$, with a df value of 6 and a p-value of 0.002183.

This experiment showed that the new antibacterial formulation based on tannins showed an effect in decreasing the amount of infected blossom shoots against the control (which was not exposed to the formulation). This is important because each infected bud (blossom blight) is a point of production that is lost during the following 4 years. That is, the productive wood of that floral bud, apart from generating zero production in year of its infection, loses its productive value, generating fruit wood compensation costs and latent risks of future infections.

Example 11

In this experiment, a shoot blights infection (*Erwinia amylovora*) after flowering was present in a Gala apple variety.

In this particular batch, a hail event occurred, and due to the wounds from the hail, an initial shoot blight outbreak occurred. Pruning of the infected initial shoots occurred in both the treatment lot and the control lot, after which the new antibacterial formulation based on tannins was applied to the treatment lot.

Four applications of the new antibacterial formulation based on tannins were scheduled so as to cover the season of high relative humidity due to rain. The applications were made on Day 1, Day 6, Day 11, and Day 18; at a dose of 2.0 kg/Ha.

The applications of the new antibacterial formulation based on tannins were made with an airblast sprayer machine using 1000 liters of solution per Ha, covering 9 rows of 47 trees each. Both in the treated area and in the control, a useful plot of 5 rows was measured. Evaluations were made counting the number of shoot blights per tree on Day 15 and Day 28.

Figure 52:
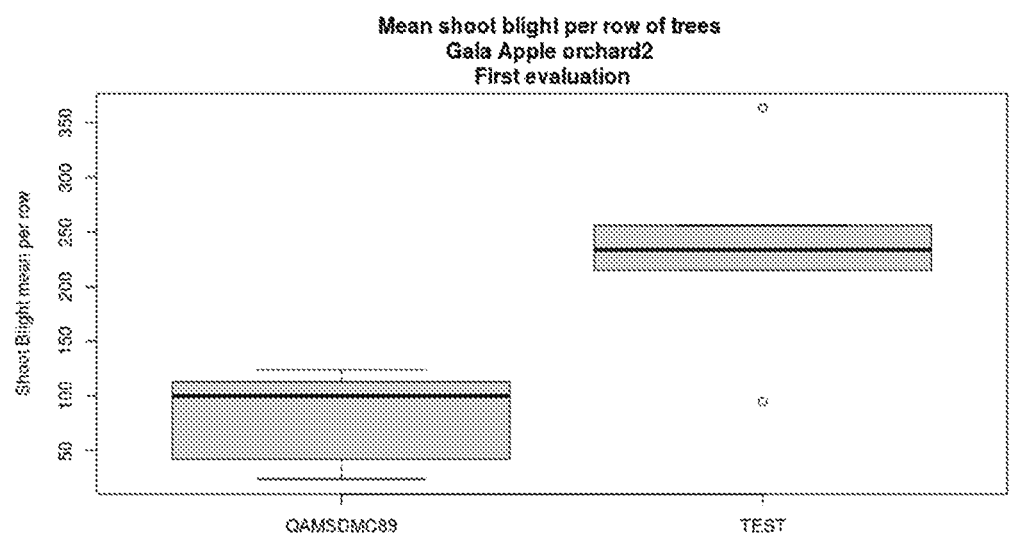
FIG. 52 is a graphical representation of tabular data.

The formulation that was applied in this Example was the formulation described in Example 10 at a concentration of 2000 g of formulation per 1000 liters of water. Trees in the treatment area were sprayed using an airblast sprayer until water run off. In this test, sprays were timed every 5 days post-petal fall to cover further shoot infections, known as "shoot blights." The test area was sprayed once every 5 days for three cycles, and one time 7 days after the third application. The experiment was arranged in a paired T-test. Data were analyzed through a T-Test analysis using the statistical package R (R Core Team (2016). R: A language and environment for statistical computing. R Foundation for Statistical Computing, Vienna, Austria. URL https://www.R-project.org/). A first evaluation was made 4 days after the third spray. Data of the number of shoot blights per row was collected. Data collected from this test in the first evaluation showed that the effect of the invention was significant (P<0.05). Compared with the untreated control, the new antibacterial formulation based on tannins controlled the post-petal fall infection known as shoot blights (see Table 36). FIG. 52 is a graphical representation of the data in Table 3.

TABLE 36

| Tree row | Mean number of shoot blights per row | |
|---|---|---|
| | Treated trees | Control |
| 1 | 42 | 256 |
| 2 | 24 | 363 |
| 3 | 100 | 234 |
| 4 | 113 | 215 |
| 5 | 124 | 95 |

The Shapiro-Wilk normality test value was W=0.93245, with a p-value of 0.4724. The mean in the treated group was 80.6, whereas the mean in the untreated group was 232.6, thus exemplifying the antibacterial effect of this composition. The t value of this data was −3.2116, with a df value of 8 and a p-value of 0.0124.

Figure 53:
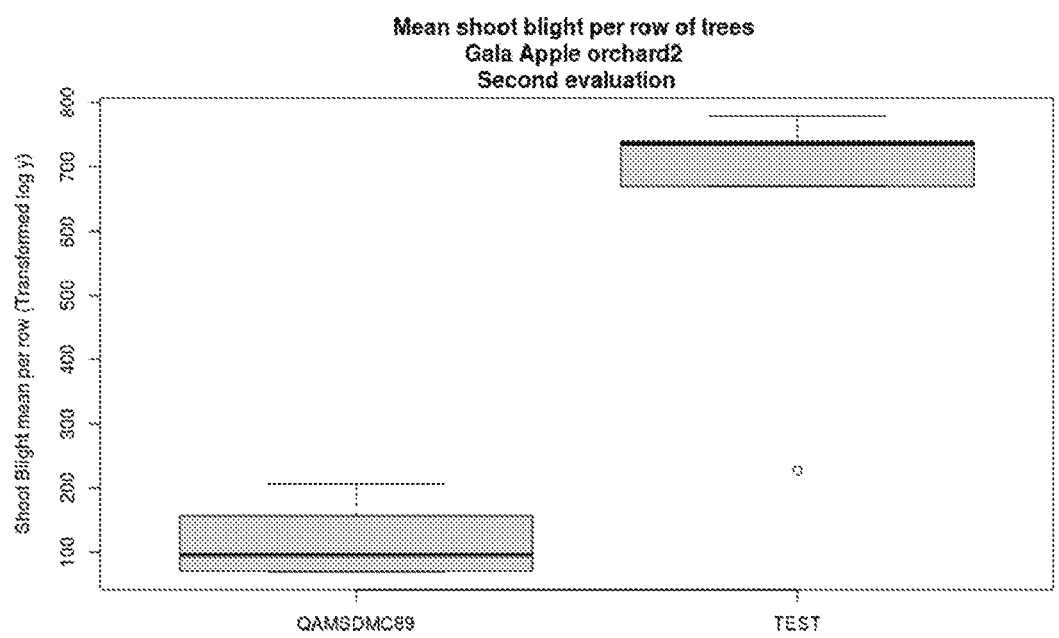
FIG. 53 is a graphical representation of tabular data.

A second evaluation was made 10 days after the fourth spray. Field data were transformed (log [y]) to reduce variance. Data collected from this test in the second evaluation showed that the effect of the new antibacterial formulation based on tannins was significant (P<0.05). Compared with the untreated control, the new antibacterial formulation based on tannins controlled the post-petal fall infection known as shoot blights (see Table 4). FIG. 53 is a graphical representation of the data in Table 37.

TABLE 37

| Tree row | Mean number of shoot blights per row transformed (log [y]) | |
|---|---|---|
| | Treated trees | Control |
| 1 | 1.982271 | 2.891537 |
| 2 | 1.845098 | 2.869232 |

TABLE 37-continued

| Tree row | Mean number of shoot blights per row transformed (log [y]) | |
|---|---|---|
| | Treated trees | Control |
| 3 | 1.851258 | 2.826075 |
| 4 | 2.313867 | 2.866878 |
| 5 | 2.1959 | 2.356026 |

The Shapiro-Wilk value of this transformed data was W=0.8547, with a p-value of 0.06605. The mean in the treated group was 2.037679, whereas the mean in the untreated group was 2.761950, thereby illustrating the antibacterial effect of this composition. The t value of this data was −5.2241, with a df of 8 and a p-value of 0.0007986.

Figure 54A:
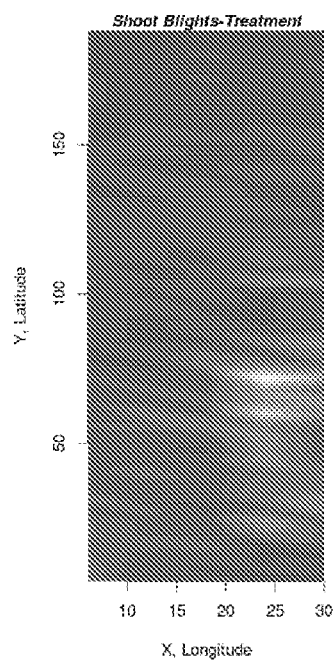
FIGS. 54(a) and (b) are linear prediction maps (Kriging).
Figure 54B:
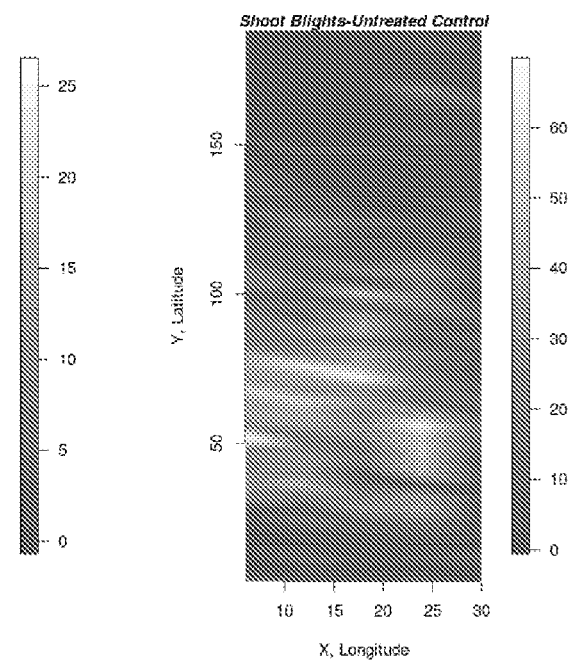

Linear prediction maps (Kriging) were made after Day 28 and are shown in FIGS. 54(a) and (b). FIG. 54(a) shows the number of shoot blights in the area treated with the new antibacterial formulation based on tannins. FIG. 54(b) shows the control area, which was adjacent to the test area. The images simulate an aerial view of the crop, where with each of the values of shoot blight, an interpolation was made between the points (in this Example, apple trees). The scale on the right indicates the colors assigned by number of infected shoots (shoot blights), the white colors being the indicator of the greatest number of infected spots in the area.

This Example shows that the use of the new antibacterial formulation based on tannins in the cultivation of Gala apple trees at a rate of 2 kg/ha provides for a significant improvement against an untreated control in terms of the mean number of infected shoots per row (shoot blights).

Example 12

An agriculturally acceptable formulation was created having the composition of Example 10—a mixture of Pre-Mixture A (200 grams, 20% by mass), sodium lignosulfonate (40 grams, 4% by mass), naphthalene sulfonate (20 grams, 2% by mass), xanthan gum (5 grams, 0.50% by mass), and diatomaceous earth (735 grams, 73.50% by mass). A solution of the agriculturally acceptable formulation in water was created, having a concentration of 7.5 grams of the agriculturally acceptable formulation per liter. 37.5 g of the solution was weighed and added to agar, using the poisoned food technique of Example 1A.

The pathogenic fungus *Alternaria* sp. was added to the agar and was incubated at 28° C. for 120 hours. This was repeated in four petri dishes. Following incubation, an evaluation was made in which the measurements of the fungal growth diameters in the agriculturally acceptable formulation-containing agar was compared with the diameter of four controls which contained the agriculturally acceptable formulation but did not contain the pathogenic fungus. A Percentage of Inhibition was calculated from each sample using the following formula, and the mean of the four repetitions was taken as the inhibition percentage for the Example:

Percentage of Inhibition=((Radial growth of the control−Radial growth of the pathogen)/Radial growth of the control))*100

Figures 55A, 55B:
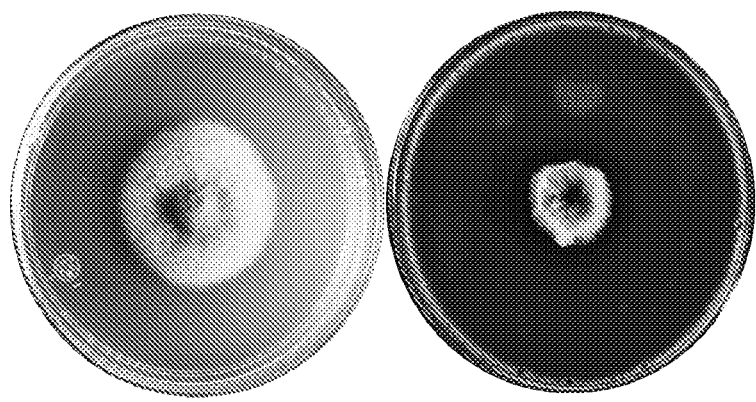
FIGS. 55(a) and (b) show the results of a test against *Alternaria* sp.

FIG. 55 shows the results of the test, and shows that the agriculturally acceptable formulation inhibited the growth of *Alternaria* sp. FIG. 55(a) is the control, and FIG. 55(b) is the tested composition. The inhibition percentage for *Alternaria* sp. was measured to be 51.4%.

Example 13

Figures 56A, 56B:
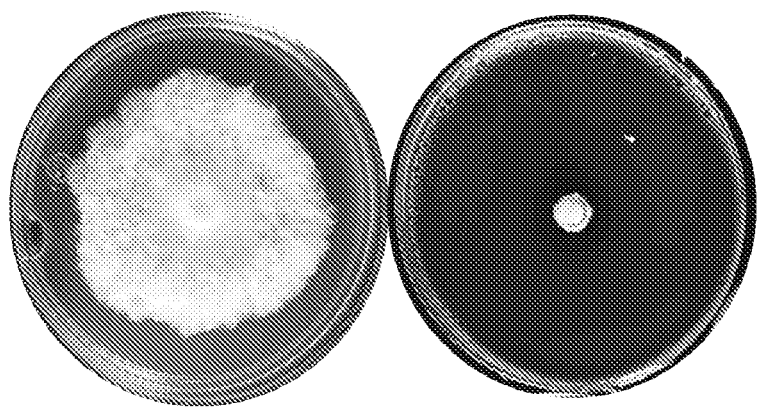
FIGS. 56(a) and (b) show the results of a test against *Phytophthora* sp.

The conditions of Example 12 were reproduced, with the exception that the pathological fungus was *Phytophthora* sp. FIG. 56 shows the results of the test, and shows that the agriculturally acceptable formulation inhibited the growth of *Phytophthora* sp. FIG. 56(*a*) is the control, and FIG. 56(*b*) is the tested composition. The inhibition percentage for *Phytophthora* sp. was measured to be 100%.

Example 14

Figures 57A, 57B:
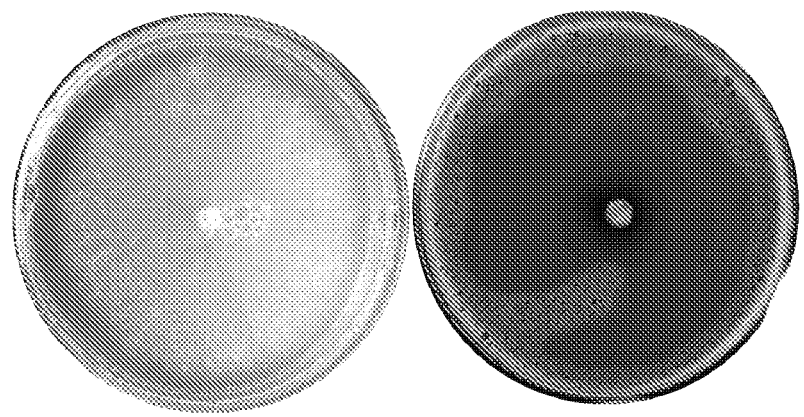
FIGS. 57(a) and (b) show the results of a test against *Colletotrichum* sp.

The conditions of Example 12 were reproduced, with the exception that the pathological fungus was *Colletotrichum* sp. FIG. 57 shows the results of the test, and shows that the agriculturally acceptable formulation inhibited the growth of *Colletotrichum* sp. FIG. 57(*a*) is the control, and FIG. 57(*b*) is the tested composition. The inhibition percentage for *Colletotrichum* sp. was measured to be 100%.

Example 15A

Figures 58A, 58B:
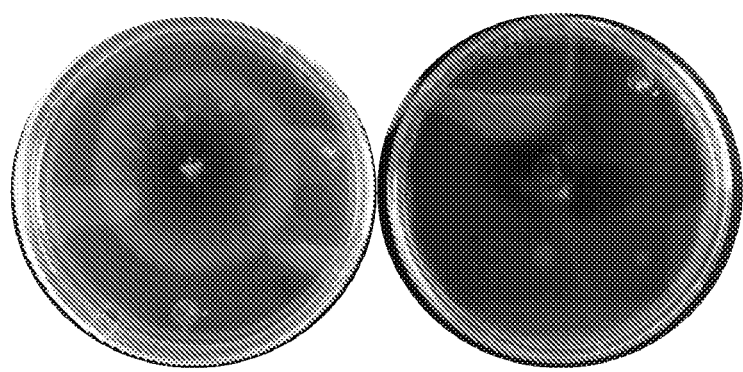
FIGS. 58(a) and (b) show the results of a test against *Fusarium* sp.

The conditions of Example 12 were reproduced, with the exception that the pathological fungus was *Fusarium* sp. FIG. 58 shows the results of the test, and shows that the agriculturally acceptable formulation inhibited the growth of *Fusarium* sp. FIG. 58(*a*) is the control, and FIG. 58(*b*) is the tested composition. The inhibition percentage for *Fusarium* sp. was measured to be 69.49%.

Example 15B

Figures 59A, 59B:
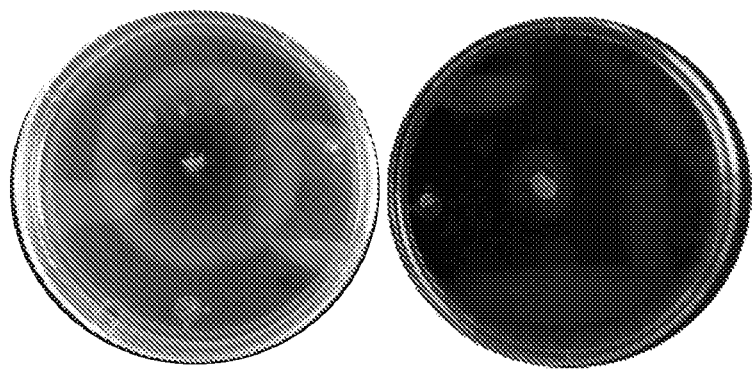
FIGS. 59(a) and (b) show the results of a test against *Fusarium* sp.

The conditions of Example 15A were reproduced, with the exception that the composition tested was a tannin composition extracted from Quebracho tree (genus Schinopsis) (composition "QAMAEA6Q03"). FIG. 59 shows the results of the test, and shows that the agriculturally acceptable formulation inhibited the growth of *Fusarium* sp. FIG. 59(*a*) is the control, and FIG. 59(*b*) is the tested composition. The inhibition percentage for *Fusarium* sp. was measured to be 64.89%.

Example 15C

Figures 60A, 60B:
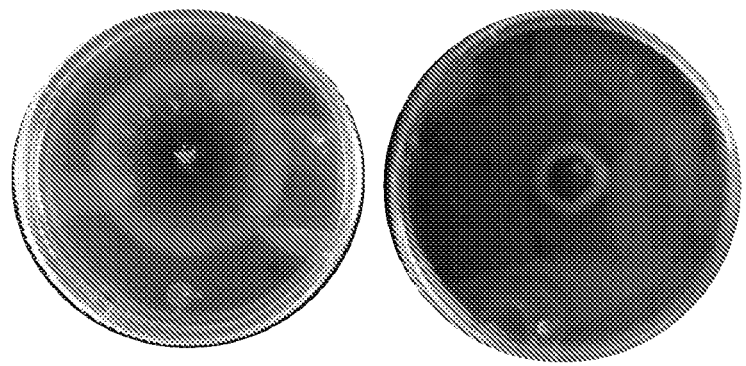
FIGS. 60(a) and (b) show the results of a test against *Fusarium* sp.

The conditions of Example 15A were reproduced, with the exception that the composition tested was a tannin composition extracted from Acacia tree (genus Acacia) (composition "QAMMSAPA06"). FIG. 60 shows the results of the test, and shows that the agriculturally acceptable formulation inhibited the growth of *Fusarium* sp. FIG. 60(*a*) is the control, and FIG. 60(*b*) is the tested composition. The inhibition percentage for *Fusarium* sp. was measured to be 63.78%.

Example 16A

Figures 61A, 61B:
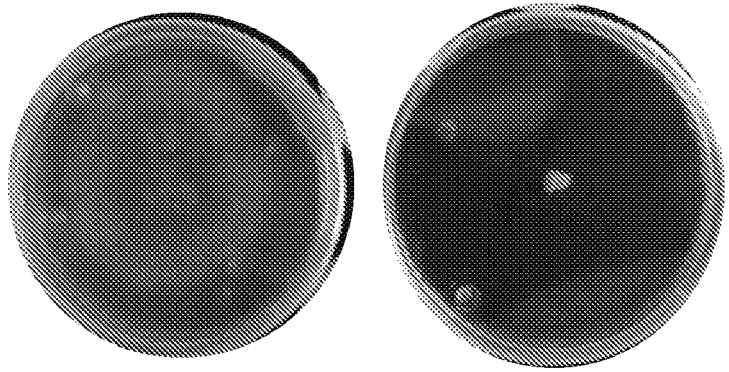
FIGS. 61(a) and (b) show the results of a test against *Aspergillus* sp.

The conditions of Example 12 were reproduced, with the exception that the pathological fungus was *Aspergillus* sp. FIG. 61 shows the results of the test, and shows that the agriculturally acceptable formulation inhibited the growth of *Aspergillus* sp. FIG. 61 (*a*) is the control, and FIG. 61 (*b*) is the tested composition. The inhibition percentage for *Aspergillus* sp. was measured to be 89.76%.

Example 16B

Figures 62A, 62B:
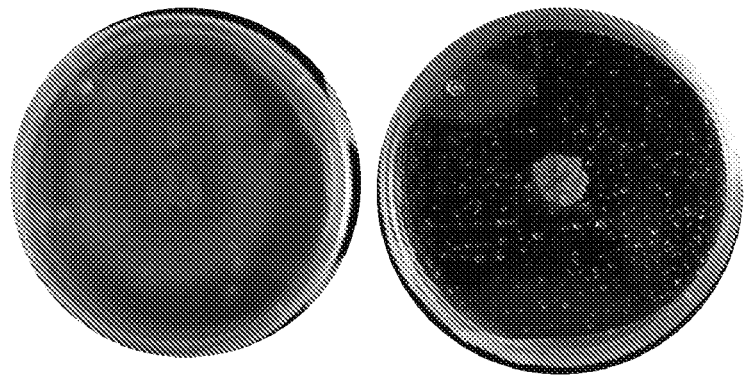
FIGS. 62(a) and (b) show the results of a test against *Aspergillus* sp.

The conditions of Example 16A were reproduced, with the exception that the composition tested was a tannin composition extracted from Quebracho tree (genus Schinopsis) (composition "QAMAEA6Q03"). FIG. 62 shows the results of the test, and shows that the agriculturally acceptable formulation inhibited the growth of *Aspergillus* sp. FIG. 62(*a*) is the control, and FIG. 62(*b*) is the tested composition. The inhibition percentage for *Aspergillus* sp. was measured to be 78.92%.

Example 16C

Figures 63A, 63B:
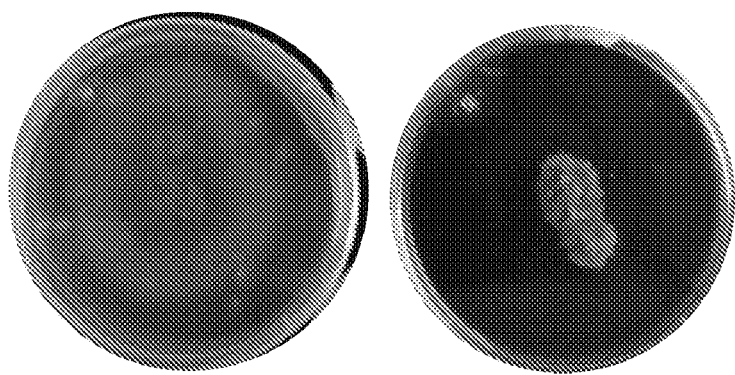
FIGS. 63(a) and (b) show the results of a test against *Aspergillus* sp.

The conditions of Example 16A were reproduced, with the exception that the composition tested was a tannin composition extracted from Acacia tree (genus Acacia) (composition "QAMMSAPA06"). FIG. 63 shows the results of the test, and shows that the agriculturally acceptable formulation inhibited the growth of *Aspergillus* sp. FIG. 63(*a*) is the control, and FIG. 63(*b*) is the tested composition. The inhibition percentage for *Aspergillus* sp. was measured to be 68.79%.

Example 17A

Figure 64:
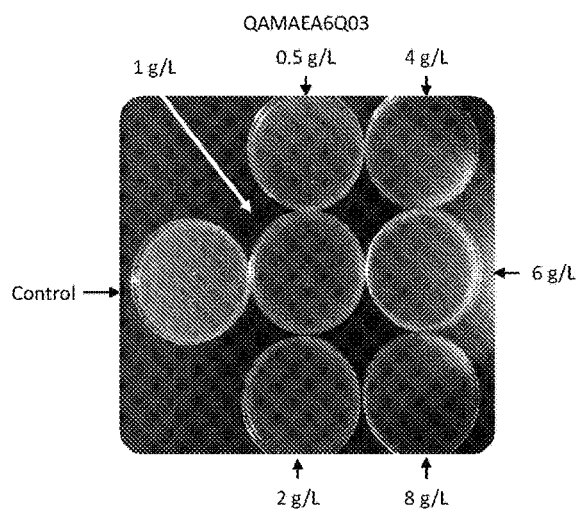
FIG. 64 shows the results of a test against *Clavibacter* sp.

The conditions of Example 1A were reproduced, with the exception that a tannin composition extracted from Quebracho tree (genus Schinopsis) (composition "QAMAEA6Q03") was tested. As can be seen from FIG. 64, effective doses of the composition in this test were deemed to be 4 g/L, 6 g/L, and 8 g/L, which were the concentrations at which the *Clavibacter* sp. grew at a much lower rate than the control. In the 4 g/L, 6 g/L, and 8 g/L concentrations, the *Clavibacter* sp. was not visibly present, and hence did not grow in the agar.

Example 17B

Figure 65:
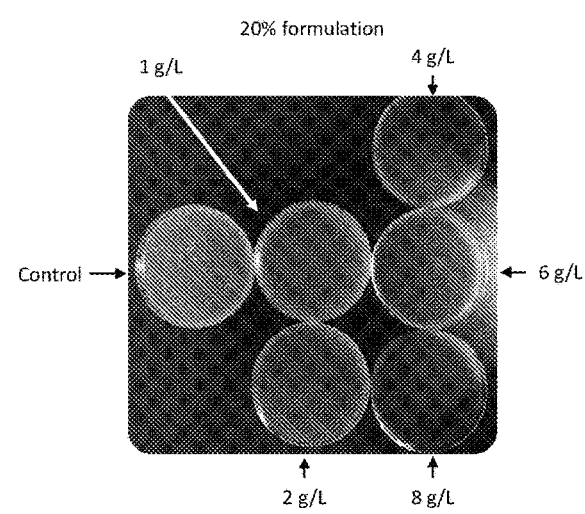
FIG. 65 shows the results of a test against *Clavibacter* sp.

The conditions of Example 17A were reproduced, with the exception that a composition comprising 20% of QAMAEA6Q3 was tested. As can be seen from FIG. 65, effective doses of the composition in this test were deemed to be 2 g/L, 4 g/L, 6 g/L, and 8 g/L, which were the concentrations at which the *Clavibacter* sp. grew at a much lower rate than the control. In the 2 g/L, 4 g/L, 6 g/L, and 8 g/L concentrations, the *Clavibacter* sp. was not visibly present, and hence did not grow in the agar.

Example 18A

Figure 66:
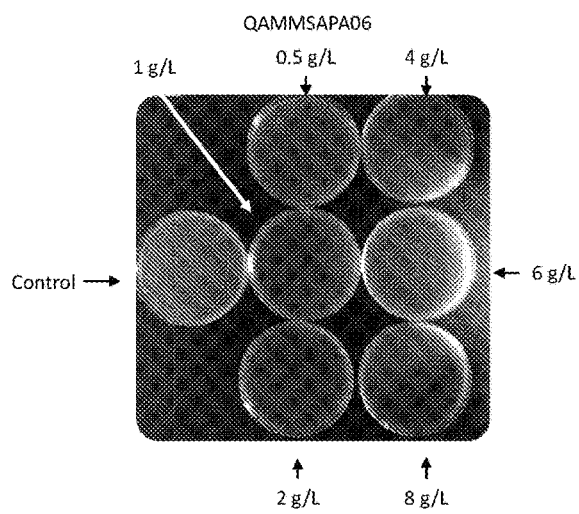
FIG. 66 shows the results of a test against *Clavibacter* sp.

The conditions of Example 1A were reproduced, with the exception that a tannin composition extracted from Acacia tree (genus Acacia) (composition "QAMMSAPA06") was tested. As can be seen from FIG. 66, effective doses of the composition in this test were deemed to be 0.5 g/L, 1 g/L, 2 g/L, 4 g/L, 6 g/L, and 8 g/L, which were the concentrations at which the *Clavibacter* sp. grew at a much lower rate than the control. In the 0.5 g/L, 1 g/L, 2 g/L, 4 g/L, 6 g/L, and 8 g/L concentrations, the *Clavibacter* sp. was not visibly present, and hence did not grow in the agar.

Example 18B

Figure 67:
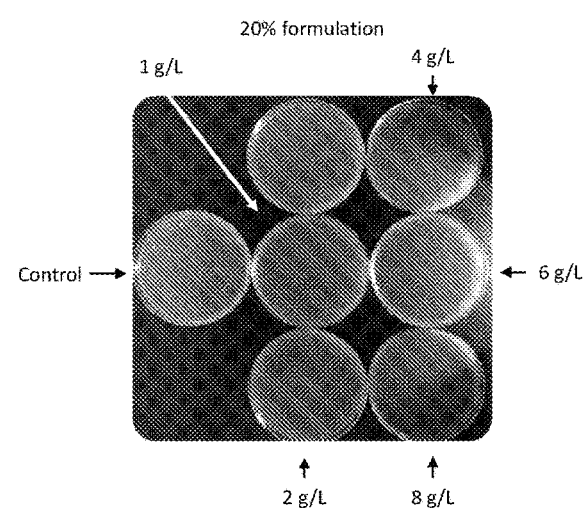
FIG. 67 shows the results of a test against *Clavibacter* sp.

The conditions of Example 18A were reproduced, with the exception that a composition comprising 20% of QAMMSAPA06 was tested. As can be seen from FIG. 67, effective doses of the composition in this test were deemed to be 1 g/L, 2 g/L, 4 g/L, 6 g/L, and 8 g/L, which were the concentrations at which the *Clavibacter* sp. grew at a much lower rate than the control. In the 1 g/L, 2 g/L, 4 g/L, 6 g/L, and 8 g/L concentrations, the *Clavibacter* sp. was not visibly present, and hence did not grow in the agar.

Example 19A

Figure 68:
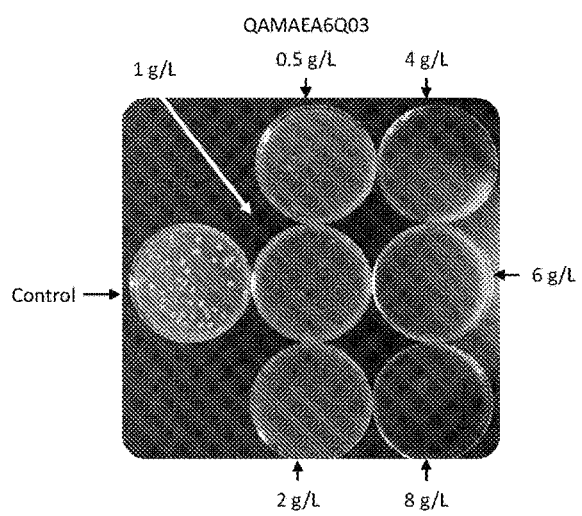
FIG. 68 shows the results of a test against *Erwinia* sp.

The conditions of Example 2A were reproduced, with the exception that a tannin composition extracted from Quebracho tree (genus Schinopsis) (composition "QAMAEA6Q03") was tested. As can be seen from FIG. 68, effective doses of the composition in this test were deemed to be 2 g/L, 4 g/L, 6 g/L, and 8 g/L, which were the concentrations at which the *Erwinia* sp. grew at a much lower rate than the control. In the 2 g/L, 4 g/L, 6 g/L, and 8 g/L concentrations, the *Erwinia* sp. was not visibly present, and hence did not grow in the agar.

Example 19B

Figure 69:
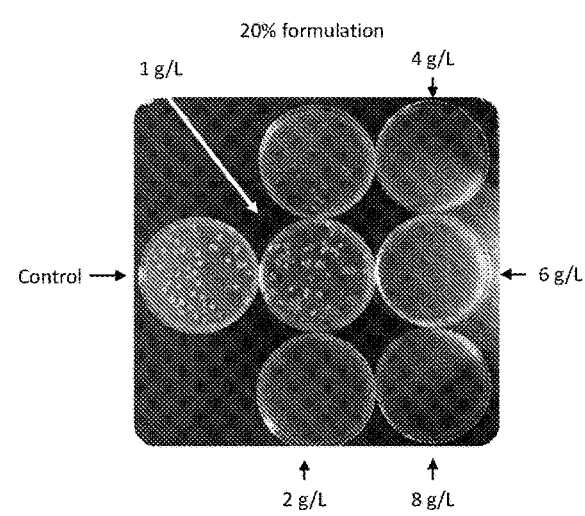
FIG. 69 shows the results of a test against *Erwinia* sp.

The conditions of Example 19A were reproduced, with the exception that a composition comprising 20% of QAMAEA6Q03 was tested. As can be seen from FIG. 69, effective doses of the composition in this test were deemed to be 4 g/L, 6 g/L, and 8 g/L, which were the concentrations at which the *Erwinia* sp. grew at a much lower rate than the control. In the 4 g/L, 6 g/L, and 8 g/L concentrations, the *Erwinia* sp. was not visibly present, and hence did not grow in the agar.

Example 20A

Figure 70:
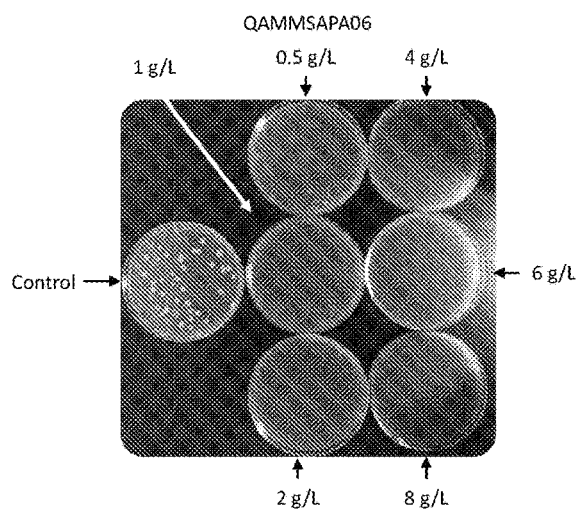
FIG. 70 shows the results of a test against *Erwinia* sp.

The conditions of Example 2A were reproduced, with the exception that a tannin composition extracted from Acacia tree (genus Acacia) (composition "QAMMSAPA06") was tested. As can be seen from FIG. 70, effective doses of the composition in this test were deemed to be 1 g/L, 2 g/L, 4 g/L, 6 g/L, and 8 g/L, which were the concentrations at which the *Erwinia* sp. grew at a much lower rate than the control. In the 1 g/L, 2 g/L, 4 g/L, 6 g/L, and 8 g/L concentrations, the *Erwinia* sp. was not visibly present, and hence did not grow in the agar.

Example 20B

Figure 71:
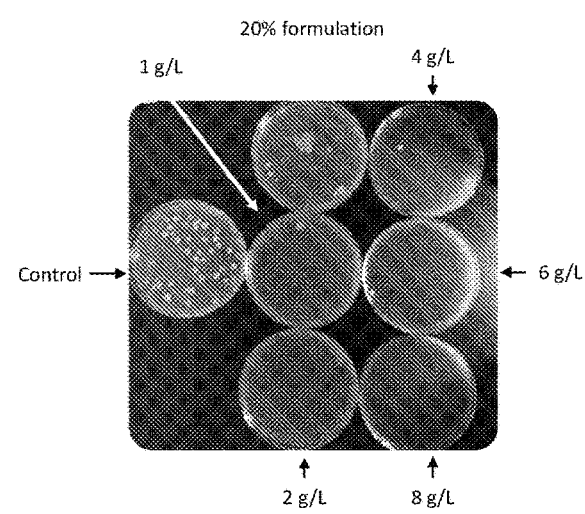
FIG. 71 shows the results of a test against *Erwinia* sp.

The conditions of Example 20A were reproduced, with the exception that a composition comprising 20% of QAMMSAPA06 was tested. As can be seen from FIG. 71, effective doses of the composition in this test were deemed to be 1 g/L, 2 g/L, 4 g/L, 6 g/L, and 8 g/L, which were the concentrations at which the *Erwinia* sp. grew at a much lower rate than the control. In the 1 g/L, 2 g/L, 4 g/L, 6 g/L, and 8 g/L concentrations, the *Erwinia* sp. was not visibly present, and hence did not grow in the agar.

Example 21A

Figure 72:
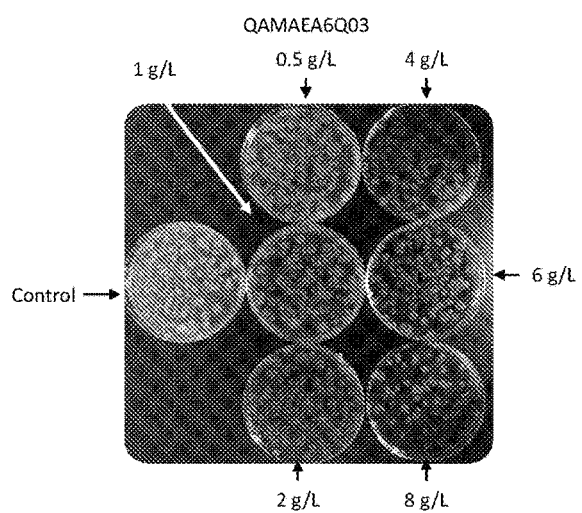
FIG. 72 shows the results of a test against *Ralstonia* sp.

The conditions of Example 4A were reproduced, with the exception that a tannin composition extracted from Quebracho tree (genus Schinopsis) (composition "QAMAEA6Q03") was tested. As can be seen from FIG. 72, a dose higher than 8 g/L is necessary to treat or prevent *Ralstonia* sp.

Example 21B

Figure 73:
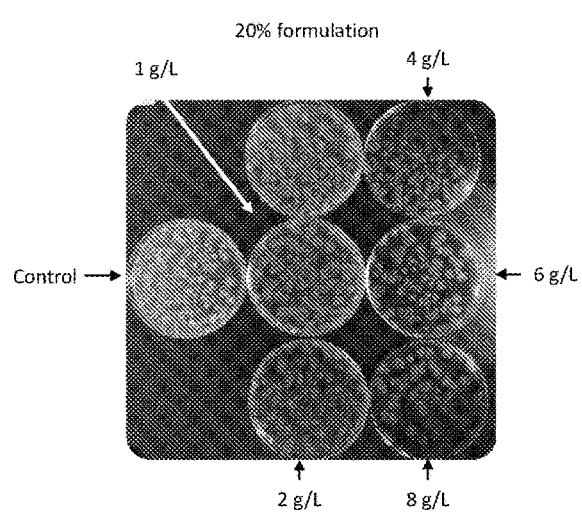
FIG. 73 shows the results of a test against *Ralstonia* sp.

The conditions of Example 21A were reproduced, with the exception that a composition comprising 20% of QAMAEA6Q03 was tested. As can be seen from FIG. 73, a dose higher than 8 g/L is necessary to treat or prevent *Ralstonia* sp.

Example 22A

Figure 74:
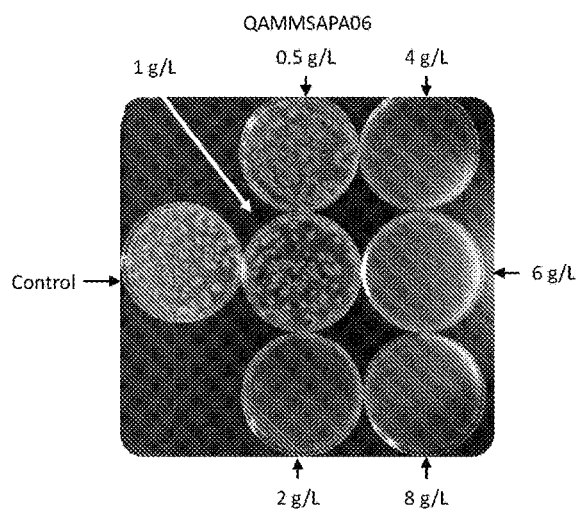
FIG. 74 shows the results of a test against *Ralstonia* sp.

The conditions of Example 4A were reproduced, with the exception that a tannin composition extracted from Acacia tree (genus Acacia) (composition "QAMMSAPA06") was tested. As can be seen from FIG. 74, effective doses of the composition in this test were deemed to be 2 g/L, 4 g/L, 6 g/L, and 8 g/L, which were the concentrations at which the *Ralstonia* sp. grew at a much lower rate than the control. In the 2 g/L, 4 g/L, 6 g/L, and 8 g/L concentrations, the *Ralstonia* sp. was not visibly present, and hence did not grow in the agar.

Example 22B

Figure 75:
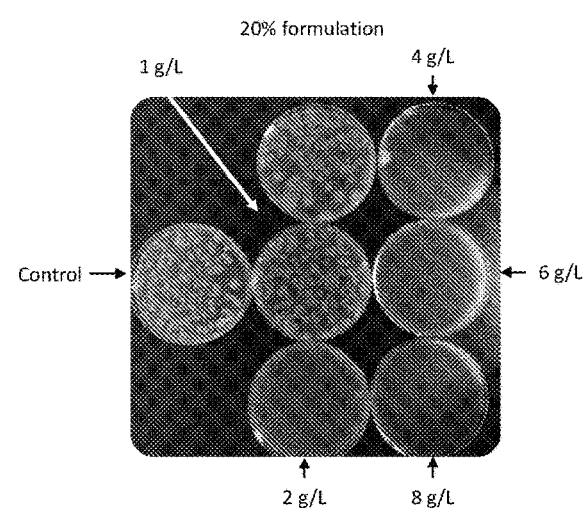
FIG. 75 shows the results of a test against *Ralstonia* sp.

The conditions of Example 22A were reproduced, with the exception that a composition comprising 20% of QAMMSAPA06 was tested. As can be seen from FIG. 75, effective doses of the composition in this test were deemed to be 2 g/L, 4 g/L, 6 g/L, and 8 g/L, which were the concentrations at which the *Ralstonia* sp. grew at a much lower rate than the control. In the 2 g/L, 4 g/L, 6 g/L, and 8 g/L concentrations, the *Ralstonia* sp. was not visibly present, and hence did not grow in the agar.

Example 22A

Figure 76:
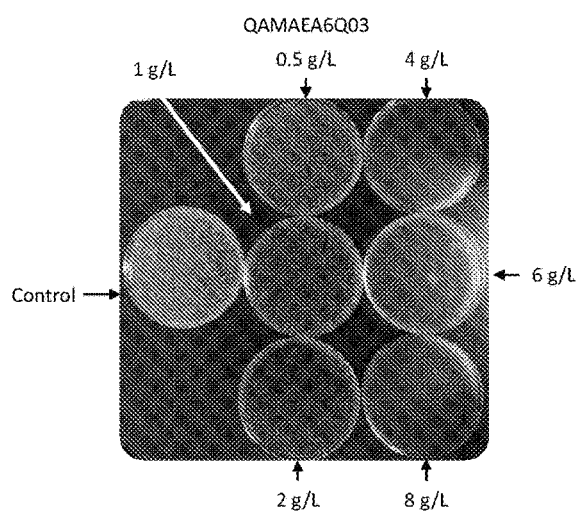
FIG. 76 shows the results of a test against *Xanthomonas* sp.

The conditions of Example 5A were reproduced, with the exception that a tannin composition extracted from Quebracho tree (genus Schinopsis) (composition "QAMAEA6Q03") was tested. As can be seen from FIG. 76, effective doses of the composition in this test were deemed to be 4 g/L, 6 g/L, and 8 g/L, which were the concentrations at which the *Xanthomonas* sp. grew at a much lower rate than the control. In the 2 g/L, 6 g/L, and 8 g/L concentrations, the *Xanthomonas* sp. was not visibly present, and hence did not grow in the agar.

Example 22B

Figure 77:
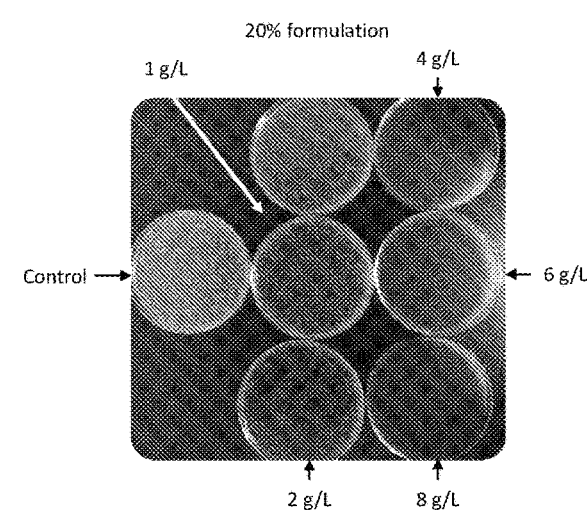
FIG. 77 shows the results of a test against *Xanthomonas* sp.

The conditions of Example 22A were reproduced, with the exception that a composition comprising 20% of QAMAEA6Q03 was tested. As can be seen from FIG. 77, effective doses of the composition in this test were deemed to be 4 g/L, 6 g/L, and 8 g/L, which were the concentrations at which the *Xanthomonas* sp. grew at a much lower rate than the control. In the 4 g/L, 6 g/L, and 8 g/L concentrations, the *Xanthomonas* sp. was not visibly present, and hence did not grow in the agar.

Example 23A

Figure 78:
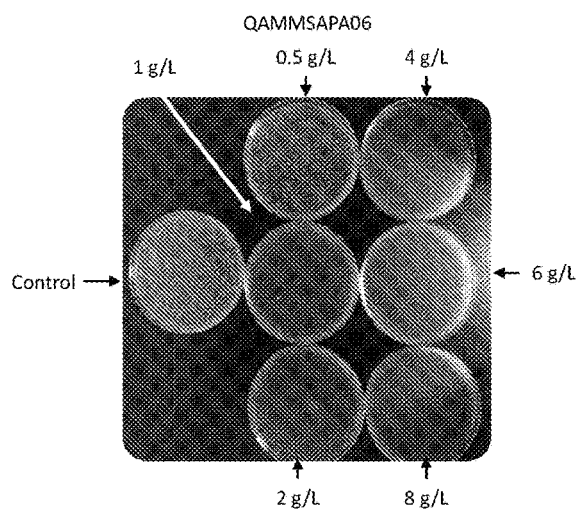
FIG. 78 shows the results of a test against *Xanthomonas* sp.

The conditions of Example 5A were reproduced, with the exception that a tannin composition extracted from Acacia tree (genus Acacia) (composition "QAMMSAPA06") was tested. As can be seen from FIG. 78, effective doses of the composition in this test were deemed to be 1 g/L, 2 g/L, 4 g/L, 6 g/L, and 8 g/L, which were the concentrations at which the *Xanthomonas* sp. grew at a much lower rate than the control. In the 1 g/L, 2 g/L, 4 g/L, 6 g/L, and 8 g/L concentrations, the *Xanthomonas* sp. was not visibly present, and hence did not grow in the agar.

Example 23B

Figure 79:
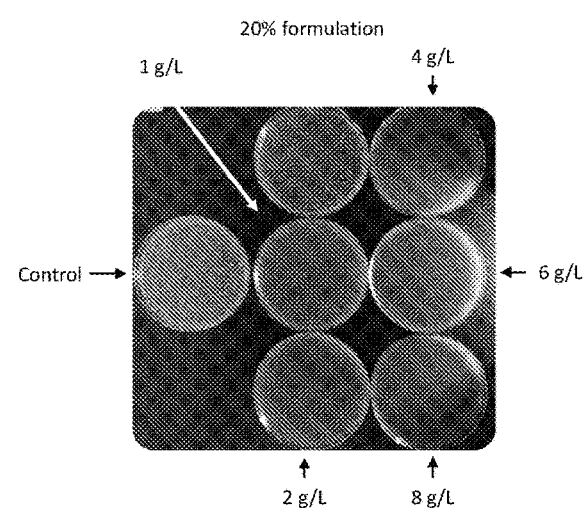
FIG. 79 shows the results of a test against *Xanthomonas* sp.

The conditions of Example 23A were reproduced, with the exception that a composition comprising 20% of QAMMSAPA06 was tested. As can be seen from FIG. 79, effective doses of the composition in this test were deemed to be 1 g/L, 2 g/L, 4 g/L, 6 g/L, and 8 g/L, which were the concentrations at which the *Xanthomonas* sp. grew at a much lower rate than the control. In the 1 g/L, 2 g/L, 4 g/L, 6 g/L, and 8 g/L concentrations, the *Xanthomonas* sp. was not visibly present, and hence did not grow in the agar.

Example 24A

Figure 80:
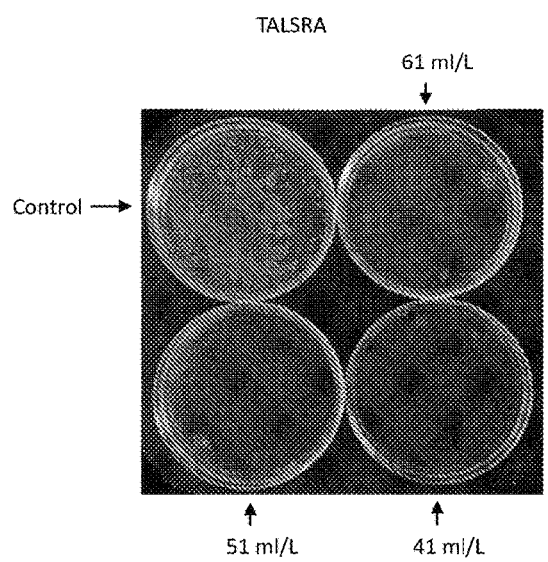
FIG. 80 shows the results of a test against *Xanthomonas* sp.
Figure 81:
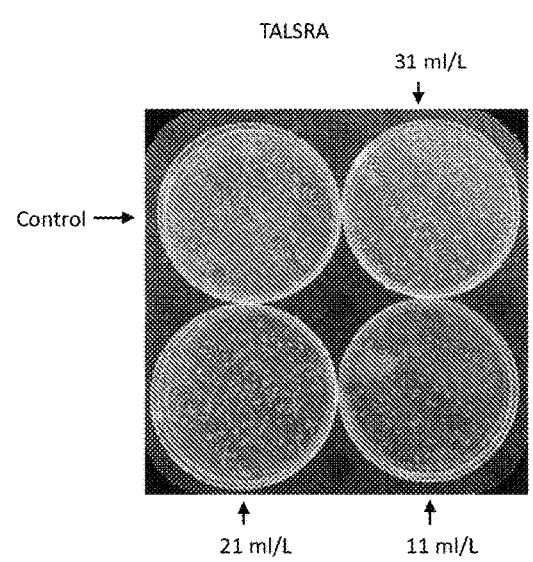
FIG. 81 shows the results of a test against *Xanthomonas* sp.

The conditions of Example 5A were reproduced, with the exception that a synthetic tannin composition ("TALSRA"; containing 3% tannins) was tested. As can be seen from FIGS. 80 and 81, effective doses of the composition in this test were deemed to be 41 ml/L, 51 ml/L, and 61 ml/L, which were the concentrations at which the *Xanthomonas* sp. grew at a much lower rate than the control. In the 41 ml/L, 51 ml/L, and 61 ml/L concentrations, the *Xanthomonas* sp. was not visibly present, and hence did not grow in the agar.

Example 24B

Figure 82:
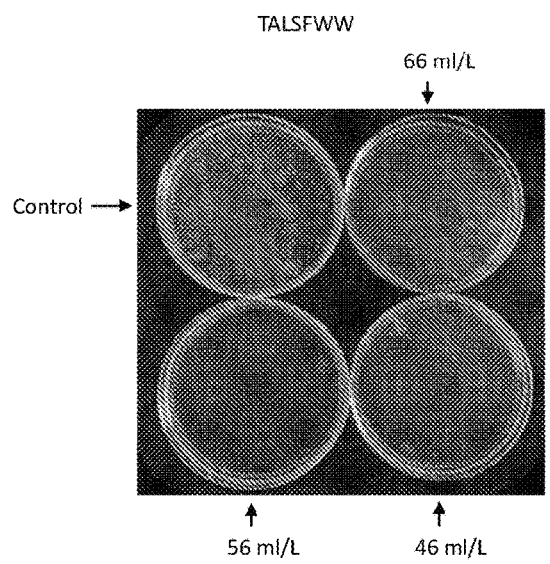
FIG. 82 shows the results of a test against *Xanthomonas* sp.
Figure 83:
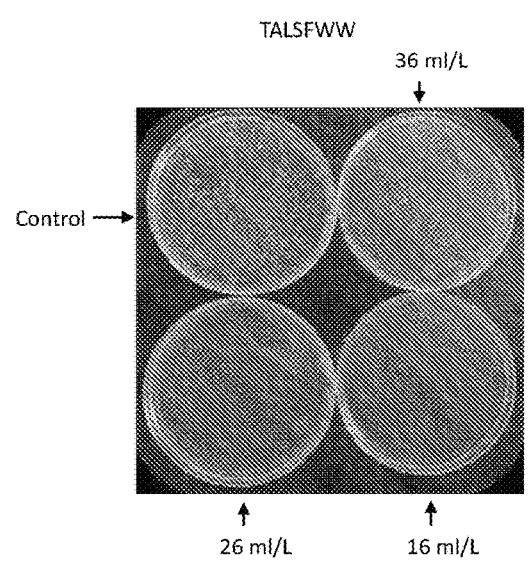
FIG. 83 shows the results of a test against *Xanthomonas* sp.

The conditions of Example 24A were reproduced, with the exception that a different synthetic tannin composition ("TALSFWW"; containing 3% tannins) was tested. As can be seen from FIGS. 82 and 83, effective doses of the composition in this test were deemed to be 46 ml/L, 56 ml/L, and 66 ml/L, which were the concentrations at which the *Xanthomonas* sp. grew at a much lower rate than the control. In the 46 ml/L, 56 ml/L, and 66 ml/L concentrations, the *Xanthomonas* sp. was not visibly present, and hence did not grow in the agar.

Example 25A

Figure 84:
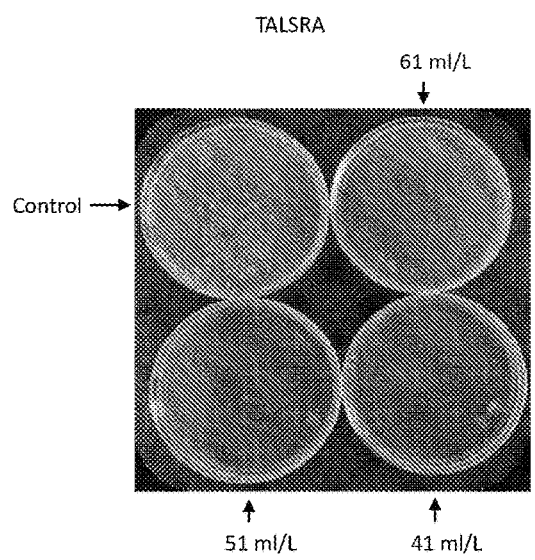
FIG. 84 shows the results of a test against *Erwinia* sp.
Figure 85:
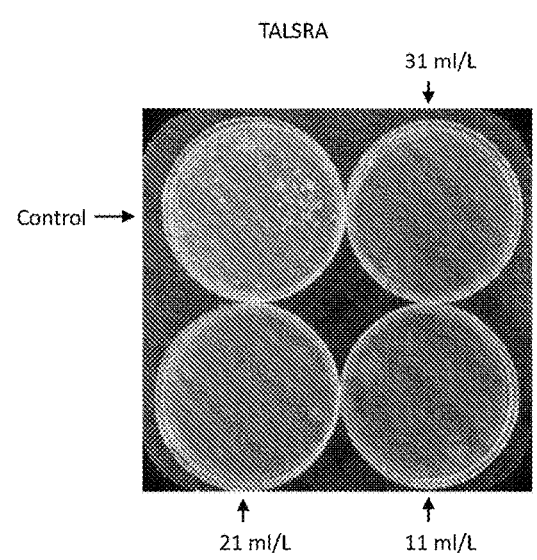
FIG. 85 shows the results of a test against *Erwinia* sp.

The conditions of Example 2A were reproduced, with the exception that a synthetic tannin composition ("TALSRA"; containing 3% tannins) was tested. As can be seen from FIGS. 84 and 85, effective doses of the composition in this test were deemed to be 11 ml/L, 21 ml/L, 31 ml/L, 41 ml/L, 51 ml/L, and 61 ml/L, which were the concentrations at which the *Erwinia* sp. grew at a much lower rate than the control. In the 11 ml/L, 21 ml/L, 31 ml/L, 41 ml/L, 51 ml/L, and 61 ml/L concentrations, the *Erwinia* sp. was not visibly present, and hence did not grow in the agar.

Example 25B

Figure 86:
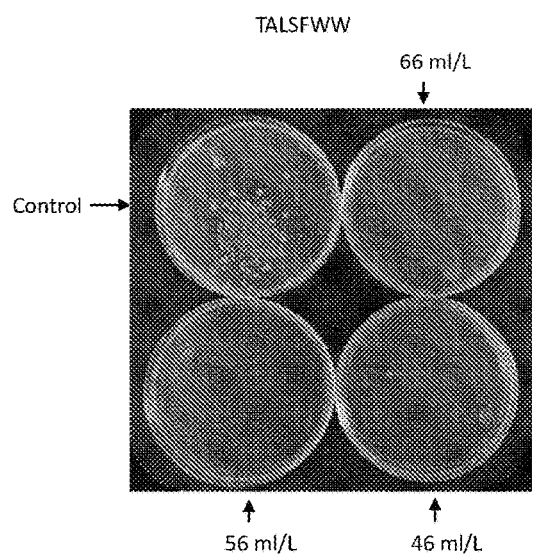
FIG. 86 shows the results of a test against *Erwinia* sp.
Figure 87:
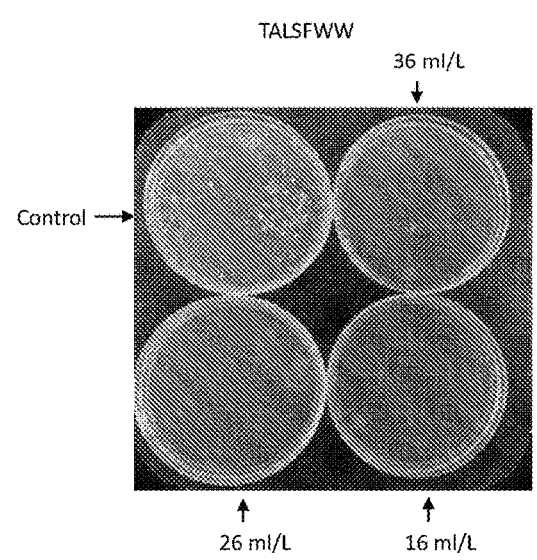
FIG. 87 shows the results of a test against *Erwinia* sp.

The conditions of Example 25A were reproduced, with the exception that a different synthetic tannin composition ("TALSFWW"; containing 3% tannins) was tested. As can be seen from FIGS. 86 and 87, effective doses of the composition in this test were deemed to be 16 ml/L, 26 ml/L, 36 ml/L, 46 ml/L, 56 ml/L, and 66 ml/L, which were the concentrations at which the *Erwinia* sp. grew at a much lower rate than the control. In the 16 ml/L, 26 ml/L, 36 ml/L, 46 ml/L, 56 ml/L, and 66 ml/L concentrations, the *Erwinia* sp. was not visibly present, and hence did not grow in the agar.

Example 26A

Figure 88:
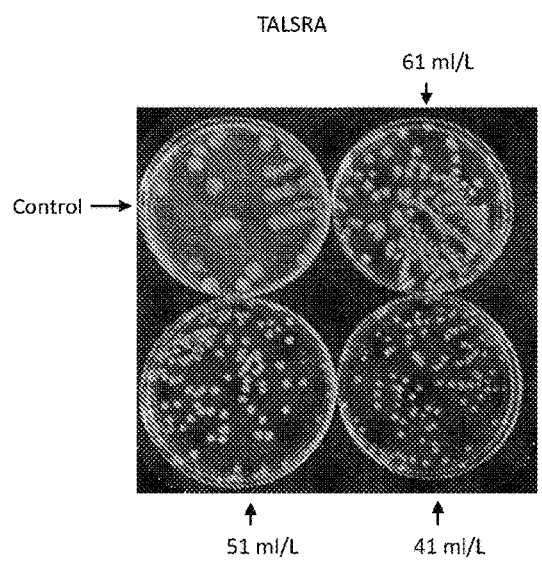
FIG. 88 shows the results of a test against *Ralstonia* sp.
Figure 89:
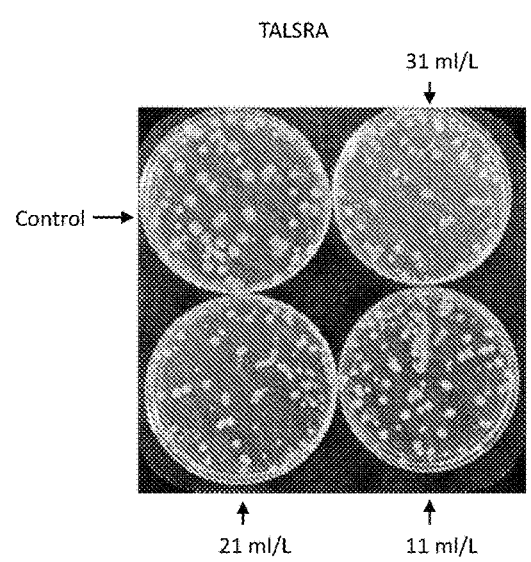
FIG. 89 shows the results of a test against *Ralstonia* sp.

The conditions of Example 4A were reproduced, with the exception that a synthetic tannin composition ("TALSRA"; containing 3% tannins) was tested. As can be seen from FIGS. 88 and 89, none of the doses tested were deemed to be effective doses of the composition, as the *Ralstonia* sp. grew at a rate comparable to the control.

Example 26B

Figure 90:
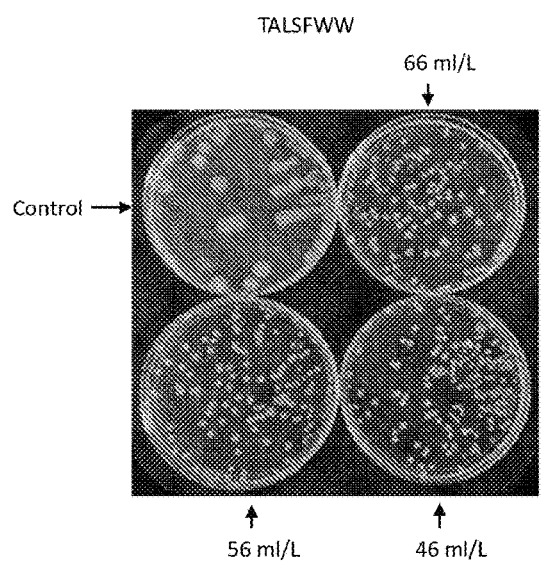
FIG. 90 shows the results of a test against *Ralstonia* sp.
Figure 91:
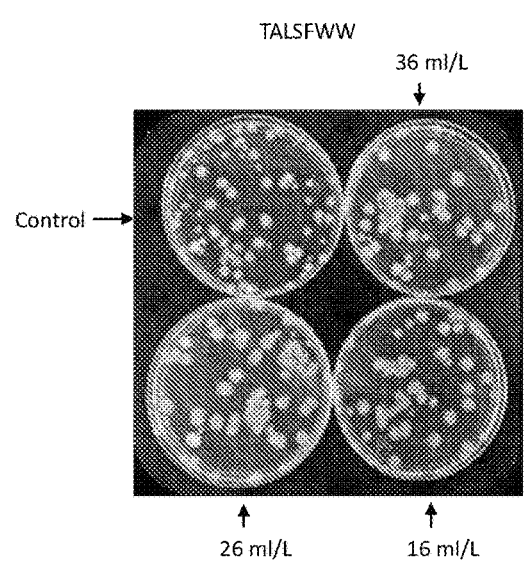
FIG. 91 shows the results of a test against *Ralstonia* sp.

The conditions of Example 26A were reproduced, with the exception that a different synthetic tannin composition ("TALSFWW"; containing 3% tannins) was tested. As can be seen from FIGS. 90 and 91, none of the doses tested were deemed to be effective doses of the composition, as the *Ralstonia* sp. grew at a rate comparable to the control.

Example 27A

Figure 92:
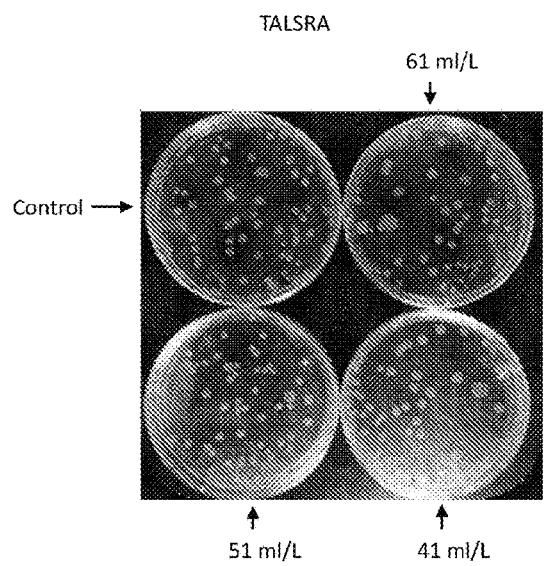
FIG. 92 shows the results of a test against *Clavibacter* sp.

The conditions of Example 1A were reproduced, with the exception that a synthetic tannin composition ("TALSRA"; containing 3% tannins) was tested. As can be seen from FIG. 92, none of the doses tested were deemed to be effective doses of the composition, as the *Clavibacter* sp. grew at a rate comparable to the control.

Example 27B

Figure 93:
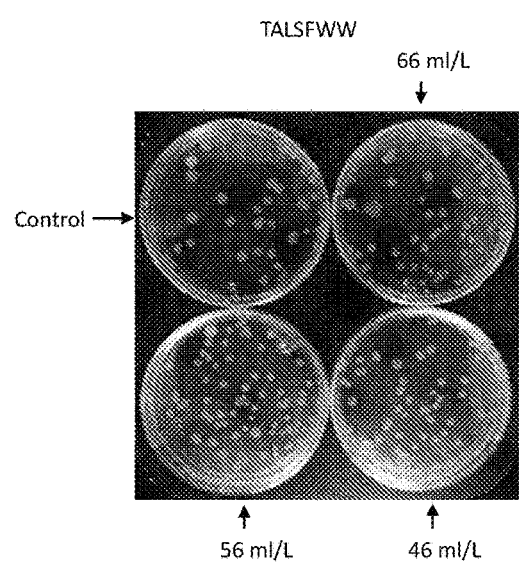
FIG. 93 shows the results of a test against *Clavibacter* sp.

The conditions of Example 27A were reproduced, with the exception that a different synthetic tannin composition ("TALSFWW"; containing 3% tannins) was tested. As can be seen from FIG. 93, none of the doses tested were deemed to be effective doses of the composition, as the *Clavibacter* sp. grew at a rate comparable to the control.

While the inventive concept has been described in connection with what is presently considered to be practical exemplary embodiments, it is to be understood that the inventive concept herein is not limited to the disclosed embodiments, and covers various modifications and equivalent arrangements included within the spirit and scope of the appended claims.

What is claimed is:

1. A method of preventing or treating a disease in plants, comprising administering a composition to a plant in need thereof, wherein the disease is caused by a fungus selected from the group consisting of *Alternaria* sp., *Phytophthora* sp., *Colletotrichum* sp., *Fusarium* sp., and *Aspergillus* sp., wherein the composition comprises a tannin extracted from Acacia tree(s) and at least one item selected from the group consisting of dispersants, surfactants and/or humectants, inert components, thickeners, bactericides, resistance inductors, biopesticides, fungicides, foliage fertilizers, and hormones.

2. The method of claim 1, wherein the composition further comprises a carbohydrate and bentonite.

3. The method of claim 1, wherein the composition further comprises diatomaceous earth.

4. The method of claim 3, wherein the composition further comprises sodium lignosulfate, naphthalene sulfonate, and xanthan gum.

5. The method of claim 1, wherein the composition is administered to at least one of the plant's foliage, stem, canopy, trunk, roots, shoots, twigs, or flowers.

6. The method of claim 1, wherein the composition is administered to at least one of the plant's seeds or rhizomes.

7. The method of claim 1, wherein the formulation is administered to the plant at least twice at an interval of from 1-21 days.

8. The method of claim 1, wherein the formulation is administered during the plant's seedling stage, transplant stage, vegetative stage, pre-bloom stage, full-bloom stage, post-bloom stage, fruit set stage, or dormancy.

9. The method of claim 1, wherein the plant is a vegetable plant, a cereal plant, a fruit plant, a nut plant, or sugar cane.

10. The method of claim 9, wherein the plant is a fruit tree.

11. The method of claim 1, wherein the composition contains from 5% to 20% by mass of the tannins on a dry weight basis.

12. The method of claim 1, wherein the composition contains from 5% to 10% by mass of the tannins on a dry weight basis.

13. The method of claim 1, wherein:
the composition contains from 5% to 20% by mass of the tannins on a dry weight basis;
the fungus is one selected from the group consisting of *Alternaria* sp., *Phytophthora* sp., *Colletotrichum* sp., *Fusarium* sp., and *Aspergillus* sp.; and
the composition further comprises a carbohydrate and bentonite.

14. The method of claim 1, wherein:
the composition contains from 5% to 20% by mass of the tannins on a dry weight basis;
the fungus is one selected from the group consisting of *Alternaria* sp., *Phytophthora* sp., *Colletotrichum* sp., *Fusarium* sp., and *Aspergillus* sp.; and
the composition further comprises diatomaceous earth, sodium lignosulfate, naphthalene sulfonate, and xanthan gum.

15. The method of claim 1, wherein the method is a method of treating the disease in plants.

16. The method of claim 1, wherein the method is a method of preventing the disease in plants.

17. The method of claim 1, wherein the composition contains from 5% to 30% by mass of the tannins on a dry weight basis.

* * * * *